US011807732B2

(12) United States Patent
Dehn et al.

(10) Patent No.: US 11,807,732 B2
(45) Date of Patent: Nov. 7, 2023

(54) METHOD OF MAKING POLYMER MATRIX COMPOSITES

(71) Applicant: 3M INNOVATIVE PROPERTIES COMPANY, St. Paul, MN (US)

(72) Inventors: Derek J. Dehn, Maplewood, MN (US); Clinton P. Waller, Jr., White Bear Lake, MN (US); Jeanne M. Bruss, Cottage Grove, MN (US); Bharat R. Acharya, Woodbury, MN (US); Brandon A. Bartling, Woodbury, MN (US); Michael S. Graff, Woodbury, MN (US); Noah O. Shanti, Maplewood, MN (US); Fabian Stolzenburg, Woodbury, MN (US); Satinder K. Nayar, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 684 days.

(21) Appl. No.: 16/760,468

(22) PCT Filed: Nov. 15, 2018

(86) PCT No.: PCT/IB2018/059002
§ 371 (c)(1),
(2) Date: Apr. 30, 2020

(87) PCT Pub. No.: WO2019/097449
PCT Pub. Date: May 23, 2019

(65) Prior Publication Data
US 2020/0347200 A1   Nov. 5, 2020

Related U.S. Application Data

(60) Provisional application No. 62/587,053, filed on Nov. 16, 2017.

(51) Int. Cl.
*C08J 9/28* (2006.01)
*C08K 3/22* (2006.01)
*C08J 9/00* (2006.01)

(52) U.S. Cl.
CPC ............... *C08J 9/28* (2013.01); *C08J 9/0004* (2013.01); *C08J 9/0066* (2013.01); *C08K 3/22* (2013.01);
(Continued)

(58) Field of Classification Search
CPC . C08J 9/28; C08J 9/0004; C08J 9/0066; C08J 2201/0522; C08J 2201/0542;
(Continued)

(56) References Cited

U.S. PATENT DOCUMENTS 3,954,927 A   5/1976  Duling
4,539,256 A   9/1985  Shipman
(Continued)

FOREIGN PATENT DOCUMENTS

CN   101238166   8/2008
CN   102449809   5/2012
(Continued)

OTHER PUBLICATIONS

US 8,594,357 B1, 11/2013, Lin (withdrawn)
(Continued)

*Primary Examiner* — K. Boyle
(74) *Attorney, Agent, or Firm* — Thomas M. Spielbauer; Lynn R. Hunsberger; Adrian L. Pishko

(57) ABSTRACT

Method of making a polymer matrix composite comprising a porous polymeric network structure; and a plurality of particles distributed within the polymeric network structure, the method comprising: combining a thermoplastic polymer, a solvent that the thermoplastic polymer is soluble in, and a plurality of particles to provide a slurry; forming the slurry
(Continued)

100µm in to an article; heating the article in an environment to retain at least 90 percent by weight of the solvent, based on the weight of the solvent in the slurry, and inducing phase separation of the thermoplastic polymer from the solvent to provide the polymer matrix composite.

19 Claims, 27 Drawing Sheets

(52) U.S. Cl.
CPC .................. *C08J 2201/0522* (2013.01); *C08J 2201/0542* (2013.01); *C08J 2205/05* (2013.01); *C08J 2323/06* (2013.01); *C08K 2003/2237* (2013.01); *C08K 2201/001* (2013.01); *C08K 2201/01* (2013.01)

(58) Field of Classification Search
CPC ..... C08J 2205/05; C08J 2323/06; C08K 3/22; C08K 2003/2237; C08K 2201/001; C08K 2201/01
See application file for complete search history.

(56) References Cited

U.S. PATENT DOCUMENTS

| | | |
|---|---|---|
| 4,791,037 A | 12/1988 | Anderman |
| 4,833,172 A | 5/1989 | Schwarz |
| 4,957,943 A | 9/1990 | McAllister |
| 5,059,637 A | 10/1991 | Langer |
| 5,120,154 A | 6/1992 | Lasch |
| 5,292,840 A | 3/1994 | Heilmann |
| 5,389,434 A | 2/1995 | Chamberlain |
| 5,510,412 A | 4/1996 | Suzuki |
| 5,567,757 A | 10/1996 | Szczepanski |
| 5,643,511 A | 7/1997 | Pluyter |
| 5,827,445 A | 10/1998 | Yoshida |
| 5,828,940 A | 10/1998 | Learman |
| 5,993,935 A | 11/1999 | Rasmussen |
| 6,153,674 A | 11/2000 | Landen |
| 6,171,723 B1 | 1/2001 | Loch |
| 6,341,384 B1 | 1/2002 | Hayes |
| 6,379,952 B1 | 4/2002 | Rasmussen |
| 6,423,666 B1 | 7/2002 | Liao |
| 6,458,418 B2 | 10/2002 | Langer |
| 6,468,678 B1 | 10/2002 | Dahlin |
| 6,524,742 B1 | 2/2003 | Emanuel |
| 6,548,972 B2 | 4/2003 | Takagi |
| 6,558,840 B1 | 5/2003 | Hikmet |
| 6,562,448 B1 | 5/2003 | Chamberlain |
| 6,692,799 B2 | 2/2004 | Waller, Jr. |
| 6,820,382 B1 | 11/2004 | Chambers |
| 7,229,683 B2 | 6/2007 | Fisher |
| 7,582,684 B2 | 9/2009 | Rasmussen |
| 7,674,835 B2 | 3/2010 | Rasmussen |
| 7,674,836 B2 | 3/2010 | Rasmussen |
| 7,682,536 B2 | 3/2010 | Miller |
| 7,709,098 B2 | 5/2010 | Yoda |
| 7,744,991 B2 | 6/2010 | Fisher |
| 7,940,447 B2 | 5/2011 | Wu |
| 7,953,240 B2 | 5/2011 | Matsumura |
| 7,955,570 B2 | 6/2011 | Insley |
| 8,080,210 B2 | 12/2011 | Hornback, III |
| 8,265,330 B2 | 9/2012 | Fukunishi |
| 8,292,023 B2 | 10/2012 | Slotte |
| 8,314,046 B2 | 11/2012 | Brady |
| 8,335,333 B2 | 12/2012 | Saiki |
| 8,367,198 B2 | 2/2013 | Wickert |
| 8,522,829 B2 | 9/2013 | D'Souza |
| 8,592,493 B2 | 11/2013 | Shannon |
| 8,687,836 B2 | 4/2014 | Lin |
| 8,692,639 B2 | 4/2014 | Baarman |
| 8,698,394 B2 | 4/2014 | McCutcheon |
| 8,710,111 B2 | 4/2014 | Wickert |
| 8,767,998 B2 | 7/2014 | Imamura |
| 8,794,373 B1 | 8/2014 | Lin |
| 8,885,863 B2 | 11/2014 | Takashima |
| 8,942,402 B2 | 1/2015 | Yuasa |
| 8,974,706 B2 | 3/2015 | Somasiri |
| 9,018,267 B2 | 4/2015 | Shannon |
| 9,056,316 B2 | 6/2015 | Lawson |
| 9,105,382 B2 | 8/2015 | Heikkila |
| 9,251,950 B2 | 2/2016 | Hatanaka |
| 9,657,038 B2 | 5/2017 | Griesgraber |
| 9,675,722 B2 | 6/2017 | Ahimou |
| 9,681,996 B2 | 6/2017 | Prioleau |
| 9,714,442 B2 | 7/2017 | Sherman |
| 9,725,545 B2 | 8/2017 | Wickert |
| 9,738,919 B2 | 8/2017 | Mach |
| 9,759,663 B2 | 9/2017 | Halverson |
| 9,772,321 B2 | 9/2017 | Wendland |
| 9,896,555 B2 | 2/2018 | Pekala |
| 11,021,584 B2 | 10/2021 | Yen |
| 2002/0078793 A1 | 6/2002 | Holl |
| 2006/0099454 A1 | 5/2006 | Morikoshi |
| 2007/0003749 A1 | 1/2007 | Asgari |
| 2007/0086965 A1 | 4/2007 | Mohanty |
| 2011/0048844 A1 | 3/2011 | Papakyriacou |
| 2011/0115429 A1 | 5/2011 | Toivola |
| 2012/0145468 A1* | 6/2012 | Pekala ................ H01M 50/403 429/251 |
| 2012/0183775 A1 | 7/2012 | Shinba |
| 2012/0309860 A1 | 12/2012 | Huang |
| 2013/0170687 A1 | 7/2013 | Papakyriacou |
| 2013/0170690 A1 | 7/2013 | Backman |
| 2014/0008974 A1 | 1/2014 | Miyamoto |
| 2014/0094076 A1 | 4/2014 | Mrozinski |
| 2014/0227593 A1 | 8/2014 | Lee |
| 2014/0254836 A1 | 9/2014 | Tong |
| 2014/0309314 A1 | 10/2014 | Sahouani |
| 2015/0099168 A1 | 4/2015 | Guo |
| 2015/0235753 A1 | 8/2015 | Chatani |
| 2016/0044838 A1 | 2/2016 | Aga |
| 2016/0118711 A1 | 4/2016 | Finn |
| 2017/0049926 A1 | 2/2017 | Langer-Anderson |
| 2017/0117598 A1 | 4/2017 | Matsushita |
| 2018/0038862 A1 | 2/2018 | Kshirsagar |
| 2018/0174723 A1 | 6/2018 | Acharya |
| 2019/0144613 A1 | 5/2019 | Dehn |
| 2019/0144625 A1 | 5/2019 | Acharya |
| 2019/0144626 A1 | 5/2019 | Dehn |

FOREIGN PATENT DOCUMENTS

| | | |
|---|---|---|
| CN | 103608389 | 2/2014 |
| CN | 106463679 | 2/2017 |
| CN | 106574071 | 4/2017 |
| EP | 0365111 | 4/1990 |
| JP | 11-176560 | 7/1999 |
| JP | 2000-004097 | 1/2000 |
| JP | 2002-289414 | 1/2002 |
| JP | 2008050383 A | 3/2008 |
| JP | 2009204682 A | 9/2009 |
| JP | 2011-199574 | 10/2011 |
| JP | 5522282 | 7/2013 |
| JP | 2014022245 A * | 2/2014 |
| KR | 10-1627043 | 3/2016 |
| WO | WO 1992-006577 | 4/1992 |
| WO | WO 2001-041213 | 6/2001 |
| WO | WO 2009-006254 | 1/2009 |
| WO | 2010108148 A1 | 9/2010 |
| WO | WO 2012-040032 | 3/2012 |
| WO | 2015153979 A1 | 10/2015 |
| WO | 2016144934 A1 | 9/2016 |
| WO | WO 2016-149233 | 9/2016 |
| WO | WO 2016-178120 | 11/2016 |
| WO | WO 2018-116127 | 6/2018 |
| WO | WO 2018-231687 | 12/2018 |
| WO | WO 2019-097445 | 5/2019 |
| WO | WO 2019-097446 | 5/2019 |
| WO | WO 2019-097447 | 5/2019 |
| WO | WO 2019-097451 | 5/2019 |
| WO | WO 2019-099603 | 5/2019 |

(56) References Cited

FOREIGN PATENT DOCUMENTS

OTHER PUBLICATIONS

"GUR UHMW-PE Ultra High Performance Polyethylene Powder," from Celanese, 2016, pp. 1-35. (Year: 2016).*
Baker-Jarvis, Dielectric and Magnetic Properties of Printed Wiring Boards and Other Substrate Materials, United States Department of Commerce National Institute of Standards and Technology (NIST) Technical Note, Mar. 1, 1999, vol. 1512, 84 pages.
Bechwati, "Low Frequency Sound Propagation in Activated Carbon", The Journal of the Acoustical Society of America, Jul. 2012, vol. 132, No. 1, pp. 239-248.
Kesting, Synthetic Polymeric Membranes—A Structural Perspective, 2nd Edition John Wiley & Sons, 5 pages (1985).
Oswald, Materials Science and Polymers for Engineers, 494-496, (2012).
Schaller, "High-Performance Polyethylene Fibers "Al Dente": Improved Gel-Spinning of Ultrahigh Molecular Weight Polyethylene Using Vegetable Oils", Macromolecules, 2015, vol. 48, No. 24, pp. 8877-8884.
Small, "Closed-Box Loudspeaker Systems", Journal of the Audio Engineering Society, Dec. 1972, vol. 20, No. 10, pp. 798-808.
International Search Report for PCT International Application No. PCT/IB2018/059002, dated Feb. 4, 2019, 5 pages.
Wenying et al., "Thermal Conductive Polymer Materials", National Defense Industry Press, Apr. 2014, pp. 199-201.

* cited by examiner

300μm

30μm

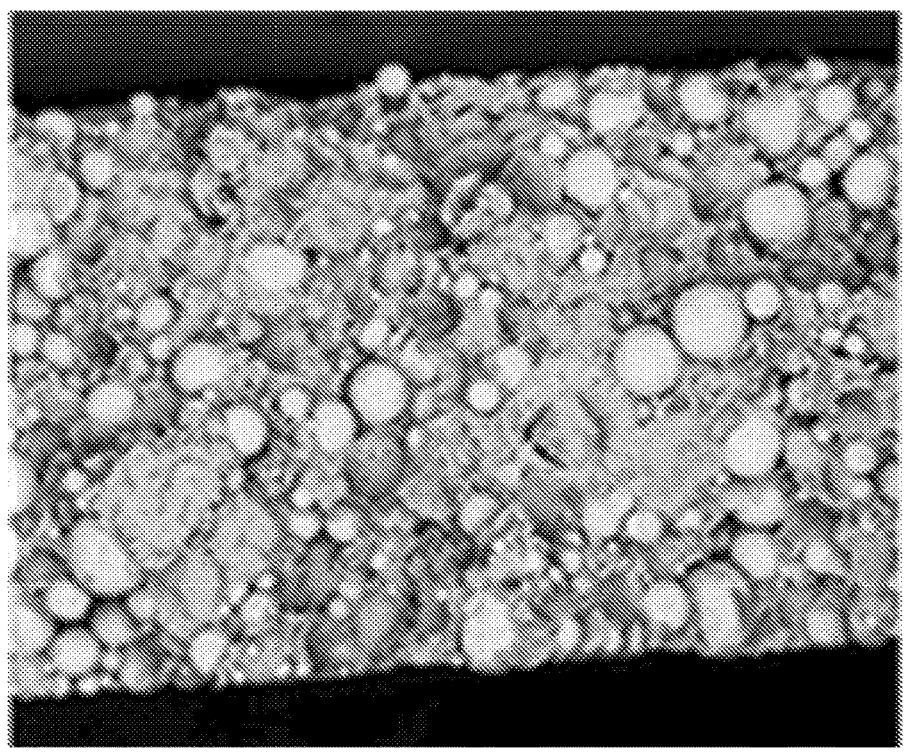
*Fig. 6*  300μm
*Fig. 7*  300μm

100μm

220μm

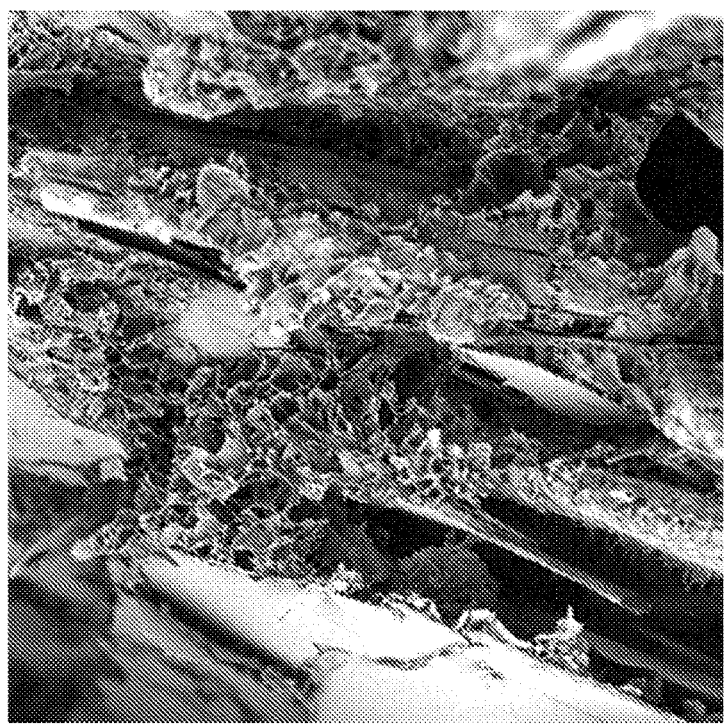
*Fig. 16* 270μm
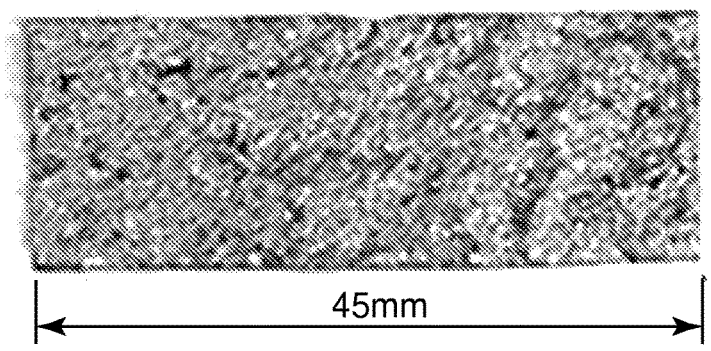
*Fig. 17A* 45mm
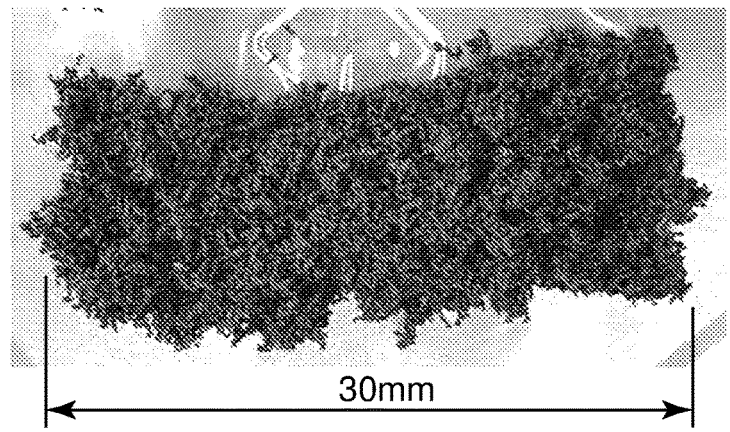
*Fig. 17B* 30mm

Fig. 18
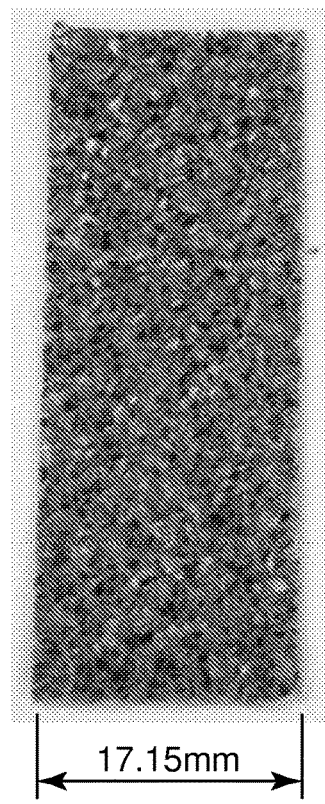 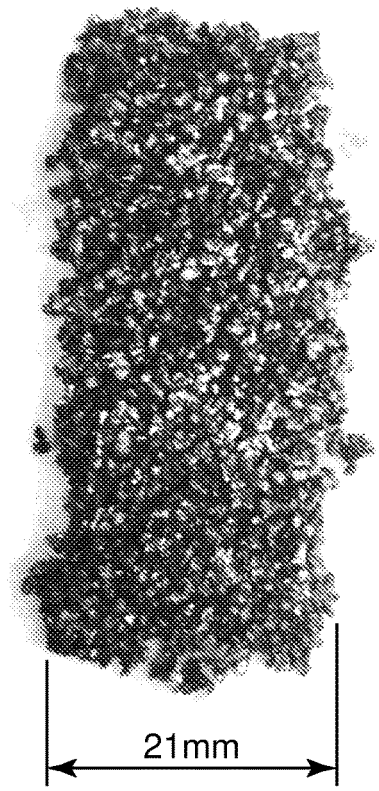
Fig. 19A　　Fig. 19B

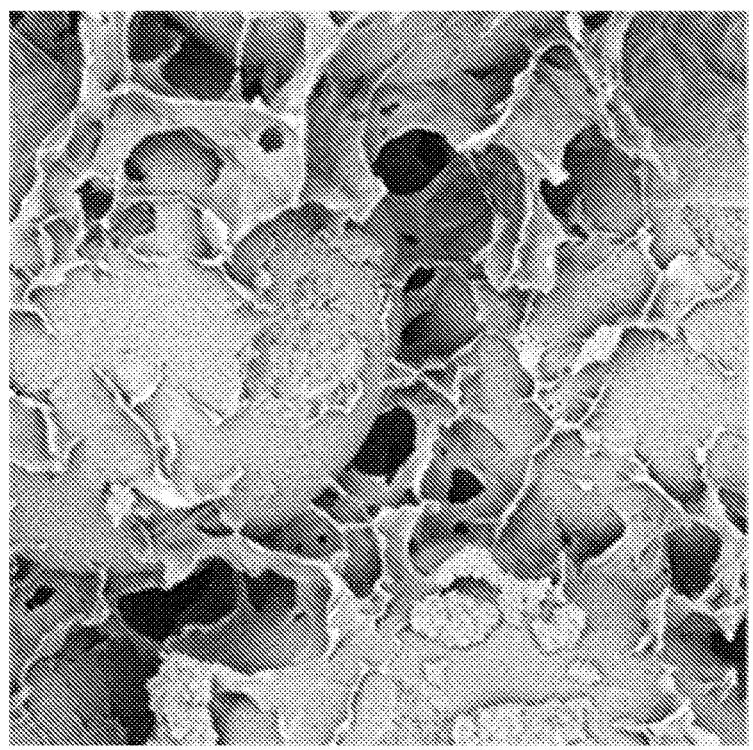
*Fig. 20A*  10μm
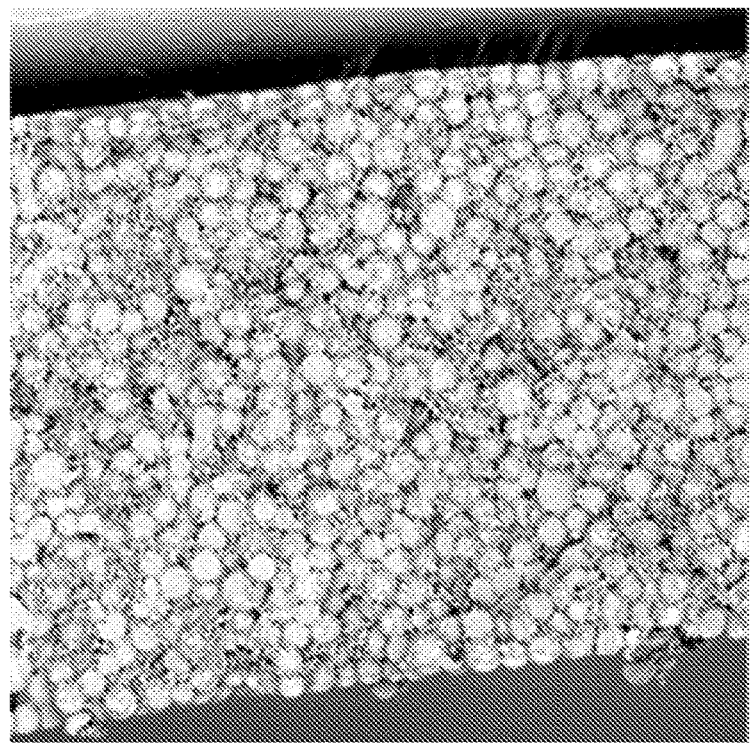
*Fig. 20B*  300μm

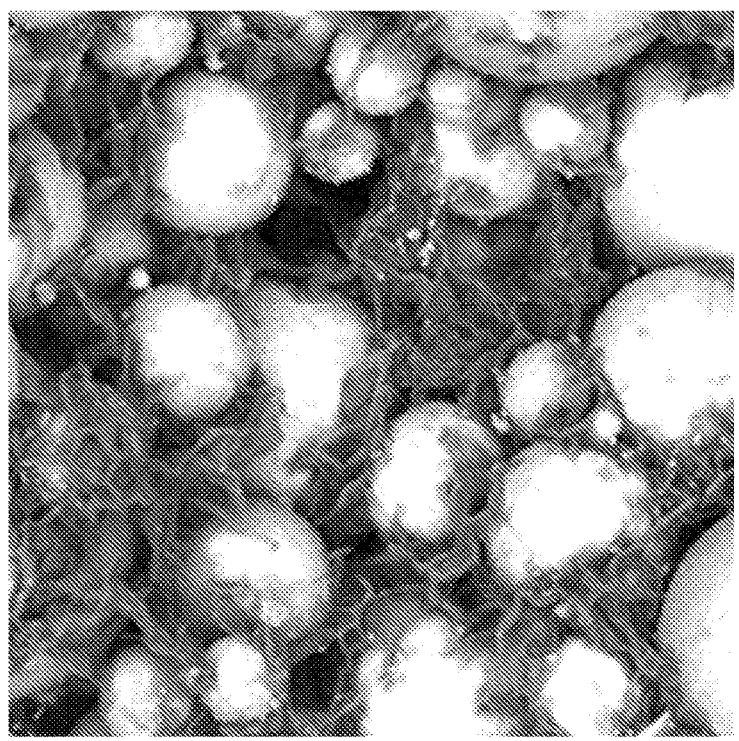
*Fig. 22*  10μm
110μm
*Fig. 23*

100μm

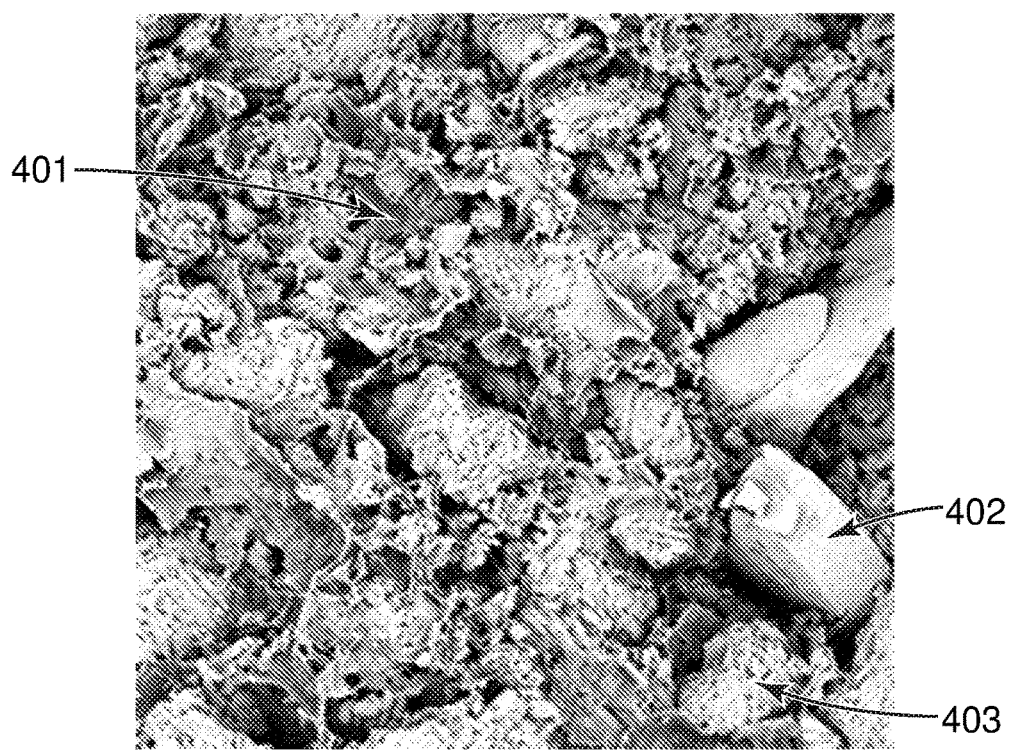
*Fig. 27* 110μm
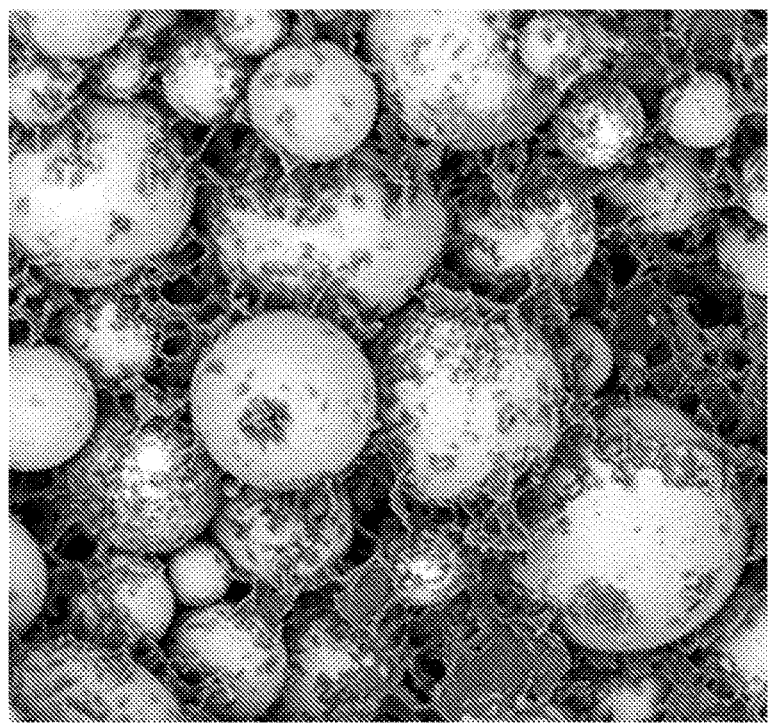
*Fig. 28* 80μm

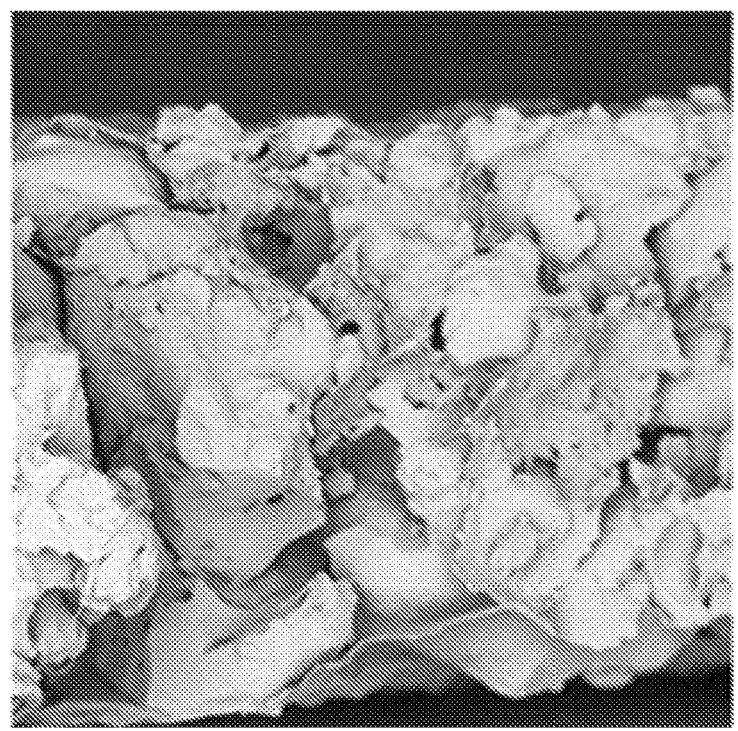
*Fig. 30A*  300μm
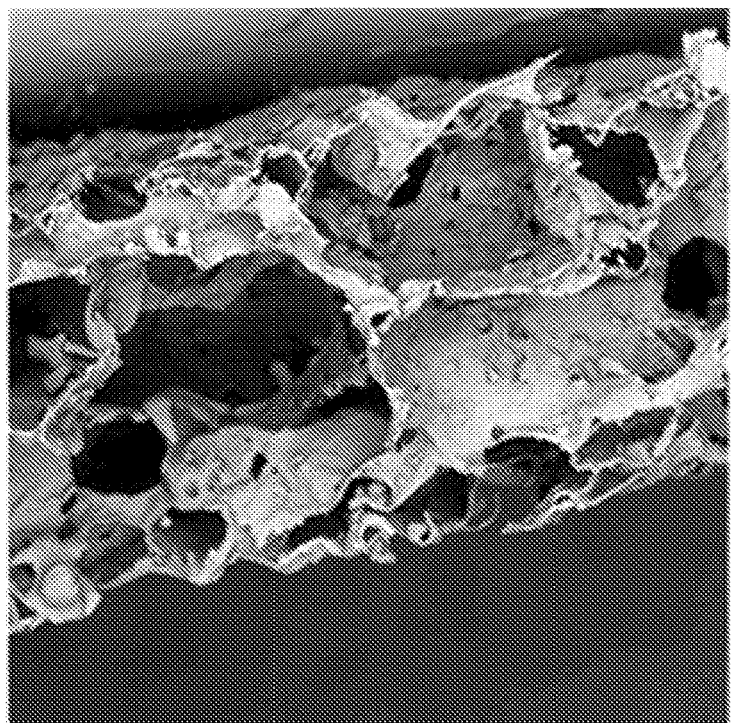
*Fig. 30B*  300μm

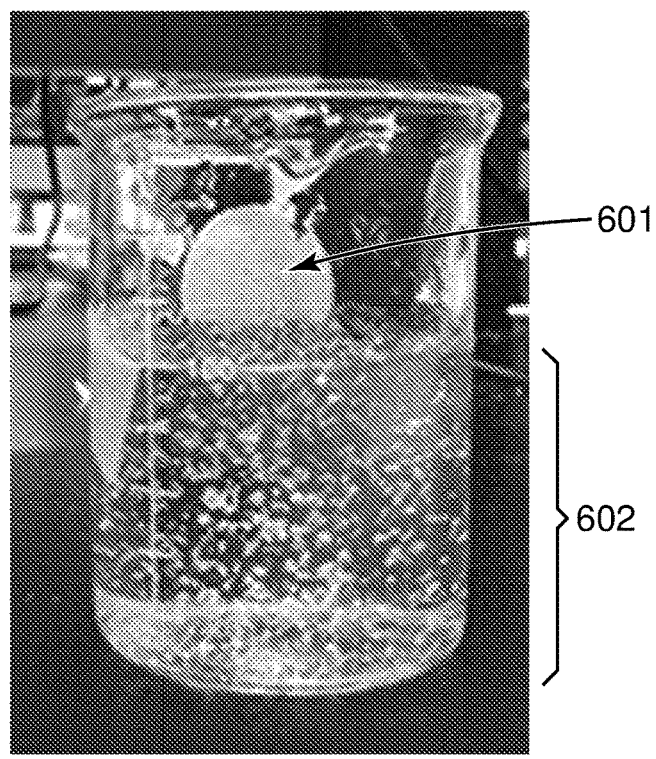
Fig. 31
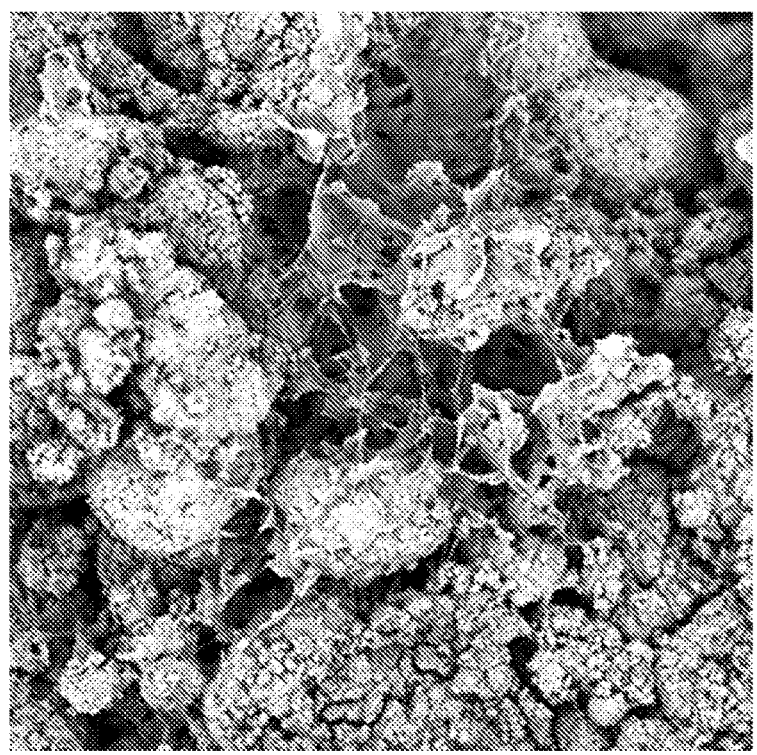
Fig. 32  100μm

METHOD OF MAKING POLYMER MATRIX COMPOSITES

CROSS REFERENCE TO RELATED APPLICATIONS

This application is a national stage filing under 35 U.S.C. 371 of PCT/IB2018/059002, filed Nov. 15, 2018, which claims the benefit of U.S. application Ser. No. 62/587053, filed Nov. 16, 2017, the disclosure of which is incorporated by reference in its/their entirety herein.

BACKGROUND

Typically, the maximum particle loading that can be achieved in traditional particle-filled composites (dense polymeric films, adhesives, etc.), is not more than about 40 to 60 vol. %, based on the volume of the particles and binder. Incorporating more than 60 vol. % particles into traditional particle filled composites typically is not achievable because such high particle loaded materials cannot be processed via coating or extrusion methods and/or the resulting composite becomes very brittle. Traditional composites also typically fully encapsulate the particles with binder preventing access to the particle surfaces and minimizing potential particle-to-particle contact.

High molecular weight polymers such as ultrahigh molecular weight polyethylene (UHMWPE) and polypropylene (UHMWPP) are desirable because they provide superior molecular entanglement and toughness. Polymers such as UHMWPE (i.e., polyethylene with a molecular weight average in excess of 1,000,000 g/mole), however, tend to be difficult to process via extrusion. Even in molten state, UHMWPE has a relatively high viscosity, requiring significant mechanical work to shape. The mechanical work needed for melt processing of UHMWPE shears the polymer and reduces the polymer molecular weight. Melt processing of UHMWPE typically requires use of a solvent, usually a hydrocarbon (e.g., mineral oil, decalin, or kerosene), as a processing aide. The mechanical tearing apart of a long strand polyethylene molecule can occur even with the addition of a processing aide when processed with extrusion equipment. Incorporating high loading of particles in the polymer melt further amplifies extrusion processing problems such as feeding, mixing, shear, viscosity, and wear. Therefore, the conventional methods are limited in their ability to make articles with high particle loadings.

Improved methods and processes that enable manufacturing of high particle-loaded articles are desired.

SUMMARY

The present disclosure describes a method of making a polymer matrix composite comprising a porous polymeric network structure; and a plurality of particles distributed within the polymeric network structure, the method comprising:

combining (e.g., mixing or blending) a thermoplastic polymer, a solvent, and a plurality of thermally conductive particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent, based on the total weight of the thermoplastic polymer; and inducing phase separation of the thermoplastic polymer from the solvent to provide the polymer matrix composite.

"Miscible" as used herein refers to the ability of substances to mix in all proportions (i.e., to fully dissolve in each other at any concentration), forming a solution, wherein for some solvent-polymer systems heat may be needed for the polymer to be miscible with the solvent. By contrast, substances are immiscible if a significant proportion does not form a solution. For example, butanone is significantly soluble in water, but these two solvents are not miscible because they are not soluble in all proportions.

"Phase separation," as used herein, refers to the process in which particles are uniformly dispersed in a homogeneous polymer-solvent solution that is transformed (e.g., by a change in temperature) into a continuous three-dimensional polymer matrix composite. The desired article is formed before the polymer becomes miscible with the solvent and the phase separation is a thermally induced phase separation (TIPS) process.

In the TIPS process, elevated temperature is used to make a nonsolvent become a solvent for the polymer, then the temperature is lowered returning the solvent to a nonsolvent for the polymer. Effectively, the hot solvent becomes the pore former when sufficient heat is removed and it loses its solvating capacity. The solvent used in the TIPS process can be volatile or nonvolatile.

Surprisingly, to make a polymer matrix composite using the method described herein, the relatively high particle loadings allow a slurry to be made that can be shaped into a layer that maintains its form as the solvent is heated to become miscible with the polymer. The solvent used is normally volatile and is later evaporated.

Typically, the maximum particle loading that can be achieved in traditional particle-filled composites (dense polymeric films, adhesives, etc.), is not more than about 40 to 60 vol. %, based on the volume of the particles and binder. Incorporating more than 60 vol. % particles into traditional particle-filled composites typically is not achievable because such high particle loaded materials cannot be processed via coating or extrusion methods and/or the resulting composite becomes very brittle. Traditional composites also typically fully encapsulate the particles with binder, preventing access to the particle surfaces and minimizing potential particle-to-particle contact. Typically, the response (e.g., thermal, electrical, chemical, biological) from a particle-filled composite increases with particle loading, making higher particle loadings desirable. Surprisingly, the high levels of solvent and the phase-separated morphologies, obtained with the method described herein, enable relatively high particle loadings with relatively low amounts of high molecular weight binder. The through-porous, phase-separated morphologies also allow samples to be breathable at relatively low to relatively high particle concentrations. The high particle loading also helps minimize the formation of thin non-porous polymer layer that can form during phase separation. Moreover, the polymer matrix composites prepared using the method described herein are relatively flexible, and tend not to shed particles. Although not wanting to be bound by theory, it is believed that another advantage of embodiments of polymer matrix composites prepared using the method described herein, is that the particles are not fully coated with binder, enabling a high degree of particle surface contact, without masking due to the porous nature of the binder. It should be noted that compression of the layer can significantly enhance the particle to particle contact. The high molecular weight binder also does not readily flow in the absence of solvent, even at elevated temperatures (e.g., 135° C.).

Embodiments of the method described herein can allow for relatively high particle loading with processing into desired useful articles. Embodiments of relatively highly filled articles provided by embodiments of the method described herein can have relatively low binder contact with the filler particles, allowing for relatively highly porous articles. Such openness can significantly reduce the masking effect present in conventional particle bound systems, as well as facilitate relatively high surface-active particles or exposure of active particles in the porous article to liquids or gases.

Embodiments of polymer matrix composites made by the methods described herein, are useful, for example, for thermally conductive or insulating films; sound active devices; electrically conductive devices; electrically insulating devices; electrically insulating devices with high dielectric efficiency; magnetically permeable media; physically expansive media; absorptive media; filters; monoliths; ultra-low density (rigid or flexible) media; catalyst supports; chromatography media; sensors; indicators; luminescent media; endothermic media, and fire block materials.

BRIEF DESCRIPTION OF THE DRAWINGS

FIGS. 4-10 are scanning electron microscope (SEM) micrographs of cross-sections of exemplary polymer matrix composites (Examples 1, 2, 3, 4, 5, 8, and 10, respectively) described herein.

FIGS. 14, 16, and 18 show scanning electron microscope (SEM) micrographs of cross-sections of exemplary polymer matrix composites (Example 15, 16, and 17, respectively) described herein.

FIGS. 15A, 17A, and 19A, show digital optical camera pictures of top views of exemplary unexpanded polymer matrix composites (Example 15, 16, and 17, respectively) described herein.

FIGS. 15B, 17B, and 19B, show digital optical camera pictures of top views of exemplary expanded polymer matrix composites (Example 15, 16, and 17, respectively) described herein.

FIGS. 20A and 20B, show scanning electron microscope (SEM) micrographs of cross-sections of an exemplary polymer matrix composite (Example 18) described herein.

FIG. 22 shows scanning electron microscope (SEM) micrographs of cross-sections of an exemplary polymer matrix composite (Example 20) described herein.

FIG. 23 shows scanning electron microscope (SEM) micrographs of cross-sections of an exemplary polymer matrix composite (Example 21) described herein.

FIGS. 27 and 28 show scanning electron microscope (SEM) micrographs of cross-sections of exemplary polymer matrix composites (Examples 38 and 39, respectively) described herein.

FIGS. 29, 30A, 30B, 32, and 33 show scanning electron microscope (SEM) micrographs of cross-sections of an exemplary polymer matrix composite (Examples 42, 43, 44, and 45, respectively) described herein.

FIG. 31 shows a digital image of water absorption after placing disc of polymer matrix composite (Example 43), described herein, in 100 mL of water.

DETAILED DESCRIPTION

Figure 1:
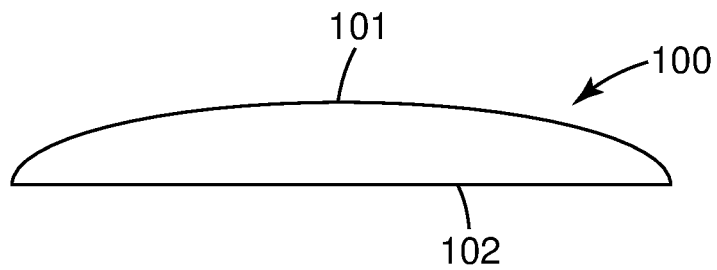
FIG. 1 is a schematic of an exemplary polymer matrix composite described herein.

The present disclosure describes a method of making a polymer matrix composite comprising a porous polymeric network structure; and a plurality of particles distributed within the polymeric network structure, the method comprising:

combining (e.g., mixing or blending) a thermoplastic polymer, a solvent, and a plurality of particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent, based on the total weight of the thermoplastic polymer; and inducing phase separation of the thermoplastic polymer from the solvent to provide the polymer matrix composite.

In some embodiments, the polymeric network structure may comprise, consist essentially of, or consist of at least one thermoplastic polymer. Exemplary thermoplastic polymers include polyurethane, polyester (e.g., polyethylene terephthalate, polybutylene terephthalate, and polylactic acid), polyamide (e.g., nylon 6, nylon 6,6, and polypeptide), polyether (e.g., polyethylene oxide and polypropylene oxide), polycarbonate (e.g., bisphenol-A-polycarbonate), polyimide, polysulphone, polyethersulfone, polyphenylene oxide, polyacrylate (e.g., thermoplastic polymers formed from the addition polymerization of monomer(s) containing an acrylate functional group), polymethacrylate (e.g., thermoplastic polymers formed from the addition polymerization of monomer(s) containing a methacrylate functional group), polyolefin (e.g., polyethylene and polypropylene), styrene and styrene-based random and block copolymer, chlorinated polymer (e.g., polyvinyl chloride), fluorinated polymer (e.g., polyvinylidene fluoride; copolymers of tetrafluoroethylene, hexafluoropropylene and vinylidene fluoride; copolymers of ethylene, tetrafluoroethylene; hexafluoropropylene; and polytetrafluoroethylene), and copolymers of ethylene and chlorotrifluoroethylene. In some embodiments, thermoplastic polymers include homopolymers or copolymers (e.g., block copolymers or random copolymers). In some embodiments, thermoplastic polymers include a mixture of at least two thermoplastic polymer types (e.g., a mixture of polyethylene and polypropylene or a mixture of polyethylene and polyacrylate). In some embodiments, the polymer may be at least one of polyethylene (e.g., ultra-high molecular weight polyethylene), polypropylene (e.g., ultra-high molecular weight polypropylene), polylactic acid, poly(ethylene-co-chlorotrifluoroethylene) and polyvinylidene fluoride. In some embodiments, the thermoplastic polymer is a single thermoplastic polymer (i.e., it is not a mixture of at least two thermoplastic polymer types). In some embodiments, the thermoplastic polymers consist essentially of, or consist of polyethylene (e.g., ultra-high molecular weight polyethylene).

In some embodiments, the thermoplastic polymer used to make the polymer matrix composites described herein are particles having a particle size less than 1000 (in some embodiments in the range from 1 to 10, 10 to 30, 30 to 100, 100 to 200, 200 to 500, 500 to 1000) micrometers.

In some embodiments, the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene. In some embodiments, the porous polymeric network structure comprises a polymer having a number average molecular weight in a range from $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol. For purposes of the present disclosure, the number average molecular weight can be measured by known techniques in the art (e.g., gel permeation chromatography (GPC)). GPC may be conducted in a suitable solvent for the thermoplastic polymer, along with the use of narrow molecular weight distribution polymer standards (e.g., narrow molecular weight distribution polystyrene standards). Thermoplastic polymers are generally characterized as being partially crystalline, exhibiting a melting point. In some embodiments, the thermoplastic polymer may have a melting point in a range from 120 to 350 (in some embodiments, in a range from 120 to 300, 120 to 250, or even 120 to 200)° C. The melting point of the thermoplastic polymer can be measured by known techniques in the art (e.g., the on-set temperature measured in a differential scanning calorimetry (DSC) test, conducted with a 5 to 10 mg sample, at a heating scan rate of 10° C./min, while the sample is under a nitrogen atmosphere).

In some embodiments, the polymeric network structure is a continuous network structure (i.e., the polymer phase comprises a structure that is open cell with continuous voids or pores forming interconnections between the voids, extending throughout the structure). In some embodiments, at least 2 (in some embodiments, at least 5, 10, 20, 30, 40, 50, 60, 70, 80, 90, 95, or even, 100) percent of the polymer network structure, by volume, may be a continuous polymer network structure. It should be noted that for purposes of the present disclosure, the portion of the volume of the polymer matrix composite made up of the particles is not considered part of the polymeric network structure. In some embodiments, the polymer network extends between two particles forming a network of interconnected particles.

The solvent (e.g., a first solvent) is selected such that it forms a miscible polymer-solvent solution. The solvent may be a blend of at least two individual solvents. In some embodiments, when the polymer is a polyolefin (e.g., at least one of polyethylene and polypropylene), the solvent may be, for example, at least one of mineral oil, tetralin, decalin, orthodichlorobenzene, cyclohexane-toluene mixture, dodecane, paraffin oil/wax, kerosene, isoparaffinic fluids, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent may be, for example, at least one of ethylene carbonate, propylene carbonate, or 1,2,3 triacetoxypropane. The solvent may be removed, for example, by evaporation. High vapor pressure solvents being particularly suited to this method of removal. If, however, the first solvent has a low vapor pressure, it may be desirable to have a second solvent, of higher vapor pressure, to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.), may be used as the second solvent. In some embodiments, when ethylene carbonate is used as the first solvent, water may be used as the second solvent.

In some embodiments, small quantities of other additives can be added to the polymer matrix composite to impart additional functionality or act as processing aids. These include viscosity modifiers (e.g., fumed silica, block copolymers, and wax), plasticizers, thermal stabilizers (e.g., such as available, for example, under the trade designation "IRGANOX 1010" from BASF, Ludwigshafen, Germany), antimicrobials (e.g., silver and quaternary ammonium), flame retardants, antioxidants, dyes, pigments, and ultraviolet (UV) stabilizers.

Typically, the slurry is continuously mixed or blended to prevent or reduce settling or separation of the polymer and or particles from the solvent. In some embodiments, the slurry is degassed using techniques known in the art to remove entrapped air.

The slurry can be formed in to an article using techniques known in the art, including knife coating, roll coating (e.g., roll coating through a defined nip), and coating through any number of different dies having the appropriate dimensions or profiles.

In some embodiments of the method described herein, combining is conducted at a temperature below the melting point of the polymer and below the boiling point of the solvent.

In some embodiments of the method described herein, heating is conducted at at least one temperature above the melting point of the miscible thermoplastic polymer-solvent solution, and below the boiling point of the solvent.

In some embodiments of the method described herein, inducing phase separation is conducted at at least one temperature less than the melting point of the polymer in the slurry. Although not wanting to be bound, it is believed that in some embodiments, solvents used to make a miscible blend with the polymer can cause melting point depression in the polymer. The melting point described herein includes below any melting point depression of the polymer solvent system.

In some embodiments of the method described herein, the polymeric network structure may be formed during phase separation. In some embodiments, the polymeric network structure is provided by an induced phase separation of a miscible thermoplastic polymer-solvent solution. In some embodiments, the phase separation is induced thermally (e.g., via thermally induced phase separation (TIPS) by quenching to a lower temperature than used during heating). Cooling can be provided, for example, in air, liquid, or on a solid interface, and varied to control the phase separation. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the method described herein, the weight ratio of solvent to polymer is at least 9:1. In some embodiments, the volume ratio of particles to polymer is at least 9:1. In some embodiments, and for ease of manufacturing, it may be desirable to form a layer at room temperature. Typically, during the layer formation using phase separation, relatively small pores are particularly vulnerable to collapsing during solvent extraction. The relatively high particle to polymer loading achievable by the method described herein may reduce pore collapsing and yield a more uniform defect-free polymer matrix composite.

In some embodiments of polymer matrix composites made as described herein, the particles are present in a range from 1 to 99 (in some embodiments, in a range from 15 to 99, 25 to 98, 50 to 98, 75 to 98, or even 93 to 97), weight percent, based on the total weight of the polymer matrix composite (excluding any solvent), and may depend, for example, of the particular particles used.

The polymeric network structure may be described as a porous polymeric network or a porous phase separated polymeric network. Generally, the porous polymeric network (as-made) include an interconnected porous polymeric network structure comprising a plurality of interconnected morphologies (e.g., at least one of fibrils, nodules, nodes, open cells, closed cells, leafy laces, strands, nodes, spheres, or honeycombs). The interconnected polymeric structures may adhere directly to the surface of the particles and act as a binder for the particles. In this regard, the space between adjacent particles (e.g., particles or agglomerate particles) may include polymeric structures, as opposed to a solid matrix material, thereby providing desired porosity.

In some embodiments, the polymeric network structure may include a 3-dimensional reticular structure that includes an interconnected network of polymeric fibrils. In some embodiments, individual fibrils have an average width in a range from 10 nm to 100 nm (in some embodiments, in a range from 100 nm to 500 nm, or even 500 nm to 5 micrometers).

In some embodiments, the particles are dispersed within the polymeric network structure, such that an external surface of the individual units of the particles (e.g., individual particles or individual agglomerate particles) is mostly uncontacted, or uncoated, by the polymeric network structure. In this regard, in some embodiments, the average percent areal coverage of the polymeric network structure on the external surface of the individual particles (i.e., the percent of the external surface area that is in direct contact with the polymeric network structure) is not greater than 50 (in some embodiments, not greater than 40, 30, 25, 20, 10, 5, or even not greater than 1) percent, based on the total surface area of the external surfaces of the individual particles.

In some embodiments, the polymeric network structure does not penetrate internal porosity or internal surface area of the individual particles (e.g., individual particles or individual agglomerate particles) is mostly uncontacted, or uncoated, by the polymeric network structure.

Exemplary particles include acoustically active particles, soft magnetic particles, thermally conductive particles, thermally insulating particles, intumescent particles, functional particles, dielectric particles, indicator particles, polar solvent soluble particles, polar solvent swellable particles, or endothermic particles.

Acoustically Active Particles

"Acoustically active particles," as used herein, refer to the ability of a material to interact with a time-varying pressure wave (e.g., acoustic wave) impinging upon it or propagating through it to cause changes in wave properties (e.g., frequency, wavelength, amplitude, velocity), which is manifested in a change in resonance frequency and/or sound pressure level output of a sound-producing device (e.g., loudspeaker) containing said material. The changes may be measured according to the test methods herein respectively entitled "Impedance Test" (see Examples, below) and "Sound Pressure Level (SPL) Test" (see Examples, below). As used herein, an "acoustically active" material is a material that, in accordance with the Impedance Test or the Sound Pressure Level (SPL) Test, reduces the resonance frequency ($F_O$) of a loudspeaker system with a 1 $cm^3$ back volume by at least 10 Hz or improves the sound pressure level (SPL) of a loudspeaker system with a 1 $cm^3$ back volume by at least 0.1 dB averaged over the frequency range from 200 to 500 Hz.

In some embodiments, the acoustically active particles are present in polymeric matrix composites in a range from 50 to 99 (in some embodiments, in a range from 70 to 98, 80 to 95, or even 94 to 98) weight percent, based on the total weight of the acoustically active particles and the polymer (excluding any solvent).

Exemplary acoustically active particles include molecular sieves, fullerenes, and carbon nanotubes, and particles comprising metal oxides (e.g., silica ($SiO_2$), alumina ($Al_2O_3$), zirconia ($ZrO_3$), magnesia (MgO), and iron oxide black ($Fe_3O_4$)). In some embodiments, the acoustically active materials can have a composition that is free of or substantially free of zeolites and activated carbon.

In some embodiments, the acoustically active material may have an internal porosity. As used herein, "internal porosity" may refer to continuous or discontinuous void volume(s) within the acoustically active material particles or agglomerates of acoustically active materials. The void volume(s) may intersect the surface of the acoustically active material particles or agglomerates of acoustically active material particles or may be fully contained within the acoustically active material particles or agglomerates of acoustically active material particles. The void volume(s) may be filled with air or another gas or mixture of gases, at atmospheric pressure, a pressure below atmospheric pressure, or a pressure above atmospheric pressure. In some embodiments, the acoustically active materials may have average pore sizes ranging from between 1 nm and 100 micrometers. In some embodiments, the pore size of the active material may have a bimodal distribution, with small pores in a range from 1 to 100 nanometers and large inter-particles pores in a range from 100 nanometers to 100 micrometers. Conventional pore size analysis techniques, including imaging of cross-sections (e.g., optical microscopy, scanning electron microscopy or atomic force microscopy) and analysis of the image using appropriate software, for example ImageJ software (an open source software, available, for example, on-line at http://imagej.net) may be used to statistically analyze the pore size and pore size distribution. X-ray microtomography and mercury porosimetry may also be used to analyze the pore size and/or pore size distribution. In some embodiments, the acoustically active material can have a specific surface area greater than 50 (in some embodiments, greater than 500; in some embodiments in a range from 50 to 1000, 300 to 1000, 500 to 1000, or even 300 to 500) m$^2$/g. Conventional specific surface area analysis techniques, including Brunauer-Emmett-Teller (BET) surface area or oil absorption may be used to statistically analyze the specific surface area.

In some embodiments, the acoustically active material is hydrophobic. The material may be surface treated or modified to impart hydrophobicity to otherwise hydrophilic materials. In some embodiments, the surface treatment includes a silane or fluorine-based surface treatment. In some embodiments, the hydrophobic surface treatment is applied in a concentration which minimizes consumption of active surface sites while still imparting hydrophobicity. In some embodiments, the hydrophobic surface treatment is attached to in a range from 0.1 to 10 (in some embodiments, in a range from 0.1 to 5, 0.1 to 3, or even 0.5 to 3) percent of active surface sites, based on the total number of active surface sites calculated according to theoretical distribution of said surface sites and measured surface area or measured by techniques such as $O_2$ chemisorption, absorption of alcohols, or similar techniques known to those skilled in the art. As used herein, the term "active surface sites" refers to chemical sites on the surface of the acoustically active material available to ionically or covalently bond to modifying chemistry (e.g., lone oxygen atoms).

In some embodiments, the acoustically active material may be electrically insulating (i.e., with a resistivity of at least $1\times10^{10}$ Ω·m).

In some embodiments, the acoustically active particles have an average particle size (average length of longest dimension) in a range from 100 nm to 20 micrometers (in some embodiments, in a range from 500 nm to 10 micrometers, 100 nm to 2 micrometers, 500 nm to 2 micrometers, 1 micrometer to 10 micrometers, or even 1 micrometer to 5 micrometers). In some embodiments, the acoustically active materials can be in the form of agglomerate particles comprised of a plurality of smaller particles bound together by, for example, cohesive forces, inorganic binders, or organic binders.

Polymer matrix composites comprising acoustically active particles are useful, for example, in electronic devices (e.g., mobile phones, tablets, and laptops) as part of an acoustic device (e.g., a speaker or a microphone). Embodiments of polymer matrix composites are capable of lowering a resonant frequency of the cavity when the resonant frequency is in a range, for example, from about 50 Hz to about 1500 Hz. In some embodiments, the polymer matrix composites can be present in the cavity in the form of, for example, a film or a mat that can be electrically insulative and hydrophobic. The polymer matrix composites can also be used as an acoustically active material in, for example, medical devices, automobile devices, and communication devices such as headsets, and audio-video devices. For further details, see, for example, provisional application having U.S. Ser. No. 62/519,560, filed Jun. 14, 2017, the disclosure of which is incorporated herein by reference.

Soft Ferromagnetic Particles

"Soft ferromagnetic particles," as used herein, refer to magnetic field directional materials. The term "soft" in describing the ferromagnetic particulate material has its traditional meaning in the art, and relates to the ability of a non-magnetic material to become magnetic, when placed within a magnetic field (e.g., a weak magnetic field). The induced magnetism of the soft, ferromagnetic particulate material, will substantially vanish when the magnetic field is removed (i.e., the material exhibits reversible magnetism in an applied magnetic field). In some embodiments, the coercivity, Hc, of the soft magnetic particulate material is not greater than 1000 A/m (in some embodiments, in a range from 1 to 1000 (in some embodiments, in a range from 10 to 1000, or even 30 to 1000)) A/m. Soft ferromagnetic materials may have narrow hysteresis loops (i.e., the low values of coercivity as indicated above along with high magnetic saturation inductions in excess of 300 mT (in some embodiments 500 mT, or even 1.0 T), high permeability greater than 100 $\mu_0$ (in some embodiments, greater than 1000 $\mu_0$, or even 10,000 $\mu_0$), where $\mu_0$=the permeability of vacuum, $4\pi\times10^{-7}$ H/m and, with a conductivity sufficiently low for acceptable penetration of the applied fields into the soft ferromagnetic particles at the frequency of operation. This allowable maximum level of conductivity depends the skin depth of the radiation in the particle, which should in most cases be less than about two times the thickness of the soft, ferromagnetic particle. The skin depth, δ, in meters can be calculated from (using all MKS units, and with σ equal to the conductivity of the flake in Siemens/m)

$$\delta = \sqrt{1/\pi\mu\sigma f}$$

In some embodiments, the soft, ferromagnetic particles are present in polymeric matrix composites in a range from 50 to 99 (in some embodiments, in a range from 70 to 98, 80 to 95, or even 94 to 98) weight percent, based on the total weight of the soft, ferromagnetic particles and the polymer (excluding any solvent).

In some embodiments, the soft, ferromagnetic particulate material includes at least one of iron an Fe—Cr alloy, an Fe—Si alloy (e.g., Fe—Si—Al (available, for example, under the trade designation "SENDUST" from TianJin Ecotech Trade Co., Ltd., Tianjin, China), and an Fe—Si—Cr,), an FeCoB, an Fe-based amorphous alloy, a nanocrystalline Fe-based oxide, a nanocrystalline Fe-based nitride, a nickel-based alloy, (e.g., a Ni—Fe alloy and a Ni—Si alloy), a CoNbZr, or a boron-based amorphous alloy.

In some embodiments, the soft, ferromagnetic particulate material is in the shape of a flake. A flake may be considered an irregularly shaped, plate-like structure, having a first and second major surface and a thickness, substantially normal to at least one of the first and second major surfaces. In some embodiments, the soft, ferromagnetic particulate material is a soft, ferromagnetic particulate flake material, wherein each flake has a first major surface and a maximum thickness, T, normal to the first major surface of the flake. In some embodiments, a soft, ferromagnetic particulate flake material may be characterized by a median diameter, $D_{50}$ (which relates to a length dimension, L) and a maximum thickness, T. In some embodiments, the soft, ferromagnetic particulate material may be an anisotropic, soft, ferromagnetic particulate material. The aspect ratio of an anisotropic soft, ferromagnetic particulate may be defined as the median diameter, $D_{50}$, as determined by particle size analysis, for example, divided by the maximum thickness of the anisotropic particulate, as determined from image analysis for example. For a particular set of soft, ferromagnetic particulate material, the value of the maximum thickness may be taken as the median value, $T_m$. The ratio $D_{50}:T_m$ is the median aspect ratio. In some embodiments, the median aspect ratio, $D_{50}:T_m$, is in a range from 5:1 to 1000:1 (in some embodiments, in a range from 10:1 to 1000:1, 20:1 to 1000:1, 5:1 to 500:1, 10:1 to 500:1, 20:1 to 500:1, 5:1 to 200:1, 10:1 to 200:1, or even 20:1 to 200:1).

In some embodiments, the image length of a flake, Li, as observed and measured in a cross-sectional image of the polymer composite, may be taken as the length of the flake, and the image thickness of a flake, Ti, may be taken as the largest thickness of a flake, as observed and measured in a cross-sectional image of the polymer composite. The image may be, for example, an optical micrograph or a scanning electron micrograph (SEM). For a particular set of soft, ferromagnetic particulate flakes, the values of Li and Ti may be taken as average values, Lia (average image length) and Tia (average image thickness), of a subset of flakes using standard statistical analysis methods. In some embodiments, Lia/Tia is in a range from 5:1 to 1000:1, 10:1 to 1000:1, 20:1 to 1000:1, 5:1 to 500:1, 10:1 to 500:1, 20:1 to 500:1, 5:1 to 200:1, 10:1 to 200:1, or even 20:1 to 200:1.

In some embodiments, $D_{50}$ is in a range from 5 to 5000 (in some embodiments, in a range from 5 to 1000, 5 to 500, 5 to 200, 10 to 5000, 10 to 1000, 10 to 500, 10 to 200, 25 to 5000, 25 to 1000, 25 to 500 or even 25 to 200) micrometers.

In some embodiments, the flakes of the soft, ferromagnetic particulate flake material have a median diameter, $D_{50}$, and the thermoplastic polymer, network structure has an average pore size, P, and $D_{50}>2P$. In some embodiments, $D_{50}$ is in range from 25 micrometers to 5000 micrometers, P is between 50 nanometers to 25 micrometers, and $D_{50}>2P$ (in some embodiments, $D_{50}$ is in range from 10 micrometers to 5000 micrometers, P is in range from 50 nanometers to 25 micrometers and $D_{50}>2P$; $D_{50}$ is in range from 25 micrometers to 5000 micrometers, P is in range from 50 nanometers to 25 micrometers, and $D_{50}>4P$; $D_{50}$ is in range from 10 micrometers to 5000 micrometers, P is in range from 50 nanometers to 25 micrometers, and $D_{50}>4P$; $D_{50}$ is in range from 25 micrometers to 5000 micrometers, P is in range from 50 nanometers to 25 micrometers, and $D_{50}>6P$, or even $D_{50}$ is in range from 10 micrometers to 5000 micrometers, P is in range from 50 nanometers to 25 micrometers, and $D_{50}>6P$).

Polymer matrix composites comprising soft magnetic particles are useful, for example, for wireless power changing applications or any other electronic application where a magnetic field is needed to be directed or kept away from sensitive electronic components and batteries. For further details, see, for example, application having U.S. Ser. No. 15/382,834, filed Dec. 19, 2016, U.S. Pat. Pub. No. 2018/0174723, published Jun. 21, 2018, the disclosure of which is incorporated herein by reference.

Thermally Conductive Particles

"Thermally conductive particles," as used herein, refer to particles having a thermal conductivity greater than 2 W/(m*K). In some embodiments, the thermally conductive particles are present in polymeric matrix composites in a range from 15 to 99 (in some embodiments, in a range from 25 to 98, 50 to 98, 75 to 98, or even 93 to 97) weight percent, based on the weight of the thermally conductive particles and the polymer (excluding any solvent).

Exemplary thermally conductive particles include metals, semiconductors, and ceramics. Exemplary thermally conductive particles comprise at least one of aluminum, copper, silver, graphite, diamond, SiC, $Si_3N_4$, AlN, BeO, MgO, $Al_2O_3$, aluminum hydroxide, aluminum oxyhydroxide, hexagonal boron nitride (h-BN), cubic boron nitride (c-BN), ZnO, natural aluminosilicate, or synthetic aluminosilicate.

Exemplary sizes of the thermally conductive particles range from 100s of nanometers to 100s of micrometers in size. Exemplary shapes of the thermally conductive particles include irregular, platy, acicular, spherical shapes, and as well as agglomerated forms. Agglomerates can range in size, for example, from a few micrometers up to, and including, a few millimeters. The particles can be mixed to have multimodal size distributions which may, for example, allow for optimal packing density.

In some embodiments, the thermally conductive particles comprise electrically non-conductive particles (e.g., ceramic particles comprising boron nitride, aluminum trihydrate, silica carbide, and metal oxides (e.g., aluminum oxide and iron oxide)).

In some embodiments, the thermally conductive particles comprise electrically conductive particles (e.g., metal particles comprising aluminum, copper, nickel, and gold).

In some embodiments, the thermally conductive particles have an average particle size (average length of longest dimension) in a range from 100 nm to 2 mm (in some embodiments, in a range from 200 nm to 1000 nm).

In some embodiments, the thermally conductive particles have bimodal or trimodal distribution. Multimodal distributions of particles can allow for higher packing efficiency, improved particle-to-particle contact and thereby improved thermal conductivity.

As-made polymer matrix composites comprising thermally conductive particles (i.e., prior to any compression or other post formation densification), typically have a density of at least 0.3 (in some embodiments, at least 0.4, 0.5, 1, 2, 3, or even at least 4; in some embodiments, in a range from 0.3 to 7, 1 to 6, 2 to 5, or even 3 to 4) $g/cm^3$.

In some embodiments, the thermal conductivity of the polymer matrix composites comprising thermally conductive particles is improved by compressing the polymer matrix composites thereby increasing the density of the polymer matrix composite. In some embodiments, the compression can take place at elevated temperatures (e.g., above the glass transition temperature of the polymer matrix, or even, in some embodiments, above the melting point of the polymer matrix). In some embodiments, compressed polymer matrix composites have a density of at least 1 (in some embodiments, at least 2, 3, 4, 5, 6, 7, 8, 9, or even at least 10; in some embodiments, in the range from 1 to 10, 1 to 9, 3 to 8, or even 4 to 7) $g/cm^3$.

In some embodiments, the thermal conductivity of the polymer matrix composites comprising thermally conductive particles is improved by compressing the polymer matrix composite thereby increasing the density of the polymer matrix composite. In some embodiments, the compression can take place at elevated temperatures (e.g., above the glass transition temperature of the polymer matrix, or even, in some embodiments, above the melting point of the polymer matrix). In some embodiments, compressed polymer matrix composites have a density of at least 1 (in some embodiments, at least 2, 3, 4, 5, 6, 7, 8, 9, or even at least 10; in some embodiments, in the range from 1 to 10, 1 to 9, 3 to 8, or even 4 to 7) g/cm$^3$.

In some embodiments, polymer matrix composites comprising thermally conductive particles have a porosity less than 80 (in some embodiments, in a range from 0 to 80, 0 to 70, 0 to 60, 10 to 80, 10 to 70, 10 to 60, 10 to 50, 10 to 40, 10 to 30, or even 5 to 20) percent.

In some embodiments, polymer matrix composites comprising thermally conductive particles, are in the form of a layer having a thickness in a range from 50 to 7000 micrometers, wherein the thickness excludes the height of any protrusions extending from the base of the layer.

In some embodiments, the density of the compressed polymer matrix composite comprising thermally conductive particles is at least 1 (in some embodiments, at least 2, 3, 4, 5, 6, 7, 8, 9, or even at least 10; in some embodiments, in the range from 1 to 10, 1 to 9, 3 to 8, or even 4 to 7) g/cm$^3$ after compression.

In some embodiments, compressing the polymeric matrix composite comprising thermally conductive particles increases its density, and thermal conductivity by increasing the particle-to-particle contact. If using conductive particles such as copper, the increased particle-to-particle contact can be measured by decreased electrical resistance as a function of increasing compression. In some embodiments, the electrical resistance of an uncompressed polymeric matrix composite is in a range from 14 mega-ohms to at least 100 mega-ohms. In some embodiments, the electrical resistance of a compressed polymeric matrix composite is in a range from 0.5 to 13,000 ohms. In some embodiments, compressing the polymeric matrix composite decreases its electrical resistance (in some embodiments, at least 8×10$^9$ percent (in some embodiments, 2.5×10$^9$) percent).

Compression increases density, which inherently reduces the insulating air volume (or porosity) of the polymer matrix composite comprising thermally conductive particles which will therefore increase the thermal conductivity. Likewise, the increased particle-to-particle contact with thermally conductive particles can be measured by increased thermal conductivity.

In some embodiments, the through-plane thermal conductivity of an uncompressed polymer matrix comprising thermally conductive particles is in the range from 0.2 to 0.8 W/(m*K) and the in-plane thermal conductivity is 0.73 to 2.5 W/(m*K). In some embodiments, the thermal conductivity of a compressed polymeric matrix composite is in a range from 0.4 to 11.4 W/(m*K) through-plane; 0.87 to 74 W/(m*K)–in-plane.

In some embodiments, compressing the polymeric matrix composite comprising thermally conductive particles increases its thermal conductivity at least 25 (in some embodiments, at least 100, 1000, 2000, 3000, or even at least 3500) percent in the through-plane and at least 84 (in some embodiments, at least 1000, 2000, 3000, 4000, 5000, or even at least 5400) percent in the in-plane.

Polymer matrix composites comprising thermally conductive particles are useful, for example, as thermal interface materials (e.g., heat conductors in, electronic devices (e.g., batteries, motors, refrigerators, circuit boards, solar cells, and heaters)). For further details on polymer matrix composites comprising thermally conductive particles made by processes described herein, also see co-pending application having U.S. Provisional Pat. App. No. 62/587031, filed Nov. 16, 2017, the disclosure of which is incorporated herein by reference.

Thermally Insulating Particles

"Thermally insulating particles," as used herein, refer to particles having a thermal conductivity not greater than 0.1 W/(m*K). In some embodiments, the thermally insulating particles are present in polymeric matrix composites in a range from 15 to 99 (in some embodiments, in a range from 5 to 98, 50 to 98, 75 to 98, or even 84 to 91) weight percent, based on the total weight of the thermally insulating particles and the polymer (excluding any solvent).

Exemplary thermally insulating particles include ceramics (including glasses, crystalline ceramics, and glass-ceramics), polymers, and metals. Exemplary thermally insulating particles comprise at least one of ceramics (e.g., glass bubbles), vermiculite, perlite, celite, aerogels, or polymers.

Exemplary sizes of the thermally insulating particles range from 100s of nanometers to 1000s of micrometers in size. Exemplary shapes of the thermally insulating particles include irregular, platy, acicular, spherical shapes, and as well as agglomerated forms. Agglomerates can range in size, for example, from a few micrometers up to and including a few millimeters. In some embodiments, the thermally insulating particles are in the form of hollow, bubbles, or porous material to entrap more air to provide better insulation.

In some embodiments, the thermally insulating particles have an average particle size (average length of longest dimension) in a range from 100 nm to 2 mm (in some embodiments, in a range from 15 micrometers to 125 micrometers, or even 30 micrometers to 60 micrometers).

In some embodiments, polymer matrix composites comprising thermally insulating particles have a porosity of at least 25 (in some embodiments, in a range from 25 to 50, 30 to 60, or even 40 to 90) percent.

In some embodiments, polymer matrix composites comprising thermally insulating particles, are in the form of a layer having a thickness in a range from 50 to 7000 micrometers, wherein the thickness excludes the height of any protrusions extending from the base of the layer.

Polymer matrix composites comprising thermally insulating particles are useful, for example, in jackets, refrigerators, and pipe coatings. For further details on polymer matrix composites comprising thermally insulating particles made by processes described herein, also see co-pending application having U.S. Provisional Pat. App. No. 62/587035, filed Nov. 16, 2017, the disclosure of which is incorporated herein by reference.

Intumescent Particles

"Intumescent particles," as used herein, refer to particles that swell when exposed to heat. The result of exposure to heat is an increase in particle volume and a decrease in particle density. The change in particle volume and density can be tested in accordance of ASTM standard E2786 (2015), the disclosure of which is incorporated herein by reference.

In some embodiments, the intumescent particles are present in polymeric matrix composites in a range from 15 to 99 (in some embodiments, in a range from 25 to 98, 50 to 98, 75 to 98, or even 93 to 97) weight percent, based on the total weight of the intumescent particles and the polymer (excluding any solvent).

Intumescent particles can take the form of at least one of polymeric or inorganic material that is capable of significantly increasing in volume as a result of exposure to heat above their activation temperature. Exemplary intumescent particles comprise at least one of sodium silicate, intercalated graphite, aluminum hydroxide, magnesium hydroxide, ammonium polyphosphate, clay, or vermiculite.

The selection of intumescent particles may vary depending, for example, on the desired end use. For example, for temperatures about 500° C., unexpanded vermiculite materials are desirable because they typically start to expand at a temperature in a range from about 300 to about 340° C. to fill, for example, the expanding gap between an expanding metal housing and a monolith in a catalytic converter. For use below about 500° C. (e.g., in diesel monoliths or particulate filters), expandable graphite or a mixture of expandable graphite and unexpanded vermiculite materials may be desired since expandable graphite typically starts to expand or intumesce at about 210° C. Treated vermiculites are also useful and typically expand at a temperature of about 290° C.

Useful intumescent materials also include unexpanded vermiculite ore, treated unexpanded vermiculite ore, partially dehydrated vermiculite ore, expandable graphite (e.g., expandable graphite flakes available, for example, under the trade designation "GRAFOIL GRADE 338-50" from UCAR Carbon Co., Inc., Cleveland, Ohio), mixtures of expandable graphite with treated and/or untreated unexpanded vermiculite ore, processed expandable sodium silicate (e.g., an insoluble sodium silicate available, for example, under the trade designation "EXPANTROL" from 3M Company, St. Paul, Minn.), and mixtures thereof.

Treated unexpanded vermiculite flakes or ore include unexpanded vermiculite treated by processes such as by being ion exchanged with ion exchange salts (e.g., ammonium dihydrogen phosphate, ammonium nitrate, ammonium chloride, potassium chloride, and other suitable compounds as is known in the art).

The amount and type of intumescent material incorporated into the polymer matrix composite may contribute significantly to the cost of the product. Untreated intumescent materials, such as unexpanded vermiculite, are generally less expensive than treated intumescent materials, but may provide different intumescing temperatures and amounts and rates of expansion.

In some embodiments, the intumescent particles have a layered structure that allows for easy exfoliation. Within the individual layers of the particle, fluids (e.g., sulfuric acid) may be introduced and held tightly to the surface of the layer (intercalated). When such material is exposed to heat the fluid held within the layers expands. The expansion of the fluid pushes against the individual layer, separating them apart further (exfoliation). An observed result of this behavior is the bulk film expanding in volume. The degree of expansion, and the temperature at which expansion takes place, is dependent, for example, on the type of fluid intercalated into the layers.

In some embodiments, the intumescent material is particulate that is primarily a solid phase that transitions to include both a solid and a gas phase. For example, an intumescent particle can contain surface adsorbed species that volatilize when heated. Examples of such particles include those associated with water (e.g., calcium sulfate dehydrate). When this type of material is heated, some of the water molecules associated with the surface of the particle change from an adsorbed species to a vapor phase. The release of the adsorbed species results in a volume change of the of the polymer matrix composites comprising the particles. The generated vapor pushes against the surrounding matrix, causing the structure to increase in volume.

In some embodiments, the intumescent particles comprise first and second, different (i.e., different activation temperatures, composition, and/or microstructure) intumescent particles. In some embodiments, the first intumescent particles comprise at least one of sodium silicate, intercalated graphite, aluminum hydroxide, magnesium hydroxide, ammonium polyphosphate, clay, or vermiculite. In some embodiments, the second intumescent particles comprise at least one of sodium silicate, intercalated graphite, aluminum hydroxide, magnesium hydroxide, ammonium polyphosphate, clay, or vermiculite. Combining two different intumescent particle types may provide a broader thermal activation range and enable more expansion, with lower onset temperatures.

In some embodiments, the first intumescent particles have an average particle size (average length of longest dimension) in a range from 500 nm to 7000 micrometers (in some embodiments, in a range from 70 micrometers to 300 micrometers, 300 micrometers to 800 micrometers, 800 micrometers to 1500 micrometers, or even 1500 micrometers to 7000 micrometers). In some embodiments, the second intumescent particles have an average particle size (average length of longest dimension) in a range from 500 nm to 1500 micrometers (in some embodiments, in a range from 70 micrometers to 300 micrometers, 300 micrometers to 800 micrometers, or even 1500 micrometers to 7000 micrometers).

In some embodiments, the first intumescent particles are present in a range from 15 to 99 (in some embodiments, in a range from 25 to 98, 50 to 98, 75 to 98, or even 93 to 97) weight percent, and the second intumescent particles are present in a range from 15 to 99 (in some embodiments, in a range from 25 to 98, 50 to 98, 75 to 98, or even 93 to 97) weight percent, based on the total weight of the first and second intumescent particles.

Exemplary sizes of the intumescent particles range from 100s of nanometers to 1000s of micrometers in size. Exemplary shapes of the intumescent particles include irregular, and platy, shapes, and as well as agglomerated forms. Agglomerates can range in size, for example, from a few micrometers up to and including several millimeters. The particles can be mixed to have multimodal size distributions which may, for example, allow for optimal packing density.

As-made polymer matrix composites comprising intumescent particles (i.e., prior to any compression or other post formation densification), typically have a density of at least 0.3 (in some embodiments, in a range from 0.3 to 2.3, 0.3 to 2.1, 0.3 to 1.5, or even 0.3 to 1) g/cm$^3$.

In some embodiments, compressed polymer matrix composites comprising intumescent particles have a density of at least 0.3 (in some embodiments, in a range from 0.3 to 2.3, 0.3 to 2.1, 0.3 to 1.5, or even 0.3 to 1) g/cm$^3$.

In some embodiments, polymer matrix composites comprising intumescent particles have a porosity of at least 5 (in some embodiments, in a range from 10 to 80, 20 to 70, or even 30 to 60) percent.

In some embodiments, polymer matrix composites comprising intumescent particles, are in the form of a layer having a thickness in a range from 50 to 11000 micrometers, wherein the thickness excludes the height of any protrusions extending from the base of the layer.

Polymer matrix composites comprising intumescent particles are useful, for example, as fillers, thermally activated fuses, and fire stop devices. For further details of fire stop devices in general, see, for example, U.S. Pat. No. 6,820,382 (Chambers et al.), the disclosure of which is incorporated herein by reference. For further details of fillers in general, see, for example, U.S. Pat. No. 6,458,418 (Langer et al.) and U.S. Pat. No. 8,080,210 (Hornback, III), the disclosure of which is incorporated herein by reference. For further details on polymer matrix composites comprising intumescent particles made by processes described herein, also see co-pending application having U.S. Provisional Pat. App. No. 62/587039, filed Nov. 16, 2017, the disclosure of which is incorporated herein by reference.

Functional Particles

"Functional particles," as used herein, refer to particles comprising at least one functional group G capable of providing at least one of an absorbing, adsorbing, complexing, catalyzing, separating, or reagent function to the particle.

Functional particles, by virtue of the presence of a functional group(s) G, are capable of interacting with target species present within a fluid or gas that they are contacted with. The particles may be organic or inorganic, porous or nonporous, and spherical or non-spherical, or a combination(s) thereof depending on the end use "function" for which they are intended. The particles are typically polymeric, although not necessarily so (e.g., they may be metal or glass). The functional group(s) G may be directly attached to the particle surface or may be attached to a linker group which in turn is attached to the particle. Group(s) G may be incorporated into the particle during its synthesis, or may be attached to the particle after its preparation, by a variety of methods that are well known in the art.

In some embodiments, the functional particles are present in polymeric matrix composites in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the functional particles and the polymer (excluding any solvent).

Exemplary functional particles include chromatographic particles (e.g., those that are useful for the purification of chemical or biological species). Exemplary chromatographic particles include organic and inorganic particles that comprise functional groups that can be used for ion exchange, affinity, reversed-phase, normal phase, size exclusion, multi-modal, hydrophobic interaction, metal affinity, metal chelate, and chiral separations. Exemplary functional particles, including chromatographic particles, are available, for example, from Bio-Rad, Hercules, Calif. (e.g., under trade designations "UNOSPHERE," "AFFIGEL," "AFFI-PREP," "MACRO-PREP," "CFT," and "CHT"); GE Healthcare, Pittsburgh, Pa. (e.g., under trade designations "CAPTO," "HITRAP," "MAB SELECT," "SEPHACRYL," "SEPHADEX," "SEPHAROSE," "SUPERDEX," and "SUPEROSE"); Millipore Sigma, St. Louis, Mo., (e.g., under trade designations "ESHMUNO," "PROSEP," "FRACTOGEL," "PHARMPREP," "LICHROPREP," and "FLORISIL," as well as standard silica gel and alumina particles); Tosoh Biosciences, Tokyo, Japan (e.g., under trade designations "TSKGEL" and "TOYOPEARL"); Pall, Port Washington, N.Y. (e.g., under trade designations "HYPERD," "HYPERCEL," "KANEKA," "TRI-SACRYL", and "ULTRAGEL"); Mitsubishi Chemical Corporation, Tokyo, Japan (e.g., under the trade designation "DIAION"); and Thermo-Fisher, Waltham, Mass. (e.g., under trade designations "POROS," "CAPTURESELECT," and "ULTRALINK").

Chromatographic particles can also be made by techniques known in the art (see, e.g., U.S. Pat. No. 5,292,840 (Heilmann et al.), U.S. Pat. No. 6,379,952 (Rasmussen et al.), U.S. Pat. No. 7,674,835 (Rasmussen et al.), U.S. Pat. No. 7,674,836 (Rasmussen et al.), U.S. Pat. No. 8,367,198 (Wickert et al.), U.S. Pat. No. 8,592,493 (Shannon et al.), U.S. Pat. No. 8,710,111 (Wickert et al.), U.S. Pat. No. 9,018,267 (Shannon et al.), and U.S. Pat. No. 9,056,316 (Lawson et al.), the disclosures of which are incorporated herein by reference. Exemplary functional particles also include directly covalently reactive particles (see, e.g., U.S. Pat. No. 5,993,935 (Rasmussen et al.), the disclosure of which is incorporated herein by reference).

Exemplary functional particles also include water retentive zwitterionic gel electrolyte functionalized particles that are useful for antifouling applications. Functionalized particle can be grafted with both positive and negative charge species to form polyelectrolyte analytes.

Exemplary functional particles also include high surface area catalytic particles featuring deposited nanogold catalyst. Nanogold deposited on high surface area $TiO_2$ particles will catalyze carbon monoxide to carbon dioxide, hydrogen to water, and formaldehyde to carbon dioxide and water.

Exemplary functional particles also include low surface area catalytic particles featuring deposited nanogold catalyst that will preferentially oxidize carbon monoxide to carbon dioxide. Such selective reactions are useful for methanol reformation where it is desirable to oxidize the CO but not $H_2$ (e.g., for fuel cells) (see, e.g., U.S. Pat. No. 8,314,046 (Brady et al.) and U.S. Pat. No. 7,955,570 (Insley et al.), the disclosures of which are incorporated herein by reference).

Exemplary functional particles also include nanosilver or nanosilver coated particles that will have antimicrobial properties. They can also act as an indicator by turning black in the presence of hydrogen sulfide.

Other exemplary functional particles include guanidine-functional particles. Guanidine functional particles are useful for capturing biological species because they maintain ionic interactions even in the presence of high ionic strength. Useful guanidine functional particles include those prepared from guanidine functional silanes (see, e.g., U.S. Pat. No. 9,657,038 (Griesgraber et al U.S. Pat. Pub. No. 2018/0038862 (Kshirsagar et al.), published Feb. 8, 2018, and those prepared by crosslinking guanidine functional polyethyleneimine G-PEI (see, e.g., U.S. Pat. Pub. No. 2017/0049926 (Langer-Anderson et al.)), the disclosures of which are incorporated by reference).

In those embodiments in which the functional particles are porous, it may be advantageous to use particles with an average particle size in the 1 to 20 micrometers size range, as this tends to shorten the residence time needed for target species to diffuse into contact with functional groups G.

Exemplary sizes of the functional particles range from 100s of nanometers to 100s of micrometers in size. Exemplary shapes of the functional particles include irregular, platy, acicular, and spherical shapes, as well as agglomerated forms. Agglomerates can range in size, for example, from a few micrometers up to and including a few millimeters.

In some embodiments, the functional particles have an average particle size in a range (average length of longest dimension) from 0.1 to 5000 (in some embodiments, in a range from 1 to 500, 1 to 120, 40 to 200, or even 5 to 60) micrometers. Particles that have internal porosity can be very desirable because of the increased surface area and potential for more active G moieties for purification. Examples of such large pore macro particles include those described, for example, in U.S. Pat. No. 6,423,666 (Liao et al.). Capacity can be determined by measuring the amount of a charged material that can be adsorbed on the ion exchange particles. An advantage of using large pore macro particles may be higher flux and reduced dwell time during filtration.

In some embodiments, the functional particles comprise first and second, different functional particles (i.e., hydrophobic interaction or cationic or anionic or affinity) creating a mixed mode separation media. In some embodiments, the first functional particles comprise a coating or particle derived from an amino (meth)acrylate monomer or a derivative thereof, and the second functional particles comprise hydrophobic functionality as found with amino acids of tryptophan, phenylalanine, and leucine. In some embodiments, the first functional particles comprise anion exchange particles, and the second functional particles comprise cation exchange particles. In some embodiments, the mixed mode functionality can be coated or polymerized on the same particle. In some embodiments, ionic monomers comprising a weak base, a strong base, a salt of a weak base, a salt of a strong base, or combinations thereof can be used in the preparation of ion exchange particles. Mixed mode media can sometimes provide increased retention or separation ability for target species over media with only one mode of interaction. More than one different functional particle may sometimes be used for the interaction with two or more different target species at the same time.

In some embodiments, the first functional particles have an average particle size (average length of longest dimension) in a range from 0.1 to 5000 (in some embodiments, in a range from 1 to 500, 1 to 120, 40 to 200, or even 5 to 60) micrometers and the second functional particles have an average particle size (average length of longest dimension) in a range from 0.1 to 5000 (in some embodiments, in a range from 1 to 500, 1 to 120, 40 to 200, or even 5 to 60) micrometers.

In some embodiments, the first functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, and the second functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the first and second functional particles.

In some embodiments, polymer matrix composites comprising functional particles further comprise nonfunctional particles (i.e., not functional particles). In some embodiments, the nonfunctional particles comprise polyamide particles (available, for example, under the trade designation "ORGASOL" from Arkema, Inc., King of Prussia, Pa.) to be used as spacers to prevent pore collapse from the heating or drying steps with particles that are sensitive to hydrocarbon diluent or heat needed to dissolve the polymeric binder. The nonfunctional particles typically do not participate in removing target moieties from at least one of a fluid or gas stream.

In some embodiments, the nonfunctional particles have an average particle size (average length of longest dimension) in a range from 0.1 to 5000 (in some embodiments, in a range from 1 to 500, 1 to 120, 40 to 200, or even 5 to 60) micrometers.

In some embodiments, the nonfunctional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the functional particles in the polymer matrix composite.

In some embodiments, polymer matrix composites comprising functional particles, the polymer matrix composite has an air flow resistance at 25° C., as measured by the "Air Flow Resistance Test" described in the Examples, of less than 300 seconds/50 cm$^3$/500 micrometers (in some embodiments, less than 250 seconds/50 cm$^3$/500 micrometers, 200 seconds/50 cm$^3$/500 micrometers, 100 seconds/50 cm$^3$/500 micrometers, 50 seconds/50 cm$^3$/500 micrometers, 25 seconds/50 cm$^3$/500 micrometers, 20 seconds/50 cm$^3$/500 micrometers, 15 seconds/50 cm$^3$/500 micrometers, 10 seconds/50 cm$^3$/500 micrometers, or even less than 5 seconds/50 cm$^3$/500 micrometers).

In some embodiments, polymer matrix composites comprising functional particles have a density in a range of at least 0.1 (in some embodiments, at least 0.15, 0.2, 0.25, 0.5, or even at least 1; in some embodiments, in a range from 0.1 to 2, 0.1 to 1.5, 0.1 to 1, or even 0.1 to 0.5) g/cm$^3$.

In some embodiments, polymer matrix composites comprising functional particles have a porosity of at least 5 (in some embodiments, in a range from 5 to 90, 10 to 90, 20 to 80, or even 30 to 60) percent.

In some embodiments, polymer matrix composites comprising functional particles have a surface area of at least 1 (in some embodiments, at least 5, 10, 15, 20, 30, 40, or even at least 50; in some embodiments, in a range from 50 to 500, or even 200 to 800) m$^2$/g. An advantage of larger surface areas may be increased binding capacity. Exemplary particles with relatively large available surface area include those reported in U.S. Pat. No. 7,582,684 (Rasmussen et al.), the disclosure of which is incorporated herein by reference.

Polymer matrix composites comprising functional particles are useful, for example, as a filter or purification device (e.g., as absorbants, as adsorbants, as complexing agents, as enzyme or other protein bearing supports), or as chromatographic articles. Polymer matrix composites comprising functional particles may be reusable or disposable, depending on the particular application. For further details on polymer matrix composites comprising functional particles made by processes described herein, also see co-pending U.S. Provisional Pat. App. No. 62/587041, filed Nov. 16, 2017, the disclosure of which is incorporated herein by reference.

Dielectric Particles

"Dielectric particles," as used herein, refer to particles that have an intrinsic relative dielectric constant of 1.2 to 1800.

In some embodiments, the dielectric particles are present in polymer matrix composites in a range from 5 to 98 (in some embodiments, in a range from 10 to 98, 20 to 98, 25 to 98, 50 to 98, 75 to 98, 80 to 98, 90 to 98, or even 95 to 98) weight percent, based on the total weight of the dielectric particles and the polymer (excluding any solvent).

Exemplary dielectric particles include inorganic particles, or glass microspheres or bubbles coated with metals and metal oxides (in some embodiments coated with aluminum and aluminum oxide). Exemplary dielectric particles include inorganic (e.g., ceramic) dielectric particles comprise at least one of barium titanate, alumina, titania, or CaCu$_3$Ti$_4$O$_{12}$.

Exemplary sizes of the dielectric particles range from 10s of nanometers to 100s of micrometers in size. Exemplary shapes of the dielectric particles include irregular, platy, acicular, spherical shapes, and as well as agglomerated forms. Agglomerates can range in size, for example, from a few micrometers up to and including a few millimeters. The particles can be mixed to have multimodal size distributions which may, for example, allow for optimal packing density.

In some embodiments, the dielectric particles have an average particle size (average length of longest dimension) in a range from 10 nm to 120 micrometers (in some embodiments, in a range from 50 nm to 100 nm, 15 micrometers to 125 micrometers, or even 30 micrometers to 60 micrometers).

In some embodiments, the dielectric particles have bimodal or trimodal distribution. Multimodal distributions of particles can allow for higher packing efficiency, improved particle to particle contact.

Although not wanting to be bound by theory, it is believed that the effect of fillers on the relative dielectric constant of a polymer matrix may be predicted by the rule of mixtures (see, e.g., Materials Science and Polymers for Engineers, Oswald et al., pp. 494-496, 2012).

$$s_{\mathit{eff}} = s_m\left(1 - 3\phi \frac{s_m - s_p}{2s_m + s_p}\right)$$

where ø is the volume fraction of the dielectric particles in the matrix, $\varepsilon_{\mathit{eff}}$, $\varepsilon_m$, and $\varepsilon_p$ are the relative dielectric constants of polymer matrix composite, polymer matrix, and the dielectric particles, respectively.

As-made polymer matrix composites comprising dielectric particles (i.e., prior to any compression or other post formation densification) typically have a density of in a range from 0.05 to 6 (in some embodiments, in a range from 0.05 to 3, 0.05 to 2.5, 0.05 to 2, 0.05 to 1, or even 0.05 to 0.2) g/cm$^3$.

In some embodiments, compressed polymer matrix composites comprising dielectric particles have a density of at least 1 (in some embodiments, at least 4, or even at least 6; in some embodiments, in a range from 1 to 6, or even 4 to 6) g/cm$^3$.

In some embodiments, polymer matrix composites comprising dielectric particles have a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

Polymer matrix composites comprising dielectric particles are useful, for example, as electric field insulators. For further details on polymer matrix composites comprising dielectric particles made by processes described herein, also see co-pending application having U.S. Provisional Pat. App. No. 62/587045, filed Nov. 16, 2017, the disclosure of which is incorporated herein by reference.

Indicator Particles

"Indicator particles," as used herein, refer to particles which provide a detectible change in at least one of optical, ultraviolet (UV), infrared (IR), mechanical, chemical, or electrical properties after exposure to a stimulant (e.g., moisture, pH, proteins, temperature, pressure, or gases).

In some embodiments, the indicator particles are present in polymer matrix composites in a range from 1 to 99 (in some embodiments, in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the indicator particles and the polymer (excluding any solvent).

Exemplary indicator particles include color changing particles (e.g., phenolphthalein (pH indicator)), salts (e.g., cobalt chloride (moisture indicator) copper II sulfate (protein indicator), lead acetate (hydrogen sulfide gas detector)), metals (e.g., silver (hydrogen sulfide gas detector)), metal coated particles (e.g., silver coated particles (hydrogen sulfide gas detector)), zeolite, and activated carbon (chemical absorbing followed by analytical measurement using high performance liquid chromatography (HPLC), and gas chromatography (GC) for quantitation). The color change may be visible under ordinary visible light conditions or may be visible outside of visible light conditions, such as under UV conditions. For example, some color changing indicators cause florescence that is only visible under UV light.

Exemplary sizes of the indicator particles range from 100s of nanometers to 100s of micrometers in size. Exemplary shapes of the indicator particles include irregular, platy, acicular, spherical shapes, and as well as agglomerated forms. Agglomerates can range in size, for example, from a few micrometers up to and including a few millimeters.

In some embodiments, the indicator particles have an average particle size (average length of longest dimension) in a range from 1 to 5000 (in some embodiments, in a range from 5 to 100, 10 to 50, or even, 20 to 40) micrometers.

In some embodiments, the indicator particles comprise first and second, different (i.e., different compositions or microstructures, or particle sizes) indicator particles. Different indicator particles may be desired to allow a broader detection range for applications (e.g., measuring pH where it is desirable to have different color responses based on different pH ranges). In some embodiments, it is desirable for an indicator to respond to exposure from multiple analytes (e.g., organic vapors and acid gases for use as an end-of-service-life indicator for a respirator cartridge).

In some embodiments, the first indicator particles comprise color changing particles (e.g., phenolphthalein (pH indicator)), salts (e.g., cobalt chloride (moisture indicator), copper II sulfate (protein indicator)), lead acetate (hydrogen sulfide gas detector), metal (e.g., silver (hydrogen sulfide gas detector)), metal coated particles (e.g., silver coated particles (hydrogen sulfide gas detector)), zeolite, and activated carbon (chemical absorbing), and wherein the second indicator particles comprise color changing particles (e.g., phenolphthalein (pH indicator)), salts (e.g., cobalt chloride (moisture indicator), copper II sulfate (protein indicator)), metal (e.g., silver (hydrogen sulfide gas detector)), metal coated particles (e.g., silver coated particles (hydrogen sulfide gas detector), zeolite, and activated carbon (chemical absorbing)).

In some embodiments, the first indicator particles have an average particle size (average length of longest dimension) in a range from 1 to 5000 (in some embodiments, in a range from 5 to 100, 10 to 50, or even, 20 to 40) micrometers and the second indicator particles have an average particle size (average length of longest dimension) in a range from 1 to 5000 (in some embodiments, in a range from 5 to 100, 10 to 50, or even, 20 to 40) micrometers.

In some embodiments, the first indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent and the second indicator particles are present in a range from 99 to 1 (in some embodiments, in a range from 95 to 1, 90 to 1, 95 to 2, 90 to 2, 75 to 2, 50 to 2, 40 to 2, 30 to 2, 20 to 2, 10 to 2, 7 to 2, or even 5 to 2) weight percent, based on the total weight of the first and second indicator particles.

In some embodiments, polymer matrix composite comprising indicator particles further comprising nonindicator particles. In some embodiments, the nonindicator particles comprise at least one of inorganic or organic material which do not provide a detectible change after exposure. Nonindicator particles can be used as spacers to prevent pore collapse from the heating or drying steps. They can also be used to dilute the response of the indicator particles. They can also act as thickeners to increase viscosity during forming.

In some embodiments, the nonindicator particles have an average particle size (average length of longest dimension) in a range from 0.005 to 5000 (in some embodiments, in a range from 0.005 to 500, 0.1 to 200, or even 5 to 60) micrometers.

In some embodiments, the nonindicator particles are present in a weight fraction in a range from 1 to 99 (in some embodiments, in a range from 1 to 90, 1 to 50, 1 to 20, or even 1 to 10), based on the total weight of the polymer matrix composite.

As-made polymer matrix composites comprising indicator particles (i.e., prior to any compression or other post formation densification) typically have a density of in a range from 0.05 to 4 (in some embodiments, in a range from 0.05 to 3, 0.05 to 2.5, 0.05 to 2, 0.05 to 1, or even 0.05 to 0.2) g/cm$^3$.

In some embodiments, compressed polymer matrix composites comprising indicator particles have a density of at least 1 (in some embodiments, at least 4, or even at least 6; in some embodiments, in a range from 1 to 6, or even 4 to 6) g/cm$^3$.

In some embodiments, polymer matrix composites comprising indicator particles have a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

Polymer matrix composites comprising indicator particles are useful, for example, as sensors (e.g., end-of-service-life indicator for respirator cartridges, protein detection, pH measurement, pressure sensing, or moisture sensors)). For further details on polymer matrix composites comprising indicator particles made by processes described herein, also see co-pending U.S. Provisional Pat. App. No. 62/587046, filed Nov. 16, 2017, the disclosure of which is incorporated herein by reference.

Polar Solvent Soluble Particles and Polar Solvent Swellable Particles

"Soluble particles," as used herein, refer to particles that are fully soluble in water or at least form a hydrogel. The soluble particles also may be only partially soluble in water (i.e., at least 75 percent by weight soluble in water at 20° C.). "Swellable particles," as used herein, refer to particles that are crosslinked or form a hydrogel when exposed to water. For example, in deionized and distilled water, swellable particles may absorb up to 300 times its weight (from 30 to 60 times its own volume) and can become up to 99.9% liquid. In ionic solutions, the absorbency can drop to approximately 50 times its weight. The total absorbency and swelling capacity are controlled by the type and degree of cross-linkers used to make the gel. Low-density, cross-linked swellable particles generally have a higher absorbent capacity and swell to a larger degree. Highly density, cross-linked swellable polymer particles exhibit lower absorbent capacity and less swell, but the particle gel strength is firmer and can maintain particle shape even under modest pressure.

In some embodiments, some particles may not be soluble but become soluble with a change in temperature or pH. Some particles in the polymer matrix composite may also change solubility from ionic metathesis reactions, chemical reaction or contact with surfactants.

In some embodiments, nanoparticles may be released from a soluble or swellable particle containing nanoparticles even though the nanoparticle itself might not be soluble.

In some embodiments, the at least one of polar solvent soluble particles or polar solvent swellable particles are present in polymer matrix composite in a range from 1 to 99 (in some embodiments, in a range from 25 to 98, 50 to 98, 60 to 98, 70 to 98, 80 to 98, 93 to 98, or even 95 to 98) weight percent, based on the total weight of the at least one of soluble particles or soluble particles and the polymer (excluding any solvent).

Exemplary soluble particles include water soluble resins, salts, inorganic and organic materials. Exemplary soluble particles comprise at least one of an amino acid, a protein, a salt, a carbohydrate, a water-soluble polymer, a pharmaceutical, a fragrance, a dye, a vitamin, a fertilizer, a pesticide, a detergent, a lubricant, an absorbent (e.g., a super absorbent), a hydrogel, a coagulant, an antiseptic, a flocculant, a corrosion inhibitor, a nutrient, an acid, or a base.

Exemplary polar solvent swellable particles include absorbent and super absorbent polymers with various cross-linking density and salts. Exemplary polar solvent swellable particles comprise starch grafted copolymers of polyacrylonitrile, poly(acrylic acid), partial sodium salt-graft-poly (ethylene oxide), polyacrylamide copolymer, ethylene maleic anhydride copolymer, cross-linked carboxymethyl-cellulose, polyvinyl alcohol copolymers, cross-linked polyethylene oxide.

Exemplary sizes of the soluble particles or swellable particles range from 100s of nanometers to 100s of micrometers in size. Exemplary shapes of the soluble particles or swellable particles include irregular, platy, acicular, spherical shapes, and as well as agglomerated forms. Agglomerates can range in size, for example, from a few micrometers up to and including a few millimeters.

In some embodiments, the soluble particles or swellable particles have an average particle size (average length of longest dimension) in a range from 0.1 to 5000 (in some embodiments, in a range from 1 to 500, 1 to 120, 40 to 200, or even 5 to 60) micrometers.

In some embodiments, the at least one of soluble particles or swellable particles comprise first and second, different types (e.g., soluble salt and swellable hydrogel) particles. It can be advantageous to have more than one type of particle, for example, with a bandage one might desire having a swellable hydrogel particle to absorb body fluids and a second soluble particle, such as an antiseptic, to sterilize a wound.

In some embodiments, the first soluble particles comprise at least one of an amino acid, a protein, a salt, a carbohydrate, a water-soluble polymer, a pharmaceutical, a fragrance, a dye, a vitamin, a fertilizer, a pesticide, a detergent, a lubricant, an absorbent, a coagulant, a flocculant, a corrosion inhibitor, a nutrient, an acid, or a base, and the second, different soluble particles comprise at least one of an amino acid, a protein, a salt, a carbohydrate, a water-soluble polymer, a pharmaceutical, a fragrance, a dye, a vitamin, a fertilizer, a pesticide, a detergent, a lubricant, an absorbent, a coagulant, a flocculant, a corrosion inhibitor, a nutrient, an acid, or a base.

In some embodiments, the first swellable particles comprise at least one of an absorbent (e.g., a super absorbent) or a hydrogel, and the second, different swellable particles comprise at least one of an absorbent (e.g., a super absorbent) or a hydrogel.

In some embodiments, the first soluble particles comprise at least one of an amino acid, a protein, a salt, a carbohydrate, a water-soluble polymer, a pharmaceutical, a fragrance, a dye, a vitamin, a fertilizer, a pesticide, a detergent, a lubricant, an absorbent, a coagulant, a flocculant, a corrosion inhibitor, a nutrient, an acid, or a base, and the second swellable particles comprise at least one of an absorbent (e.g., a super absorbent), or a hydrogel.

In some embodiments, the first soluble particles or swellable particles have an average particle size (average length of longest dimension) in a range from 0.1 to 5000 (in some embodiments, in a range from 1 to 500, 1 to 120, 40 to 200, or even 5 to 60) micrometers and the second soluble particles or swellable particles have an average particle size (average length of longest dimension) in a range from 0.1 to 5000 (in some embodiments, in a range from 1 to 500, 1 to 120, 40 to 200, or even 5 to 60) micrometers.

In some embodiments, the first soluble particles are present in a range from 1 to 99 (in some embodiments, in a range from 25 to 98, 50 to 98, 60 to 98, 70 to 98, 80 to 98, 93 to 98, or even 95 to 98) weight percent and wherein the second soluble particles are present in a range from 1 to 99 (in some embodiments, in a range from 25 to 98, 50 to 98, 60 to 98, 70 to 98, 80 to 98, 93 to 98, or even 95 to 98) weight percent, based on the total weight of the first and second indicator particles.

In some embodiments, polymer matrix composite comprising at least one of polar solvent soluble particles or polar solvent swellable particles further comprise particles that are both nonsoluble and nonswellable. In some embodiments, the nonsoluble/nonswellable particles comprise at least one of nanoparticles, for example, proteins, biological labels, and pharmaceuticals. It may be desirable to capture, for example, small water insoluble particles within a larger soluble particle to act as a delivery mechanism. As the soluble particle dissolves it will release the nonsoluble nanoparticles.

In some embodiments, the nonsoluble/nonswellable particles have an average particle size (average length of longest dimension) in a range from 0.1 to 5000 (in some embodiments, in a range from 1 to 500, 1 to 120, 40 to 200, or even 5 to 60) micrometers. Porous particles, for example, may be in any of a variety of shapes, including hollow, agglomerated, tubular, and rods. In some embodiments, the porous particles have pores ranging from mesoporous to macroporous and have a surface area of at least 1 $m^2/g$.

As-made polymer matrix composites comprising at least one of polar solvent soluble particles or polar solvent swellable particles (i.e., prior to any compression or other post formation densification) typically have a density of at least 0.5 (in some embodiments, at least 0.5, 1.0, 2.0, 3.0, or even at least 4; in some embodiments, in a range from 0.5 to 4, 0.5 to 3, 0.5 to 2, or even 0.5 to 1.0) $g/cm^3$.

In some embodiments, polymer matrix composites comprising at least one of polar solvent soluble particles or polar solvent swellable particles have a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

Polymer matrix composites comprising at least one of polar solvent soluble particles or polar solvent swellable particles are useful, for example, in delivery devices comprising the polymer matrix composite, wherein the at least one of soluble particles or swellable particles comprise an agent material (e.g., at least one of an active agent or a release (or releasable) agent) such as at least one of an amino acid, a protein, a salt, a carbohydrate, a water-soluble polymer, a pharmaceutical, a fragrance, a dye, a vitamin, a fertilizer, a pesticide, a detergent, a surfactant, a lubricant, an absorbent (e.g., a super absorbent), a hydrogel, a coagulant, a flocculent, a corrosion inhibitor, a nutrient, an acid, a base, an antiseptic, an indicator marker, or serve as a microbial growth media. Polymer matrix composites comprising at least one of polar solvent soluble particles or polar solvent swellable particles are versatile enough to be used as standalone media or fitted into a device.

In particular, polymer matrix composites comprising at least one of polar solvent soluble particles or polar solvent swellable particles are capable of having more than one function (e.g., analyte, nutrient, indicator, or structure for cell cultures to grow) present in a porous membrane layer. Furthermore, embodiments of polymer matrix composites comprising at least one of polar solvent soluble particles or polar solvent swellable particles are capable absorption of fluids and releasing components such as antiseptics for use in wound dressings. 75% silver nitrate and 25% potassium nitrate particles in combination, for example, embedded in the polymer matrix composite will cause a chemical reaction that cauterizes tissue, and destroys bacteria upon contact with a bleeding wound.

Other uses for silver nitrate particles in polymer matrix composites comprising at least one of polar solvent soluble particles or polar solvent swellable particles include introducing ions commonly used to abstract halides:

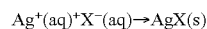

$$Ag^+(aq) + X^-(aq) \rightarrow AgX(s)$$

where $X^-$, $Cl^-$, $Br^-$, or $I^-$.

The color of precipitate varies with the halide: white (silver chloride), pale yellow/cream (silver bromide), yellow (silver iodide).

Polymer matrix composites made from high molecular weight grades of water-soluble resins (such as that available under the trade designations "UCARFLOC" or "POLYOX" from The Dow Chemical Company, Midland, Mich.) may effectively adsorb onto many colloidal materials and perform as efficient flocculating agents. The particles may exhibit a high affinity for a variety of materials, including silica, clays, oxidized coal fines, lignins, and paper fines. For further details on polymer matrix composites comprising at least one of polar solvent soluble particles or polar solvent swellable particles made by processes described herein, also see co-pending U.S. Provisional Pat. App. No. 62/587048, filed Nov. 16, 2017, the disclosure of which is incorporated herein by reference.

Endothermic Particles

"Endothermic particles," as used herein, refer to particles comprising bound water, wherein the bonded water desorbs at a temperature of at least 90° C.

In some embodiments, the endothermic particles are present in polymer matrix composites comprising endothermic particles in a range from 15 to 99 (in some embodiments, in a range from 15 to 99, 25 to 98, 50 to 98, 75 to 98, or even 93 to 97) weight percent, based on the total weight of the endothermic particles and the polymer (excluding any solvent).

Exemplary endothermic particles comprise an endothermic material that comprises a solid phase that transitions to both a solid and gas phase upon heating, which results in absorption of heat. In some embodiments, the particles break down during absorption. "Endothermic material" refers to a compound that absorbs heat, typically by releasing water of hydration, by going through a phase change that absorbs heat (i.e., liquid to gas), or by other chemical change where the reaction requires a net absorption of heat to take place.

Typically, the endothermic particles have an endotherm of at least 200 J/g. Exemplary endothermic particles comprise at least one of sodium bicarbonate, calcium sulfate dihydrate, aluminum trihydrate, magnesium sulfate octahydrate, ammonium oxalate, or sodium silicate.

Exemplary sizes of the endothermic particles range from 100s of nanometers to 100s of micrometers in size. Exemplary shapes of the endothermic particles include irregular, platy, acicular, spherical shapes, and as well as agglomerated forms. Agglomerates can range in size, for example, from a few micrometers up to and including a few millimeters. The particles can be mixed to have multimodal size distributions which may, for example, allow for optimal packing density.

In some embodiments, the endothermic particles have an average particle size (average length of longest dimension) in a range from 300 nm to 700 (in some embodiments, in a range from 5 to 300, 5 to 150, or even 1 to 300) micrometers.

In some embodiments, the endothermic particles comprise first and second, different (i.e., different compositions or microstructures, or particle sizes) endothermic particles. In some embodiments, the first endothermic particles comprise sodium bicarbonate, calcium sulfate dihydrate, aluminum trihydrate, magnesium sulfate octahydrate, ammonium oxalate, or sodium silicate, and wherein the second endothermic particles comprise sodium bicarbonate, calcium sulfate dihydrate, aluminum trihydrate, magnesium sulfate octahydrate, ammonium oxalate, or sodium silicate.

In some embodiments, the first endothermic particles have an average particle size (average length of longest dimension) in a range from 300 nm to 700 micrometers (in some embodiments, in a range from 5 micrometers to 300 micrometers, 5 micrometers to 150 micrometers, or even 1 micrometer to 300 micrometers) and the second endothermic particles have an average particle size (average length of longest dimension) in a range from 300 nm to 700 micrometers (in some embodiments, in a range from 5 micrometers to 300 micrometers, 5 micrometers to 150 micrometers, or even 1 micrometer to 300 micrometers).

In some embodiments, the endothermic particles are present in a range from 15 to 99 (in some embodiments, in a range from 25 to 98, 50 to 98, 75 to 98, or even 93 to 97) weight present, and the second endothermic particles are present in a range from 15 to 99 (in some embodiments, in a range from 25 to 98, 50 to 98, 75 to 98, or even 93 to 97) weight percent, based on the total weight of the first and second endothermic particles.

As-made polymer matrix composites comprising endothermic particles (i.e., prior to any compression), typically have a density of at least 0.3 (in some embodiments, in a range from 0.3 to 2, 0.3 to 1.5, or even 0.3 to 1) g/cm$^3$.

In some embodiments, compressed polymer matrix composites have a density 0.3 to 2.5, or even 1.5 to 4 g/cm$^3$.

In some embodiments, polymer matrix composites comprising endothermic particles have a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

Polymer matrix composites comprising endothermic particles are useful, for example, as fillers, thermal energy absorbers, and passive battery safety components. For further details on polymer matrix composites comprising endothermic particles made by processes described herein, also see co-pending U.S. Provisional Pat. App. No. 62/587054, filed Nov. 16, 2017, the disclosure of which is incorporated herein by reference.

In some embodiments, the energy absorbed by the polymeric matrix composites is improved by compressing the polymeric matrix composite thereby increasing the density of the polymer matrix composite.

In some embodiments, the method described herein further comprises removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100) percent by weight of the solvent, based on the weight of the solvent in the formed article) of the solvent from the formed article after inducing phase separation of the thermoplastic polymer from the solvent.

In some embodiments of the method described herein, at least 90 percent by weight of the solvent, based on the weight of the solvent in the formed article is removed, the formed article before removing at least 90 percent by weight of the solvent, based on the weight of the solvent in the formed article, of the solvent has a first volume, the formed article after removing at least 90 percent by weight of the solvent, based on the weight of the solvent in the formed article has a second volume, and the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent. Volatile solvents can be removed from the polymer matrix composite, for example, by allowing the solvent to evaporate from at least one major surface of the polymer matrix composite. Evaporation can be aided, for example, by the addition of at least one of heat, vacuum, or air flow. Evaporation of flammable solvents can be achieved in a solvent rated oven. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

In some embodiments of the method, the article has first and second major surfaces with ends perpendicular to the first and second major surfaces, and the ends are unrestrained (i.e., without the need for restraints during extraction or stretching) during the solvent removal. This can be done, for example, by drying a portion of a layer without restraint in an oven. Continuous drying can be achieved, for example, by drying a portion of a layer supported on a belt as it is conveyed through an oven. Alternatively, to facilitate removal of non-volatile solvents, for example, a portion of a layer can be continuously conveyed through a bath of compatible volatile solvent thereby exchanging the solvents and allowing the layer to be subsequently dried without restraint. Not all the non-volatile solvent, however, needs be removed from the layer during the solvent exchange. Small amounts of non-volatile solvents may remain and act as a plasticizer to the polymer.

In some embodiments of the method, the formed, and phase separated article, after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent. This porosity is caused by the phase separation of the polymer from the solvent which initially leaves no unfilled voids, as the pores in the polymer matrix composite are filled with solvent. After the solvent is completely or partly removed, or the article is stretched, void spaces in the polymer matrix composite are exposed. The particle-to-particle interactions can minimize the collapse or deformation of the porous polymer matrix composite from capillary-induced negative pressures from the solvent drying process.

In some embodiments of the method, no solvent is removed from the formed article (even after inducing phase separation of the thermoplastic polymer from the solvent). This can be accomplished, for example, by using a non-volatile solvent (e.g., mineral oil or wax) and not completing the extraction/evaporation step. If unfilled porosity is required for the solvent containing composites, then they can optionally be stretched to open up pores within the polymer and solvent matrix.

In some embodiments of the method described herein, the inducing phase separation includes thermally induced phase separation. In the case of thermally induced phase separation (either solid liquid or liquid liquid) the phase separation is induced by cooling the blend down below its melting point. Cooling can be provided, for example, in air, liquid, or on a solid interface, and varied to control the phase separation.

After inducing phase separation, the formed polymeric network structure may be stretched or compressed to, for example, tune the air flow resistance of the polymer matrix composite. In some embodiments, the method further comprises at least one of stretching or compressing the polymer matrix composite. Stretching or compression of the polymer matrix composite may be achieved by conventional calendaring or tentering processes known in the art.

In some embodiments, where the network structure is plastically deformed by at least a compressive force, vibratory energy may be imparted during the application of the compressive force. In some of these embodiments, the polymer composite is in the form of a strip of indefinite length, and the applying of a compressive force step is performed as the strip passes through a nip. A tensile loading may be applied during passage through such a nip. For example, the nip may be formed between two rollers, at least one of which applies the vibratory energy; between a roller and a bar, at least one of which applies the vibratory energy; or between two bars, at least one of which applies the vibratory energy. The applying of the compressive force and the vibratory energy may be accomplished in a continuous roll-to-roll fashion, or in a step-and-repeat fashion. In other embodiments, the applying a compressive force step is performed on a discrete layer between, for example, a plate and a platen, at least one of which applies the vibratory energy. In some embodiments, the vibratory energy is in the ultrasonic range (e.g., 20 kHz), but other ranges are considered to be suitable. For further details regarding plastically deforming the network structure, see U.S. Pat. Pub. No. 2018/0174723, published Jun. 21, 2018 (Acharya et al.), the disclosure of which is incorporated by reference.

In some embodiments, the polymer matrix composites made by the method described herein have a density in a range from 0.05 to 10 (in some embodiments, in a range from 1 to 10, 0.5 to 2, or even 3 to 6) g/cm$^3$.

In some embodiments, the polymer matrix composites made by the method described herein, the polymer matrix composites have a porosity of at least 5 (in some embodiments, at least 10, 15, 20, 30, 40, 50, 60, 70, 80, or even 90; in some embodiments, in a range from 20 to 90) percent.

In some embodiments, the particles of the polymer matrix composite are in the form of a layer having a thickness in a range from 50 to 7000 micrometers, wherein the thickness excludes the height of any protrusions extending from the base of the layer.

In some embodiments, the polymer matrix composite made by the methods described herein can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

In some embodiments, the polymer matrix composites described herein have first and second planar, opposed major surfaces. In some embodiments, the polymer matrix composites described herein have first and second opposed major surfaces, wherein the first major surface is nonplanar (e.g., curved or protrusions with no planar surface therebetween). Referring to FIG. 1, exemplary polymer matrix composite described herein 100 has first and second opposed major surfaces 101, 102. First major surface 101 is nonplanar.

Planar and nonplanar major surfaces can be provided, for example, by coating the slurry on to a patterned substrate (e.g., a liner, a belt, a mold, or a tool), preventing the evaporation of solvent and activating the polymer by heating. Alternatively, for example, the structure can be formed after the phase separation has occurred before, and/or after, the solvent is removed by molding or shaping the film with a patterned tool.

Figure 2:
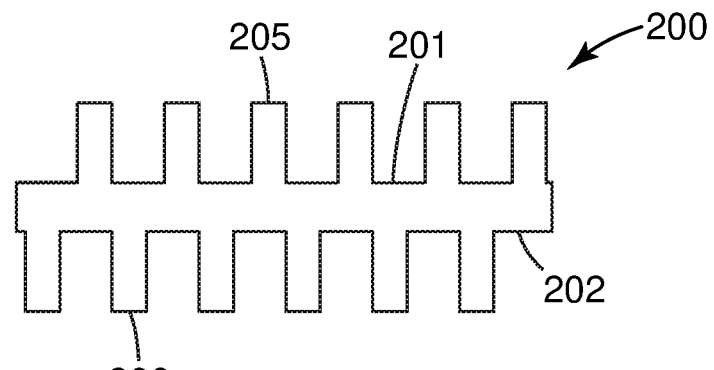
FIG. 2 is a schematic of another exemplary polymer matrix composite described herein.

In some embodiments, the polymer matrix composites described herein, have first protrusions extending outwardly from the first major surface, and in some embodiments, second protrusions extending outwardly from the second major surface. In some embodiments, the first protrusions are integral with the first major surface, and in some embodiments, the second protrusions are integral with the second major surface. Exemplary protrusions include at least of one a post, a rail, a hook, a pyramid, a continuous rail, a continuous multi-directional rail, a hemisphere, a cylinder, or a multi-lobed cylinder. In some embodiments, the protrusions have a cross-section in at least one of a circle, a square, a rectangle, a triangle, a pentagon, other polygons, a sinusoidal, a herringbone, or a multi-lobe. Referring to FIG. 2, exemplary polymer matrix composite described herein 200 has first protrusions 205 extending outwardly from first major surface 201 and second protrusions 206 extending outwardly from second major surface 202.

Protrusions can be provided, for example, by coating the slurry between patterned substrate (e.g., a liner, a belt, a mold, or a tool), preventing the evaporation of solvent and activating the polymer by heating. Alternatively, for example, the structure can be formed after the phase separation has occurred before, and/or after, the solvent is removed by molding or shaping the film between patterned tools.

Figure 3:
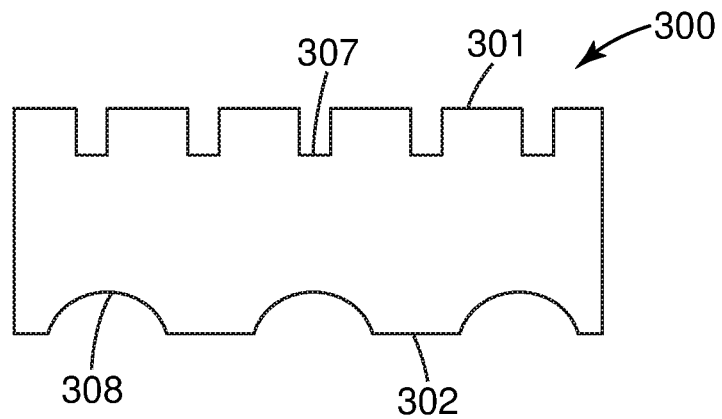
FIG. 3 is a schematic of another exemplary polymer matrix composite described herein.

In some embodiments, the polymer matrix composite described herein have first depressions extending into the first major surface, and in some embodiments, second depressions extending into the second major surface. Exemplary depressions include at least one of a groove, a slot, or an inverted pyramid, a hole (including a thru or blind hole), or dimple. Referring to FIG. 3, exemplary polymer matrix composite described herein 300 has first depressions 307 extending into first major surface 301 and second depressions 308 extending into second major surface 302.

Depressions can be provided, for example, by coating the slurry between patterned substrate (e.g., a liner, a belt, a mold, or a tool), preventing the evaporation of solvent and activating the polymer by heating. Alternatively, for example, the structure can be formed after the phase separation has occurred before, and/or after, the solvent is removed by molding or shaping the film between patterned tools.

In some embodiments, the polymer matrix composites described herein, further comprise a reinforcement (e.g., attached to the polymer matrix composite, partial therein, and/or therein). Exemplary reinforcements include fibers, strands, nonwovens, woven materials, fabric, mesh, and film. The reinforcement, for example, can be laminated to the polymer matrix composite thermally, adhesively, or ultrasonically. The reinforcement, for example, can be imbedded within the polymer matrix composite during the coating process. The reinforcement, for example, can be between the major surfaces of the composite, on one major surface, or on both surfaces. More than one type of reinforcement can be used.

In some embodiments of the method described herein, the porous polymeric network structure is produced by an induced phase separation of a miscible thermoplastic polymer-solvent solution. In some embodiments of the method described herein, the induced phase separation is thermally induced phase separation.

EXEMPLARY EMBODIMENTS

1. A method of making a polymer matrix composite comprising a porous polymeric network structure; and a plurality of particles distributed within the polymeric network structure, the method comprising:
   combining (e.g., mixing or blending) a thermoplastic polymer, a solvent, and a plurality of thermally conductive particles to provide a slurry;
   forming the slurry in to an article (e.g., a layer);
   heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent, based on the total weight of the thermoplastic polymer; and
   inducing phase separation of the thermoplastic polymer from the solvent to provide the polymer matrix composite.
2. The method of Exemplary Embodiment 1, further comprising removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100) percent by weight of the solvent, based on the weight of the solvent in the formed article of the solvent from the formed article after inducing phase separation of the thermoplastic polymer from the solvent.
3. The method of Exemplary Embodiment 2, wherein at least 90 percent by weight of the solvent, based on the weight of the solvent in the formed article, is removed, wherein the formed, article before removing at least 90 percent by weight of the solvent, based on the weight of the solvent in the formed article, of the solvent has a first volume, wherein the formed article after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent.
4. The method of Exemplary Embodiment 3, wherein the article has first and second major surfaces with ends perpendicular to the first and second major surfaces, and where the ends are unrestrained during the solvent removal.
5. The method of any preceding Exemplary Embodiment, wherein the formed, and phase separated article after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.
6. The method of Exemplary Embodiment 1, wherein no solvent is removed from the formed article (even after inducing phase separation of the thermoplastic polymer from the solvent).
7. The method of any preceding Exemplary Embodiment, wherein the inducing phase separation includes thermally induced phase separation.
8. The method of any preceding Exemplary Embodiment, wherein the polymer in the slurry has a melting point, wherein the solvent has a boiling point, and wherein combining is conducted below the melting point of the polymer in the slurry, and below the boiling point of the solvent.
9. The method of any preceding Exemplary Embodiment, wherein the polymer in the slurry has a melting point, and wherein the inducing phase separation is conducted at less than the melting point of the polymer in the slurry.
10. The method of any preceding Exemplary Embodiment, further comprising at least one of stretching or compressing the polymer matrix composite.
11. The method of any of Exemplary Embodiments 1 to 9, further comprising applying vibratory energy to the polymer matrix composite simultaneously with the applying a compressive force.
12. The method of any preceding Exemplary Embodiment, wherein the polymer matrix composite has a density in a range from 0.05 to 10 (in some embodiments, in a range from 1 to 10, 0.5 to 2, or even 3 to 6) g/cm$^3$.
13. The method of any preceding Exemplary Embodiment, wherein the polymer matrix composite has a porosity of at least 5 (in some embodiments, at least 10, 20, 30, 40, 50, 60, 70, 80, or even 90; in some embodiments, in a range from 20 to 90) percent.
14. The method of any preceding Exemplary Embodiment, wherein the particles are acoustically active particles.
15. The method of Exemplary Embodiment 14, wherein the acoustically active particles comprise acoustically active metal oxide particles.
16. The method of Exemplary Embodiments 1 to 13, wherein the particles are soft magnetic particles.
17. The method of any preceding Exemplary Embodiment, wherein the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.
18. The method of any preceding Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

19. The method of any preceding Exemplary Embodiment, wherein the porous polymeric network structure comprises a polymer having a number average molecular weight in a range from of $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol.

20. The method of any preceding Exemplary Embodiment, wherein the polymer matrix composite is in the form of a layer having a thickness in a range from 50 to 7000 micrometers.

21. The method of any preceding Exemplary Embodiment, wherein the porous polymeric network structure is produced by an induced phase separation of a miscible thermoplastic polymer-solvent solution.

22. The method of Exemplary Embodiment 21, wherein the induced phase separation is thermally induced phase separation.

23. The method of any preceding Exemplary Embodiment, wherein the particles are present in a weight fraction in a range from 15 to 99 (in some embodiments, in a range from 25 to 98, 50 to 98, 75 to 98, or even 93 to 97), based on the total weight of the polymer matrix composite.

24. The method of any preceding Exemplary Embodiment, wherein the polymer matrix composite has first and second planar, opposed major surfaces.

25. The method of any preceding Exemplary Embodiment, wherein the polymer matrix composite has first and second opposed major surfaces, wherein the first major surface is nonplanar (e.g., curved or protrusions with no planar surface there between).

26. The method of either Exemplary Embodiment 24 or 25, wherein the first major surface has first protrusions extending outwardly from the first major surface. In some embodiments, the protrusions are integral with the first major surface.

27. The method of Exemplary Embodiment 26, wherein the first protrusions are at least one of a post, a rail, a hook, a pyramid, a continuous rail, a continuous multi-directional rail, a hemisphere, a cylinder, or a multi-lobed cylinder.

28. The method of any of Exemplary Embodiments 24 to 27, wherein the first major surface has first depressions extending into the first major surface.

29. The method of Exemplary Embodiment 28, wherein the first depressions are at least one of a groove, a slot, an inverted pyramid, a hole (including a thru or blind hole), or a dimple.

30. The method of any of Exemplary Embodiments 26 to 29, wherein the second major surface has second protrusions extending outwardly from the second major surface.

31. The method of Exemplary Embodiment 30, wherein the second protrusions are at least one of a post, a rail, a hook, a pyramid, a continuous rail, a continuous multi-directional rail, a hemisphere, a cylinder, or a multi-lobed cylinder.

32. The method of any of Exemplary Embodiments 26 to 31, wherein the second major surface has second depressions extending into the second major surface.

33. The method of Exemplary Embodiment 32, wherein the second depressions are at least one of a groove, a slot, an inverted pyramid, a hole (including a thru or blind hole), or a dimple.

34. The method of any preceding Exemplary Embodiment, wherein the polymer matrix composite can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

35. The method of any preceding Exemplary Embodiment, wherein the polymer matrix composite comprises at least one of a viscosity modifier (e.g., fumed silica, block copolymers, and wax), a plasticizer, a thermal stabilizer (e.g., such as available, for example, under the trade designation "IRGANOX 1010" from BASF, Ludwigshafen, Germany), an antimicrobial (e.g., silver and quaternary ammonium), a flame retardant, an antioxidant, a dye, a pigment, or an ultraviolet (UV) stabilizer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods
Method for Impedance Test

The resonance frequency was obtained using standard Thiele-Small parameter analysis as described in Small, R. H., "Closed-Box Loudspeaker Systems," J. Audio Eng. Soc., vol. 20, pp. 798-808 (December 1972) of a Knowles Electronics 2403-260-00001 11×15×3.5 mm speaker (obtained from Knowles Electronics, Itasca, Ill.) connected to a 0.93 cm³ cavity. An audio test system (obtained under the trade designation "A DATS V2" from Dayton Audio, Springboro, Ohio) was attached to the speaker and run to collect impedance as a function of frequency in the audio range (i.e., 20-20,000 Hz). The resonant frequency was identified as the frequency at which the impedance peaked. The resonance frequency was collected for the speaker in contact with the unfilled 0.93 cm³ cavity, and compared to the system resonance with the cavity filled with the test material. A resonance frequency shift was calculated by subtracting the resonance frequency of the filled speaker module from the resonance frequency of the empty speaker module. A positive value of resonance frequency shift refers to a reduction in resonance frequency (i.e., a shift to lower frequency).

Method for Sound Pressure Level (SPL) Test

Figure 38:
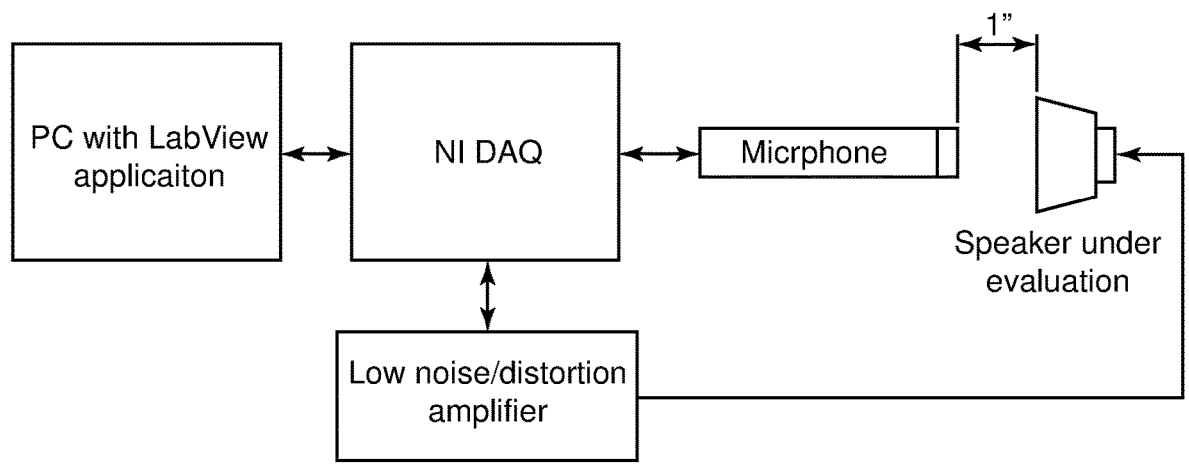
FIG. 38 is a schematic of a test configuration to determine the Sound Pressure Level (SPL) of the polymer matrix composites, described herein, comprising acoustically active particles.

The sound pressure level (SPL) response was obtained by driving a speaker (Model 2403-260-00001 obtained from Knowles Electronics, Itasca, Ill.) connected to a 0.93 cm³ cavity. The driving voltage was about 400 mVrm$_s$, supplied in the form of a band-limited chirp from 100-3200 Hz. The voltage profile was identical for each material tested, and was generated by a PC using software obtained under the trade designation "LABVIEW 2016" from National Instruments, Austin, Tex., that used procedures based upon a module (24-bit Analog I/O DAQ) obtained under trade designation "ADVANCED SIGNAL PROCESSING TOOLKIT TIME-SERIES ANALYSIS" (Model NI-USB-4431) from National Instruments, amplified with a low noise/distortion audio amplifier (obtained under the trade designation "AUDIOENGINE" (Model N22) from Audioengine, Austin, Tex.). This system was also used to record the SPL from a condenser microphone (Model 42AB; obtained under the trade designation "G.R.A.S" from G.R.A.S. Sound & Vibration, Twinsburg, Ohio) that was positioned about 2.54 cm from the fixture. A schematic of the test configuration is provided in FIG. 38. An average SPL improvement was calculated by first collecting the SPL curve for the speaker module with empty cavity and then collecting the SPL curve for the same speaker module with test material filling the cavity. The SPL curve obtained for the empty speaker module was subtracted from the SPL curve obtained for the filled speaker module, and the average SPL difference was calculated for the range of 300-350 Hz.

Air Flow Resistance Test

Air flow resistance was measured using a densometer (obtained as Model 4110 from Gurley Precision Instruments, Troy, N.Y.) with a timer (obtained as Model 4320 from Gurley Precision Instruments). A sample was clamped in the tester. The timer and photo eye were reset and the cylinder was released, allowing air to pass through a 1 square inch (6.5 cm$^2$) circle with a constant force of 4.88 inches (12.4 cm) of water (1215 N/m$^2$). The time to pass 50 cm$^3$ of air was recorded. In some cases, the air flow resistance was normalized to that of a 500-micrometer thick film by dividing by the film thickness in micrometers and multiplying by 500 micrometers. Film thickness was measured as described below in the section "Method for Density and Porosity."

Bubble Point Pressure Test

Bubble point pressure is a commonly used technique to characterize the largest pore in a porous membrane. Discs 47 mm in diameter were cut and samples soaked in mineral oil to fully fill and wet out the pores within the sample. The wet samples were then placed in a holder (47 mm; Stainless Holder Part #2220 from Pall Corporation, Port Washington, N.Y.). Pressure was slowly increased on the top of the sample using a pressure controller and gas flow was measured on the bottom with a gas flow meter. The pressure was recoded when there was a significant increase in flow from the baseline flow rate. This was reported as the bubble point pressure pounds per square inch (psi) (centimeters of mercury, cm Hg or Pascals, Pa). This technique is a modification to ASTM F316-03 (2006), "Standard Test Methods for Pore Size Characteristics of Membrane Filters by Bubble Point and Mean Flow Pore Test," the disclosure of which is incorporated herein by reference and includes an automated pressure controller and flow meter to quantify when the bubble point pressure had been reached. The pore size was calculated per the ASTM using the following equation:

Limiting Pore Diameter (μm)=(Surface Tension in dynes/cm*0.415)/(Pressure in psi).

The factor of 0.415 was included since the pressure was in units of psi. A surface tension of 34.7 dynes/cm was used for the mineral oil.

Density and Porosity Test

The density of a sample was calculated using a method similar to ASTM F-1315-17 (2017), "Standard Test Method for Density of a Sheet Gasket Material," the disclosure of which is incorporated herein by reference, by cutting a 47 mm diameter disc, weighing the disc on an analytical balance of suitable resolution (typically 0.0001 gram), and measuring the thickness of the disc on a thickness gauge (obtained as Model 49-70 from Testing Machines, Inc., New Castle, Del.) with a dead weight of 7.3 psi (50.3 KPa) and a flat anvil of 0.63 inch (1.6 cm) diameter, with a dwell time of about 3 seconds and a resolution of +/−0.0001 inch. The density was then calculated by dividing the mass by the volume, which was calculated from the thickness and diameter of the sample. With the known densities and weight fractions of the components of the polymer matrix composite, the theoretical density of the polymer matrix composite was calculated by the rule of mixtures. Using the theoretical density and the measured density, the porosity was calculated as:

Porosity=[1−(measured density/theoretical density)]× 100.

Thermal Conductivity Test

Direct thermal diffusivity measurements are made using the flash analysis method as per ASTM E1461 (2013), the disclosure of which is incorporated by reference, using a light flash thermophysical properties analyzer (obtained from "HYPERFLASH LFA 467" from Netzsch Instruments North America LLC, Boston, Mass.). Each sample set included a reference sample (obtained under the trade designation "AXM-5Q POCO GRAPHITE" from Poco Graphite, Decatur, Tex.) acted as a method control for diffusivity measurements. Samples are coated with a 3-5 micrometer layer of sprayed-on graphite (obtained under the trade designation "DGF 123 DRY GRAPHITE FILM SPRAY" from Miracle Power Products Corporation, Cleveland, Ohio) on the light impingement side and the detection side to normalize surface effusivity and absorptivity for the sample being tested. In a single measurement, called a "shot", a short time duration pulse of light (Xenon flash lamp, 230 V, 15 microsecond duration) was impinged onto one side of a sample, and a thermogram (time trace of measured temperature) was recorded on the opposite side of the sample, as measured by the voltage on an InSb IR detector. Diffusivity was calculated from a fit of the thermogram to the Cowan Plus Pulse Correction model for through-plane and in-plane anisotropic plus heat loss for in-plane, and heat capacity was calculated by differential scanning calorimetry (DSC) using a DSC instrument (obtained under the trade designation "Q2000 DSC" from TA Instruments, New Castle, Del.), following ASTM E1269 (2011) "Quasi-Isothermal Moderated DSC," the disclosure of which is incorporated herein by reference. Sapphire was used as a reference for DSC. The through-plane diffusivity was calculated using the Cowan method with an additional correction for a finite pulse width, while in-plane diffusivity used the isotropic model with the aid of the software (obtained under the trade designation "PROTEUS" from Netzsch, Selb, Germany). Five shots were obtained for each sample at 25° C. The product of measured density ($\rho$) (geometric from 2.54 cm (1 inch) discs), specific heat capacity ($c_P$) (by differential scanning calorimetry), and ($\alpha$) diffusivity gave the thermal conductivity. That is, $k(W/m/K)=\rho(g/cm^3) \times c_P(J/K/g) \times \alpha(mm^2/s).$ Electrical Resistance Test Electrical resistance was measured using a conductivity meter (obtained under the trade designation "WAVETEK DM25XT" from WaveTek Corporation, San Diego, Calif.). The probes of the meter were placed on the edges of a 27-mm diameter disc that was placed on a sheet of paper and allowed to equilibrate for 5 seconds. The resulting resistance (ohms) was recorded.

Thermal Insulation Test

A sample was placed in the measuring camber of a heat flow meter (obtained under the trade designation "LASER-COMP FOX 50 HEAT FLOW METER" from TA Instruments, Waters Corporation, New Castle, Del.). The instrument recorded the sample thickness clamped in the sample chamber. An equilibrium heat flow measurement was obtained with an upper plate temperature of 70° C. and a lower plate temperature of 50° C. The resulting equilibrium thermal conductivity was then calculated by heat flow meter software and reported as W/(m*K).

Dielectric Test

Sample was placed between two gold plated electrodes. The positive electrode was 2.54 cm (1 inch) diameter and the ground electrode was 5.1 cm (2 inch) diameter. A 1400-gram weight is placed on the electrode for good contact. The positive electrode was connected to the positive terminal and the ground electrode was connected to the negative terminal of an inductance-capacitance-resistance (LCR) meter (obtained as Model 72-960 from Tenma, Tokyo, Japan). Frequency was selected at 1 kHz, and the capacitance in pF (picofarad) was recorded directly from the display.

The dielectric constant (K) was calculated from the measured capacitance (C) using the following equation:

$$K=C*d/e_0*A$$

where d was thickness of the sample in meters, A was area of cross section in square meters and $e_0$=8.85 pF/m, permittivity of free space.

Endothermic Test

A differential scanning calorimeter (obtained under the trade designation "DTG-60AH TGA/DTA" from Shimadzu Scientific Instruments, Columbia, Md.) was used to measure the endothermic properties of materials. The unit had prior been calibrated using an Indium powder reference run at 10° C./min. Samples were run at a ramp rate of 10° C./min. under a nitrogen flow of 20 ml/min. 10 milligrams of the sample were placed into a copper pan and the sample was run in a non-sealed condition. An endothermic response was recorded. Integration of the area under the curve allows for the calculation of the amount of energy removed per unit weight (J/g) for the composite structure.

Volume Expansion Test

A 4.5 cm×1.7 cm×thickness (cm) starting sample was cut using a razor blade. The sample was loaded into a conventional lab oven that had reached an equilibration temperature of 250° C. The sample was placed in the oven for 15 minutes. The sample was removed, allowed to cool, and remeasured. The measured dimensions of the sample were then used to calculate the change in volume before and after expansion.

Magnetic Tests

I. Static Magnetic Properties—Magnetic Test I

Polymer composite samples were cut in to 6 mm disks prior to the magnetic measurements. A vibrating sample magnetometer (obtained as 7400-S from Lake Shore Cryotronics, Westerville, Ohio) was used to record magnetic hysteresis loops (M-H curves). The magnetizing field H was applied in the plane of the samples. The magnetic field span was set to H=±4 kOe and saturation magnetization Ms was measured at full saturation (|H|=4 kOe). Magnetizing field H was measured with step of 0.14 Oe and coercivity field Hc was defined in vicinity of M=0 via linear fitting based on 6 points on the M–H curve adjacent to M=0.

II. Dynamic Magnetic Properties—Magnetic Test II

Polymer composite samples were cut in to toroids with outer diameter of 18 mm and inner diameter of 5 mm. A magnetic test fixture (obtained as 16454A from Keysight Technologies, Santa Clara, Calif.) and impedance meter (obtained as E4990Afrom Keysight Technologies) were used to measure real and imaginary part of relative magnetic permeability pr. The data were analyzed in accordance with manual for 16454A.

Example 1

A 120-milliliter (4-ounce) glass jar was charged with 3 grams of an ultra-high molecular weight polyethylene (UHMWPE) (obtained under the trade designation "GUR-2126" from Celanese Corporation, Irving, Tex.), and 56.7 grams of boron nitride (obtained under the trade designation "3M BORON NITRIDE COOLING FILLER AGGLOMERATES 50" from 3M Company, St. Paul, Minn.), and shook with an acoustic mixer (obtained under the trade designation "LABRAM RESONATACOUSTIC MIXER" from Resodyn Inc., Butte, Mont.) at 70% intensity for 1 minute. 71.7 grams of a low odor kerosene (obtained from Alfa Aesar, Ward Hill, Mass.) was added to this mixture, and stirred by hand with a spatula until a uniform slurry was obtained. The slurry was applied with a scoop, at room temperature (about 25° C.), to a 3-mil (75-micrometer) heat stabilized polyethylene terephthalate (PET) liner (obtained under the trade designation "COATED PET ROLL #33716020500" from 3M Company), then a 3-mil (75-micrometer) heat stabilized polyethylene terephthalate (PET) liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of 30 mils (762 micrometers). Progressive multiple passes with increasing downward pressure of the notch bar were used to flatten the slurry. The sandwiched, formed slurry was placed on an aluminum tray and placed in a lab oven (obtained under the trade designation "DESPATCH RFD1-42-2E" from Despatch, Minneapolis, Minn.), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 4:
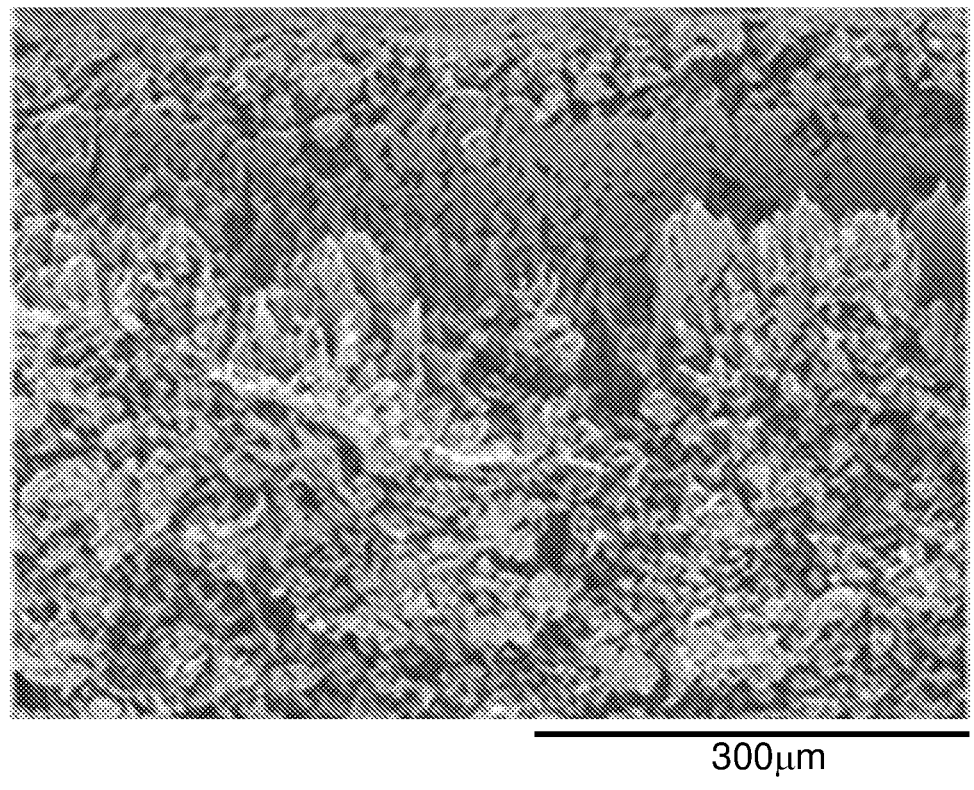

Referring to FIG. 4, a scanning electron microscope (SEM) digital image of a cross-section of the polymer matrix composite taken with a SEM (obtained under the trade designation "PHENOM" from FEI Company, Hillsboro, Oreg.) is shown. The cross-sectional sample was prepared by liquid nitrogen freeze fracturing followed by gold sputter coating with a sputter coater (obtained under the trade designation "EMITECH K550X" from Quorum Technologies, Laughton East Sussex, England).

The resulting polymer matrix composite was 23.7 mils (603 micrometers) thick and had a measured density of 0.524 g/cm$^3$ (as determined by the "Density and Porosity Test"), a porosity of 75.2% (as determined by the "Density and Porosity Test"), a Gurley air flow of 4 sec/50 cm$^3$ (as determined by the "Air Flow Resistance Test"), a pore size of 2.2 micrometers (as determined by the "Bubble Point Pressure Test"), with a specific heat capacity of 0.818 J/K/g (as determined by the "Thermal Conductivity Test"), a thermal diffusivity through-plane of 3.440 mm$^2$/s, in plane of 2.398 mm$^2$/s (as determined by the "Thermal Conductivity Test"), and a thermal conductivity through-plane of 1.475 W/(m*K), in-plane 1.028 W/(m*K) (as determined by the "Thermal Conductivity Test").

Example 2

Example 2 was a 27-mm diameter disc punched from the Example 1 polymer matrix composite. The disc was placed between two release liners, and then between two sheet metal plates. The sample was compressed in a hydraulic press (obtained under the trade designation "WABASH-GENESIS MODEL G30H-15-LP" from Wabash MPI, Wabash, Ind.) under 6804 kilograms (7.5 tons) of pressure at ambient temperature (about 25° C.) for 15 seconds.

Figure 5:
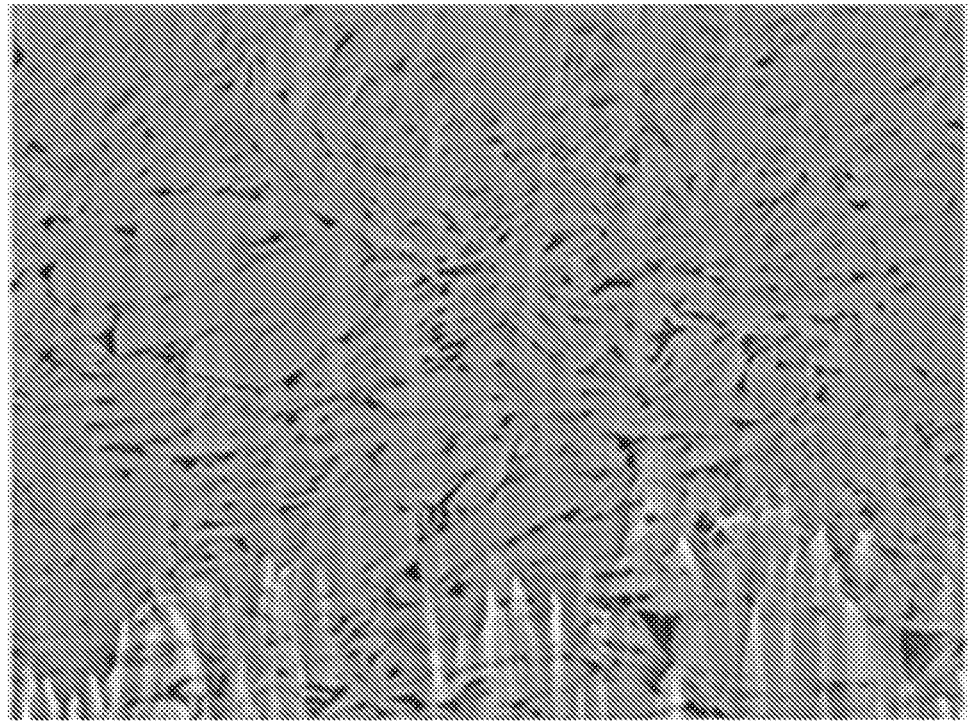

Referring to FIG. 5, a SEM digital image of a cross-section of the polymer matrix composite is shown.

The resulting densified polymer matrix composite tested as described in Example 1. The densified polymer matrix composite was 6.5 mils (165 micrometers) thick and had a measured density of 1.547 g/cm$^3$, a porosity of 24.3%, with a specific heat capacity of 0.850 J/K/g, a thermal diffusivity of 7.347 mm$^2$/s through-plane and 16.777 mm$^2$/s in-plane, and a thermal conductivity of 9.657 W/(m*K) through-plane and 22.051 W/(m*K) in-plane.

Example 3

Example 3 was prepared and tested as described for Example 2, except the slurry coated onto the PET liner ("COATED PET ROLL #33716020500") was 1.25 gram of UHMWPE ("GUR-2126"), 23.74 grams of aluminum oxide (obtained under the trade designation "ALUMINUM OXIDE TRIMODAL SPHERICAL TA6T1" from Nippon Steel, Himeji City, Hyogo, Japan), and 8 grams of the low odor kerosene.

Referring to FIG. 6, a SEM digital image of a cross-section of the polymer matrix composite is shown.

The resulting compressed polymer matrix composite was 21.7 mils (551 micrometers) thick, and had a density of 2.351 g/cm$^3$, a porosity of 35.7%, a specific heat capacity of 0.833 J/K/g, a thermal diffusivity of 0.563 mm$^2$/s through-plane and 1.489 mm$^2$/s in-plane, and a thermal conductivity of 1.122 W/(m*K) through-plane and 2.101 W/(m*K) in-plane.

Example 4

Example 4 was prepared and tested as described for Example 2, except the slurry was 0.628 gram of UHMWPE ("GUR-2126"), 11.86 grams of aluminum hydroxide (obtained under the trade designation "MOLDX A110" from J.M. Huber Corporation, Atlanta, Ga.), and 8 grams of the low odor kerosene.

Referring to FIG. 7, a SEM digital image of a cross-section of the polymer matrix composite is shown.

The resulting compressed polymer matrix composite was 16.0 mils (406.4 micrometers) thick, and had a measured density of 1.695 g/cm$^3$, a porosity of 29.7%, a specific heat capacity of 1.191 J/K/g, a thermal diffusivity of 1.006 mm$^2$/s through-plane and 2.228 mm$^2$/s in-plane, and a thermal conductivity of 2.031 W/(m*K) through-plane and 4.497 W/(m*K) in-plane.

Example 5

Example 5 was prepared and tested as described for Example 2, except the slurry was 0.628 gram of UHMWPE ("GUR-2126"), 11.87 grams of silica carbide (obtained under the trade designation "ELECTROCARB 800W BLACK SIC" from Electro Abrasives, Buffalo, N.Y.), and 9.15 grams of the low odor kerosene.

Figure 8:

Referring to FIG. 8, a SEM digital image of a cross-section of the polymer matrix composite is shown.

The resulting compressed polymer matrix composite was 18.0 mils (457.2 micrometers) thick, and had a measured density of 1.518 g/cm$^3$, a porosity of 50.8%, a specific heat capacity of 0.681 J/K/g, a thermal diffusivity of 0.449 mm$^2$/s through-plane and 1.969 mm$^2$/s in-plane, and a thermal conductivity of 0.477 W/(m*K) through-plane and 2.094 W/(m*K) in-plane.

Example 6

Example 6 was prepared and tested as described in Example 1, except the slurry was 0.628 gram of UHMWPE ("GUR-2126"), 11.85 grams of silica carbide (obtained under the trade designation "ELECTROCARB 1200/F BLACK SIC" from Electro Abrasives, Buffalo, N.Y.), and 9.0 grams of the low odor kerosene.

The resulting uncompressed polymer matrix composite was 29.2 mils (741.7 micrometers) thick, and had a density of 1.036 g/cm$^3$, a porosity of 67.2%, a Gurley air flow of 16.2 sec/50 cm$^3$, a specific heat capacity of 0.643 J/K/g, a thermal diffusivity of 0.312 mm$^2$/s through-plane and 1.444 mm$^2$/s in-plane, and a thermal conductivity of 0.208 W/(m*K) through-plane and 0.962 W/(m*K) in-plane.

Example 7

Example 7 was prepared and tested as described in Example 6, except it was compressed as described in Example 2.

The resulting compressed polymer matrix composite was 15.8 mils (401.3 micrometers) thick, and had a density of 1.546 g/cm$^3$, a porosity of 51.1%, a specific heat capacity of 0.678 J/K/g, a thermal diffusivity of 0.39 mm$^2$/s through-plane and 3.623 mm$^2$/s in-plane, and a thermal conductivity of 0.409 W/(m*K) through-plane and 3.802 W/(m*K) in-plane.

Example 8

Example 8 was prepared and tested as described in Example 1, except the slurry was 1.5 gram of UHMWPE ("GUR-2126"), 70 grams of copper (obtained under the trade designation "COPPER POWDER, DENDRIDIC, 3MICRON, 99.7%" from Aldrich Chemical Company, St. Louis, Mo.), and 36 grams of the low odor kerosene.

Figure 9:
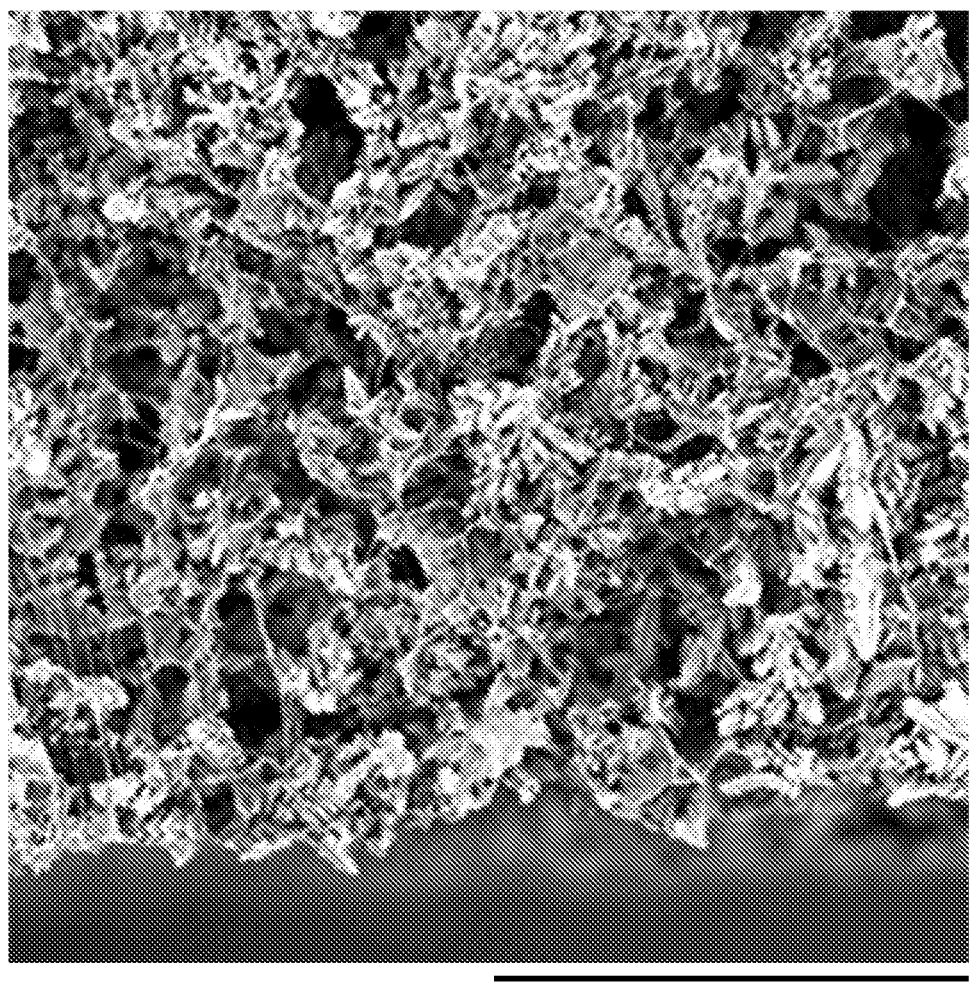

Referring to FIG. 9, a SEM digital image of a cross-section of the polymer matrix composite is shown.

The resulting uncompressed polymer matrix composite was 31.2 mils (792.5 micrometers) thick, and had a density of 1.535 g/cm$^3$, a porosity of 79.9%, a Gurley air flow of 4.8 sec/50 cm$^3$, a pore size of 2.1 micrometers, a specific heat capacity of 0.392 J/K/g, a thermal diffusivity of 0.530 mm$^2$/s through-plane and 2.240 mm$^2$/s in-plane, a thermal conductivity of 0.319 W/(m*K) through-plane and 1.348 W/(m*K) in-plane, and an electrical resistance of 14 mega ohms (as determined by the "Electrical Resistance Test").

Example 9

Example 9 was prepared and tested as described in Example 8, except it was compressed as described in Example 2, except the pressure was increased to 27,215 kilograms (30 tons), at 245° F. (118° C.), for 30 seconds.

The resulting compressed polymer matrix composite was 7.4 mils (188.0 micrometers) thick, and had a density of 6.003 g/cm$^3$, a porosity of 17.9%, a specific heat capacity of 0.392 J/K/g, a thermal diffusivity of 4.723 mm$^2$/s through-plane and 30.047 mm$^2$/s in-plane, a thermal conductivity of 11.357 W/(m*K) through-plane and 70.718 W/(m*K) in-plane, and an electrical resistance of 0.5 ohm.

Example 10

Example 10 was prepared and tested as described in Example 1, except the slurry was 1.5 gram of UHMWPE ("GUR-2126"), 55 grams of synthetic diamonds (obtained under the trade designation "LS-MAO SYNTHETIC METAL BOND DIAMOND POWDER, UNCOATED, 100/120 MESH" from LANDS Superabrasives Co., New York, N.Y.), 55 grams of synthetic diamonds (obtained under the trade designation "LS-MAO SYNTHETIC METAL BOND DIAMOND POWDER, UNCOATED, 120/140 MESH" from LANDS Superabrasives Co.), and 21 grams of the low odor kerosene.

Figure 10:
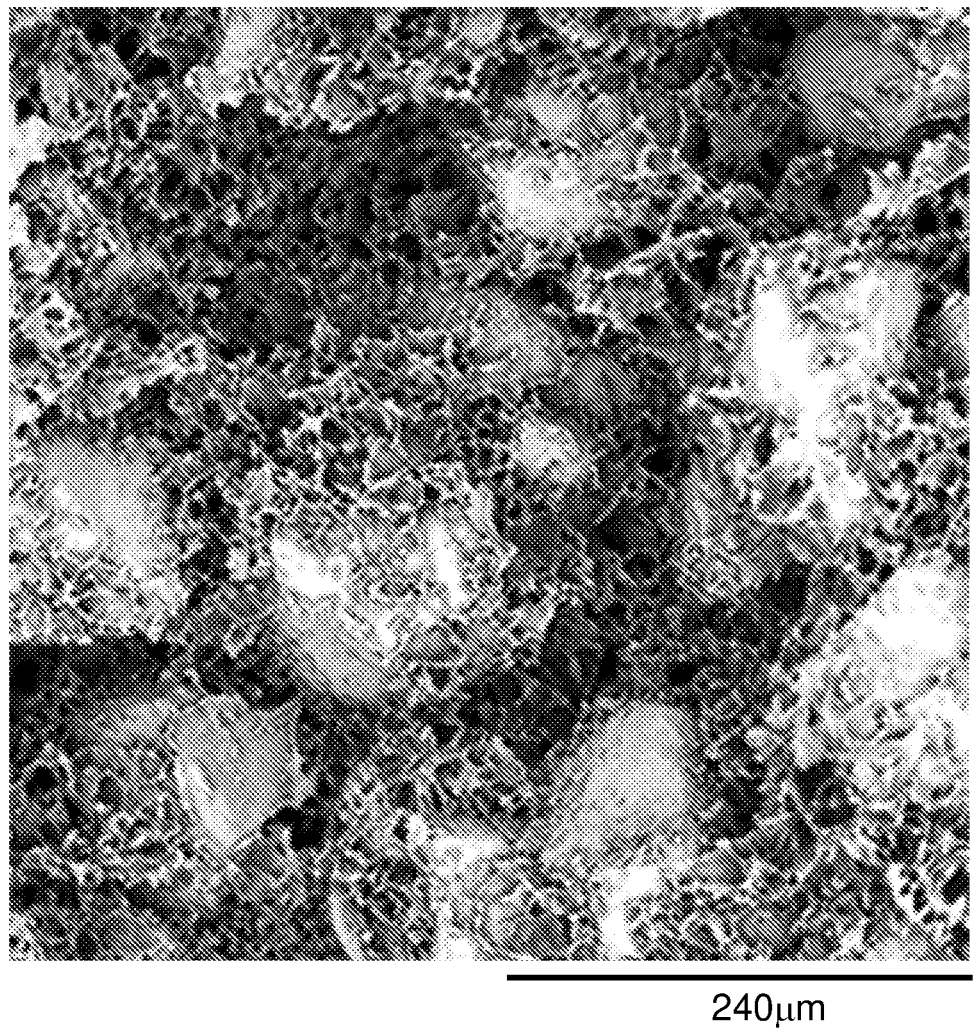

Referring to FIG. 10, a SEM digital image of a cross-section of the polymer matrix composite is shown.

The resulting uncompressed polymer matrix composite was 33.7 mils (856 micrometers) thick, and had a density of 2.052 g/cm$^3$, a porosity of 35.5%, a Gurley air flow of 14.2 sec/50 cm$^3$, a pore size of 6.0 micrometers, a specific heat capacity of 0.525 J/K/g, a thermal diffusivity of 0.604 mm$^2$/s through-plane and 2.331 mm$^2$/s in-plane, and a thermal conductivity of 0.651 W/(m*K) through-plane and 2.511 W/(m*K) in-plane.

Example 11

Example 11 was prepared and tested as described in Example 10, except it was compressed as described in Example 2, except the pressure was increased to 27,215 kilograms (30 tons), at 245° F. (118° C.), for 30 seconds.

The resulting compressed polymer matrix composite was 27.6 mils (710 micrometers) thick, and had a density of 2.052 g/cm$^3$, a porosity of 27.5%, a specific heat capacity of 0.525 J/K/g, a thermal diffusivity of 0.986 mm$^2$/s through-plane and 2.211 mm$^2$/s in-plane, and a thermal conductivity of 1.065 W/(m*K) through-plane and 2.382 W/(m*K) in-plane.

Example 12

A 120-milliliter (4-ounce) glass jar was charged with 1.5 grams of the UHMWPE ("GUR-2126), and 15 grams of glass bubbles (obtained under the trade designation "3M S60 GLASS BUBBLES" from 3M Company, St. Paul, Minn.), and shook with the acoustic mixer ("LABRAM RESONATACOUSTIC MIXER") at 70% intensity for 1 minute. 17.5 grams of the low odor was added to this mixture, and stirred by hand with a spatula until a uniform slurry was obtained. The slurry was applied with a scoop at room temperature (about 25° C.) to a 3-mil (75-micrometer) heat stabilized polyethylene terephthalate (PET) liner ("COATED PET ROLL #33716020500") then a 3-mil (75-micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of about 30 mils (762 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.), forming a solvent filled polymer matrix composite. Both the top and bottom liners were removed exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 11:
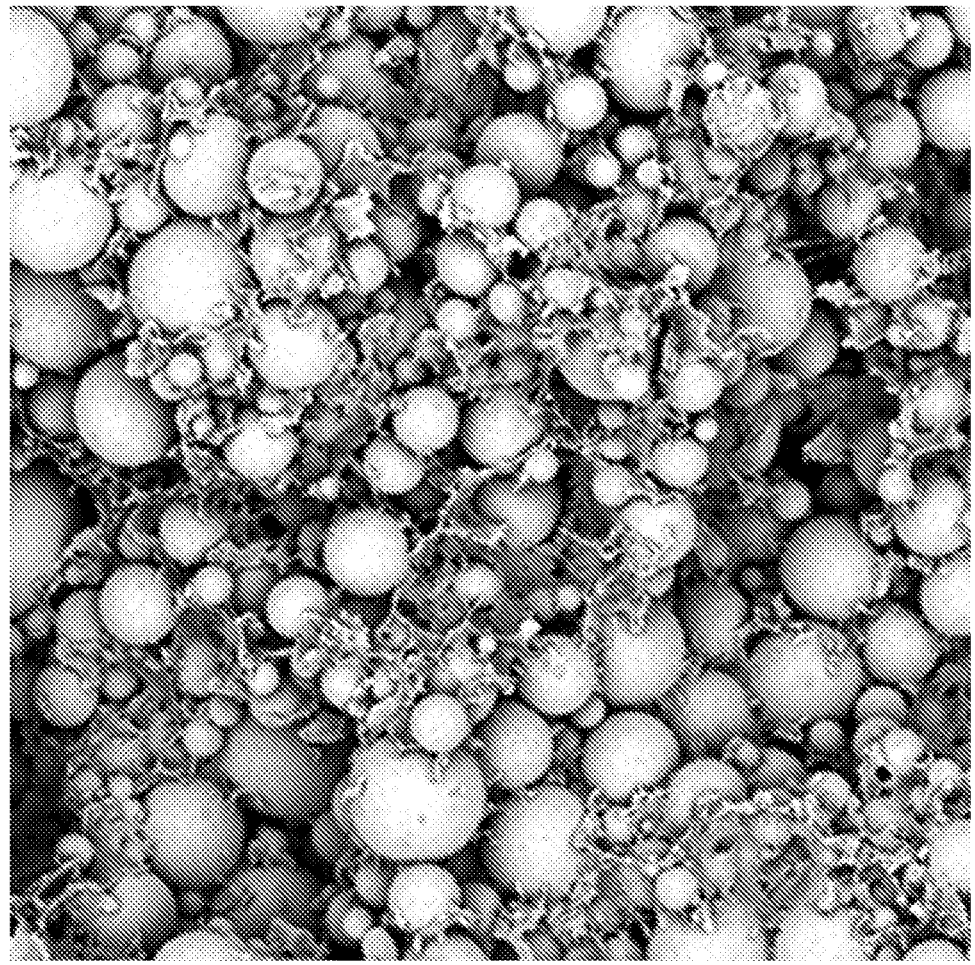
FIGS. 11-13 are scanning electron microscope (SEM) micrographs of cross-sections of exemplary polymer matrix composites (Examples 12, 13, and 14, respectively) described herein.

Referring to FIG. 11, a SEM digital image of a cross-section of the polymer matrix composite is shown.

The resulting polymer matrix composite was 30.4 mils (770 micrometers) thick, had a measured density of 0.33 g/cm$^3$ (as determined by the "Density and Porosity Test"), a porosity of 47.9% (as determined by the "Density and Porosity Test"), and a Gurley air flow of 20.2 sec/50 cm$^3$ (as determined by the "Air Flow Resistance Test"). The thermal conductivity was 0.095 W/(m*K) at a thickness of 580 micrometers (as determined by the "Thermal Insulation Test").

Example 13

Example 13 was prepared and tested as described in Example 12, except the slurry was 2 grams of UHMWPE ("GUR-2126"), 35.5 grams of silica gel (obtained under the trade designation "SILICA GEL 60, 0.036-0.071MM, L14004" from Alfa Aesar, Ward Hill, Mass.), and 61 grams of the low odor kerosene.

Figure 12:

Referring to FIG. 12, a SEM digital image of a cross-section of the polymer matrix composite is shown.

The resulting polymer matrix composite was 34 mils (863.6 micrometers) thick, and had a density of 0.4196 g/cm$^3$, a porosity of 82.6%, a pore size of 8.0 micrometers (as determined by the "Bubble Point Pressure") and a Gurley air flow of 5.9 sec/50 cm$^3$. The thermal conductivity was 0.1011 W/(m*K) at a thickness of 740 micrometers.

Example 14

Example 14 was prepared and tested as described in Example 12, except the slurry was 3 grams of UHMWPE ("GUR-2126"), 35.5 grams of unexpanded vermiculite (obtained under the trade designation "VERMICULITE TYPE D" from 3M Company), and 30 grams of the low odor kerosene.

Figure 13:

Referring to FIG. 13, a SEM digital image of a cross-section of the polymer matrix composite is shown.

The resulting polymer matrix composite was 34 mils (863.6 micrometers) thick, and had a density of 1.05 g/cm$^3$, a porosity of 52.7%, a pore size of 10.3 micrometers, and a Gurley air flow of 129.2 sec/50 cm$^3$. The thermal conductivity was 0.1217 W/(m*K) at a thickness of 740 micrometers.

Example 15

A 120-milliliter (4-ounce) glass jar was charged with 1.49 gram of the UHMWPE ("GUR-2126"), and 20.01 grams of intercalated crystalline graphite (obtained under the trade designation "GRAFGUARD 160-50N" from GrafTech International Holdings Inc., Independence, OH), and shook with the acoustic mixer ("LABRAM RESONATACOUSTIC MIXER") at 70% intensity for 1 minute. 14 grams of the low odor kerosene was added to this mixture and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500") then a 3 mil (75 micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of 30 mils (762 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 14:

Referring to FIG. 14, a SEM digital image of a cross-section of the polymer matrix composite is shown.

The resulting polymer matrix composite was 30.9 mils (784.9 micrometers) thick and had a measured density of 0.8556 g/cm$^3$ (as determined by the "Density and Porosity Test"), a porosity of 58.2% (as determined by the "Density and Porosity Test"), and a volume of 615 mm$^3$ (as determined by the "Volume Expansion Test").

The resulting film was then placed in a lab oven for 15 minutes that had reached an equilibrium temperature of 250° C. This caused the intercalated crystalline graphite to expand. The resulting volume expansion was 63.5 times (as determined by the "Volume Expansion Test").

Figure 15A:
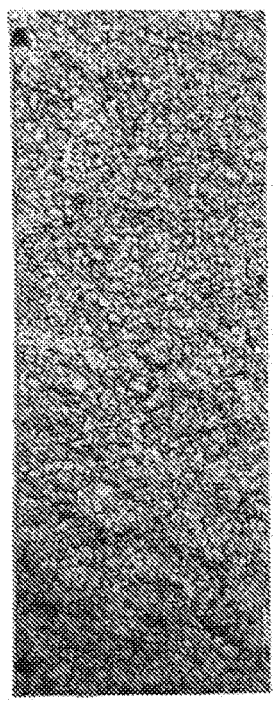
Figure 15B:
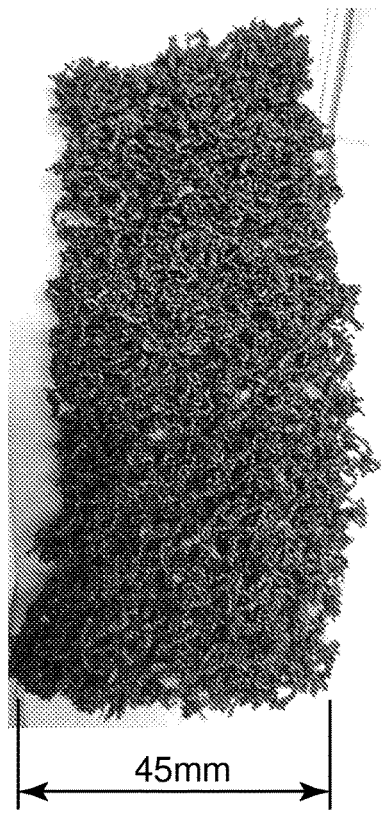

Referring to FIG. 15A (pre-expansion) and 15B (post-expansion) a digital picture of a top view of the polymer matrix composite taken with an optical camera.

Example 16

Example 16 was prepared and tested as described in Example 15, except the slurry was 1.5 gram of UHMWPE ("GUR-2126"), 20.04 grams of expandable graphite (obtained under the trade designation "ASBURY 3772" from Asbury Carbons, Inc., Asbury, N.J.), and 19 grams of the low odor kerosene.

The resulting polymer matrix composite was 37.6 mils (955 micrometers) thick, and had a density of 0.710 g/cm$^3$, a porosity of 65.5 and a volume of 765 mm$^3$.

Referring to FIG. 16, a scanning electron microscope (SEM) digital image of a cross-section of the polymer matrix composite is shown.

The resulting film was then placed in a lab oven for 15 minutes that had reached an equilibrium temperature of 250° C. This caused the intercalated crystalline graphite to expand. The resulting volume expansion was 20.6 times.

Referring to FIGS. 17A (pre-expansion) and 17B (post-expansion) a digital picture of a top view of the polymer matrix composite taken with an optical camera.

Example 17

Example 17 was prepared and tested as described in Example 15, slurry was 3 grams of UHMWPE ("GUR-2126"), 35.5 grams of expandable vermiculite (obtained under the trade designation "TYPE D VERMICULITE" from 3M Company), and 30 grams of the low odor kerosene.

Referring to FIG. 8, a scanning electron microscope (SEM) digital image of a cross-section of the polymer matrix composite is shown.

The resulting polymer matrix composite was 33.8 mils (858.5 micrometers) thick, and had a density of 1.045 g/cm$^3$, a porosity of 52.7 and a volume of 661 mm$^3$.

The resulting film was then placed in a lab oven for 15 minutes that had reached an equilibrium temperature of 350° C. This caused the intercalated crystalline graphite to expand. The resulting volume expansion was 5.6 times.

Referring to FIGS. 19A (pre-expansion) and 19B (post-expansion) a digital picture of a top view of the polymer matrix composite taken with an optical camera.

Example 18

A 120-milliliter (4-ounce) glass jar was charged with 1.5 gram of the UHMWPE, and 15.0 grams of functional azlactone particles (obtained under the trade designation "EMPHAZE AB-1 BEADS" from 3M Company) and shook with the acoustic mixer ("LABRAM RESONATACOUSTIC MIXER") at 70% intensity for 1 minute. 47.0 grams of the low odor kerosene was added to this mixture, and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500"), then a 3-mil (75-micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of about 30 mils (762 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After solvent evaporation, the polymer matrix composite was removed from the oven, allowed to cool to ambient temperature, and characterized.

Referring to FIGS. 20A and 20B, a SEM digital image of a cross-section of the polymer matrix composite taken with the SEM is shown. The azlactone functional particles shown are porous. The surface area including area from internal porosity of the particles was about 350 m$^2$/gram.

The resulting polymer matrix composite was 33.9 mils (0.86 millimeter) thick and had a density of was 0.29 g/cm³ (as determined by the "Density and Porosity Test"), a pore size of 10.3 micrometers (as determined by the "Bubble Point Pressure Test"), and had a Gurley airflow of 4.5 sec/50 cm³ (as determined by the "Air Flow Resistance Test").

Example 19

Example 19 was prepared as described for Example 18, except the functional azlactone particles ("EMPHAZE AB-1 BEADS") were replaced with 30 grams of jet milled, crosslinked guanylated polyethylenimine (G-PEI) (prepared as described in the Examples for U.S. Pat. Pub. No. 2017/0049926 (Langer-Anderson et al.), the disclosure of which is incorporated herein by reference, and 15 grams of 5-micrometer polyamide (obtained under the trade designation "ORGASOL" from Arkema, King of Prussia, Pa.) particles were added, and 25 grams of the low odor kerosene was used.

Figure 21A:
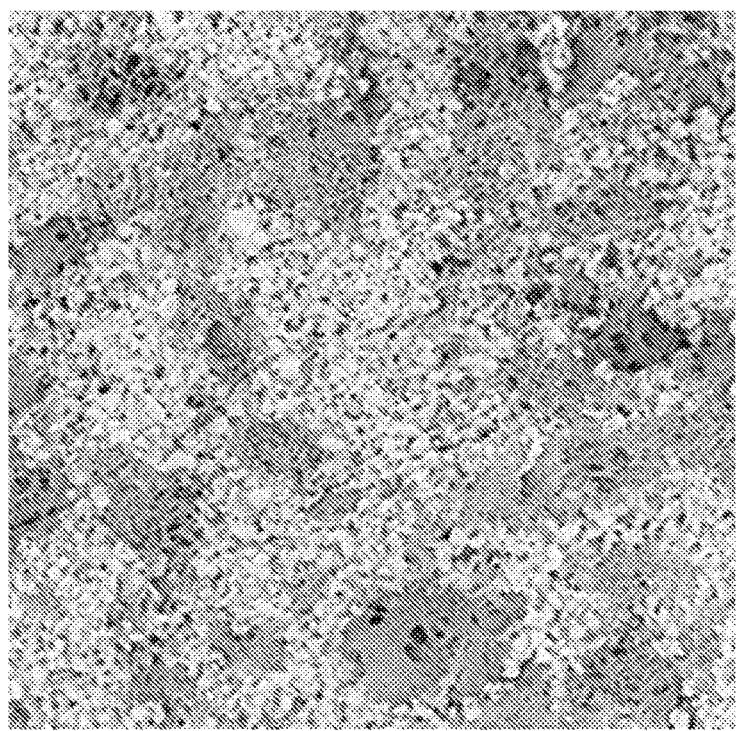
FIGS. 21A and 21B, show scanning electron microscope (SEM) micrographs of cross-sections of an exemplary polymer matrix composite (Example 19) described herein.
Figure 21B:
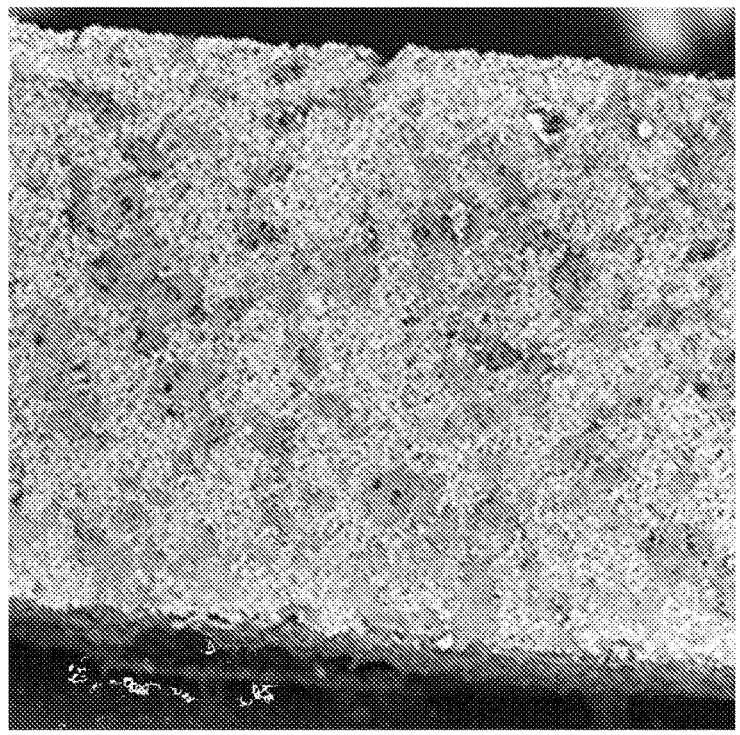

Referring to FIGS. 21A and 21B, a scanning electron microscope (SEM) digital image of a cross-section of the polymer matrix composite is shown. The original functional G-PEI particles were not porous to begin with. The larger and darker jet milled G-PEI particles dispersed in the matrix at least partially dissolved or swelled during the phase separation process and are separated by the smaller white polyamide filler particles as shown.

The resulting polymer matrix composite was 30.0 mils (0.76 millimeter) thick, and a pore size of 6.3 micrometers.

Polymer matrix composite samples were analyzed for static protein binding capacity by incubating disks of the composite in a solution of the test analyte overnight. Each disk was prepared by die-punching a 6-mm diameter disk from a polymer matrix composite sheet. Each disk was placed in a 5-mL centrifuge tube with 4.5 mL of bovine serum albumin (BSA) challenge solution (obtained as Catalog #A-7906 from Sigma Aldrich, St. Louis, Mo.) at a concentration of about 3.0 mg/ml in 25 millimolar tris (hydroxymethyl)aminomethane (TRIS) buffer, 50 millimolar NaCl, pH 8.0. The tubes were capped, and tumbled overnight (14 hours) on a rotating mixer (obtained under the trade designation "LABQUAKE" from Thermal Scientific, Waltham, Mass.). The supernatant solutions were analyzed using a UV-VIS spectrometer at 280 nm (with background correction applied at 325 nm). The static binding capacity for each substrate was determined by comparison to the absorption of the starting BSA solution, and results were calculated in mg of BSA bound/cm³ of composite volume. Three disks were analyzed on each of two different days. The BSA binding capacity (average of the six measurements) was 133 mg/cm³.

Example 20

Example 20 was prepared as described for Example 18, except the functional azlactone particles ("EMPHAZE AB-1 BEADS") were replaced with 5 grams of low density glass bubbles (obtained under the trade designation "3M GLASS BUBBLES K1" from 3M Company) having a dot pattern coating of nanosilver made in accordance as described in the Examples for U.S. Pat. No. 8,698,394 (McCutcheon et al.), the disclosure of which is incorporated herein by reference, and 23 grams of the low odor kerosene was used.

Referring to FIG. 22, a scanning electron microscope (SEM) digital image of a cross-section of the polymer matrix composite is shown. The SEM shows a leafy lace polymer matrix structure surrounding the coated glass bubbles.

The resulting polymer matrix composite was 29.6 mils (0.75 millimeter) thick, had a density of 0.09 g/cm³, a pores size of 4.1 micrometers, and had a Gurley airflow of 5.9 sec/50 cm³.

Example 21

Example 21 was prepared as described for Example 18, except the functional azlactone particles were replaced application with 25 grams of guanylated perlite particles (obtained under the trade designation "PERLITE 4106" from Sigma Aldrich Corp., St. Louis, Mo., and prepared as described in Example 1 of PCT Pub. No. WO2016/149233 (Griesgraber et al.), published Sep. 22, 2016, the disclosure of which is incorporated herein by reference), and 40 grams of the low odor kerosene was used.

Referring to FIG. 23, a scanning electron microscope (SEM) digital image of a cross-section of the polymer matrix composite is shown.

The resulting polymer matrix composite was 29.1 mils (0.74 millimeter) thick, had a density of 0.49 g/cm³, a pore size of 10.3 micrometers, and had a Gurley airflow of 5.9 sec/50 cm³.

Example 22

A 120-milliliter (4-ounce) glass jar was charged with 1.5 gram of the UHMWPE, and 15 grams of aluminum and aluminum oxide coated glass bubbles (the glass bubbles were obtained under the trade designation "3M SCOTCHLITE S60 GLASS BUBBLES" from 3M Company), and coated as described for the Examples of U.S. Pat. No. 8,698,394 (McCutcheon et al.), the disclosure of which is incorporated herein by reference and shook with the acoustic mixer ("LABRAM RESONATACOUSTIC MIXER") at 70% intensity for 1 minute. 17.5 grams of the low odor kerosene was added to this mixture and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500") then a 3-mil (75-micrometer) heat stabilized PET liner was applied in top to sandwich the slurry. The slurry was then spread between the PET liners by using a notch bar set to a gap of 36 mils (914.4 micrometers). The notch bar rails were wider than the PET liner to obtain an effective wet film thickness of 30 mils (762 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 24:
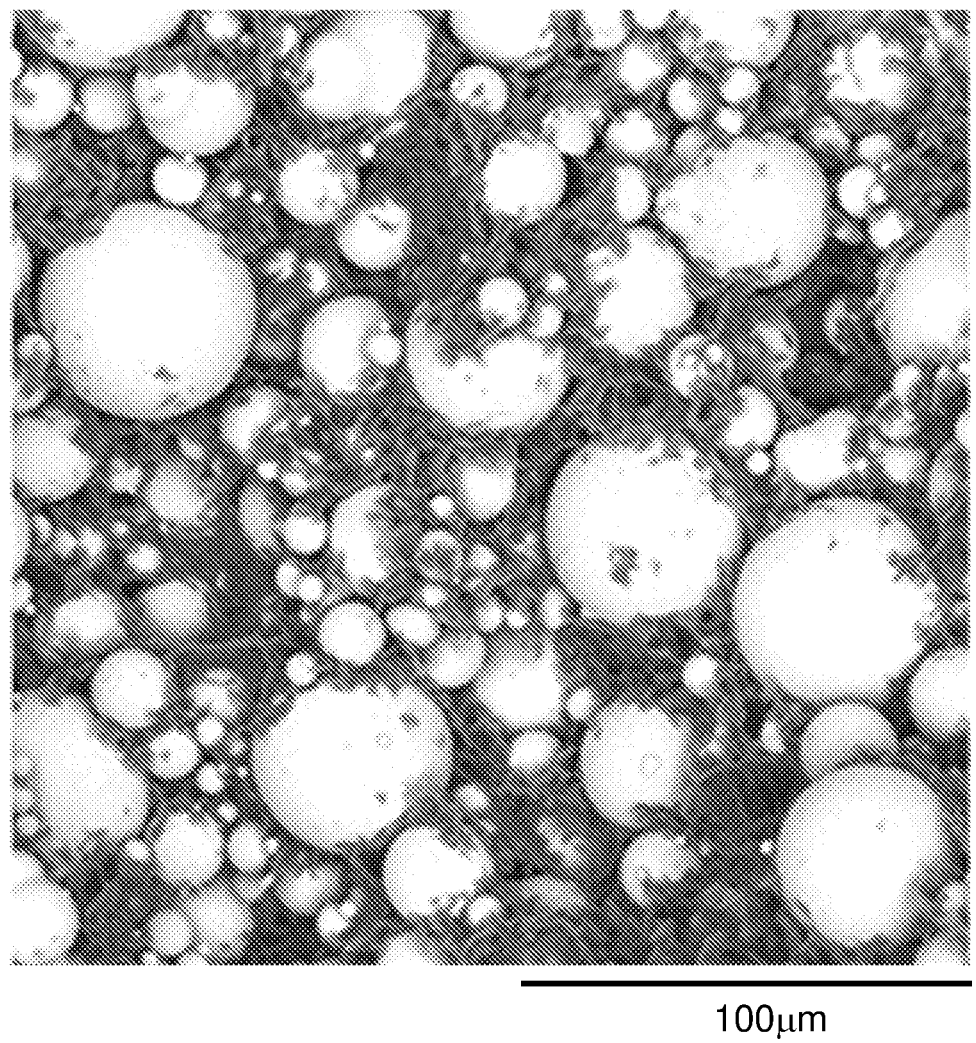
FIG. 24 is a schematic showing a scanning electron microscope (SEM) micrograph of a cross-section of an exemplary polymer matrix composite (Example 22) described herein.

Referring to FIG. 24, a scanning electron microscope (SEM) digital image of a cross-section of the polymer matrix composite taken with the SEM is shown.

The resulting polymer matrix composite was 32.5 mils (826 micrometers) thick, had a measured density of 0.36 g/cm$^3$, (as determined by the "Density and Porosity Test"), a porosity of 42.9% (as determined by the "Density and Porosity Test"), a pore size of 28.8 micrometers (as determined by the "Bubble Point Pressure Test"), a pore size of 28.8 micrometers (as determined by the "Bubble Point Pressure Test"), a Gurley air flow of 21.1 sec/50 cm$^3$ (as determined by the "Air Flow Resistance Test"), a capacitance of 92 picofarad (as determined by the "Dielectric Test"), and a dielectric constant of 17.0 (as determined by the "Dielectric Test"). The dielectric characterization data for the first five examples were reported in Table 1, below.

TABLE 1

| Example No. | UHMWPE, g | Coated Glass, Bubbles g | Neat "S60 Glass Bubbles," g | Kerosene, g | Thickness, micrometers (mils) | Capacitance, pf | Dielectric Constant |
|---|---|---|---|---|---|---|---|
| 22 | 1.5 | 15 | 0 | 17.5 | 826 (32.5) | 92 | 17 |
| 23 | 1.5 | 11.25 | 3.75 | 17.5 | 813 (32) | 75 | 13.6 |
| 24 | 1.5 | 7.5 | 7.5 | 17.5 | 785 (30.9) | 50 | 8.8 |
| 25 | 1.5 | 3.75 | 11.25 | 17.5 | 742 (29.2) | 42 | 7 |
| 26 | 1.5 | 0 | 15 | 17.5 | 803 (31.6) | 41 | 7.3 |

Example 23

Example 23 was prepared and tested as described for Example 22, except 25% weight of the coated glass bubbles were replaced with uncoated glass bubbles ("3M SCOTCHLITE S60 GLASS BUBBLES").

The resulting polymer matrix composite was 32.0 mils (813 micrometers) thick, had a measured density of 0.36 g/cm$^3$, a porosity of 42.9%, a pore size of 36 micrometers, a Gurley air flow of 52.1 sec/50 cm$^3$, and a dielectric constant of 13.6. The dielectric characterization data for Example 23 are reported in Table 1, above.

Example 24

Example 24 was prepared and tested as described for Example 22, except 50% weight of the coated glass bubbles were replaced with uncoated glass bubbles ("3M SCOTCHLITE S60 GLASS BUBBLES").

The resulting polymer matrix composite was 30.9 mils (785 micrometers) thick, had a measured density of 0.36 g/cm$^3$, a porosity of 42.9%, a pore size of 12 micrometers, a Gurley air flow of 56.8 sec/50 cm$^3$, and a dielectric constant of 8.8. The dielectric characterization data for Example 24 are reported in Table 1, above.

Example 25

Example 25 was prepared and tested as described for Example 22, except 75% weight of the coated glass bubbles were replaced with uncoated glass bubbles ("3M SCOTCHLITE S60 GLASS BUBBLES").

The resulting polymer matrix composite was 28.7 mils (729 micrometers) thick, had a measured density of 0.35 g/cm$^3$, a porosity of 44.4%, a pore size of 48 micrometer, a Gurley air flow of 26.4 sec/50 cm$^3$, and a dielectric constant of 6.75. The dielectric characterization data for Example 25 are reported in Table 1, above.

Example 26

Example 26 was prepared and tested as described for Example 22, except all of the dielectric particles were uncoated glass bubbles ("3M SCOTCHLITE S60 GLASS BUBBLES").

The resulting polymer matrix composite was 30.4 mils (772 micrometers) thick, had a measured density of 0.33 g/cm$^3$, a porosity of 47.9%, a pore size of 6.9 micrometers, a Gurley air flow of 20.2 sec/50 cm$^3$, and a dielectric constant of 7.3. The dielectric characterization data for Example 26 are reported in Table 1, above.

Examples 27-31

Examples 27-31 were prepared as described for Examples 22-26, except the coated glass bubbles were replaced with barium titanate (obtained under the trade designation "99% BaTiO$_3$ A0882" from GFS Chemicals, Columbus, Ohio) and the uncoated glass bubbles were replaced with 60-micrometer polyamide particles (obtained under the trade designation "ORGASOL 2002 ES 6 NAT 3" from Arkema). The total weight of the binder, particles and diluent (slurry) in the jar was also adjusted taking account for the particle's change in volume and wetting characteristics. The weights of the polymer binder, particles and diluent is given in Table 2, below.

TABLE 2

| Example No. | UHMWPE, g | BaTiO$_3$, g | Polyamide Particle, g | Kerosene, g | Thickness, micrometers (mils) | Capacitance pf | Dielectric Constant |
|---|---|---|---|---|---|---|---|
| 27 | 1.5 | 25 | 0 | 17.0 | 655 (25.8) | 42.7 | 6.2 |

TABLE 2-continued

| Example No. | UHMWPE, g | BaTiO₃, g | Polyamide Particle, g | Kerosene, g | Thickness, micrometers (mils) | Capacitance pf | Dielectric Constant |
|---|---|---|---|---|---|---|---|
| 28 | 1.5 | 18.75 | 6.25 | 17.0 | 820 (32.3) | 32.7 | 6.0 |
| 29 | 1.5 | 12.5 | 12.5 | 17.0 | 942 (37.1) | 20.0 | 4.2 |
| 30 | 1.5 | 6.25 | 18.75 | 21.0 | 1029 (40.5) | 20.6 | 4.7 |
| 31 | 1.5 | 0 | 25 | 24.0 | 1118 (44.0) | 197 | 4.9 |

The dielectric measurements and results from the polymer matrix composites were recorded in Table 2 (above) from 47 mm disks that were punched out.

The samples that were made and tested in Table 2 (above) were then compressed in the hydraulic press ("WABASH-GENESIS MODEL G30H-15-LP") with 27,215 kilograms (30 tons) pressure between steel plates for 30 seconds at ambient temperature (about 25° C.). The thickness and dielectric constants were measured again and recorded in Table 3, below.

TABLE 3

| Example No. | UHMWPE, g | BaTiO₃, g | Polyamide Particle, g | Kerosene, g | Thickness, micrometers (mils) | Capacitance pf | Dielectric constant |
|---|---|---|---|---|---|---|---|
| 27 | 1.5 | 25 | 0 | 17.0 | 401 (15.8) | 122.2 | 10.9 |
| 28 | 1.5 | 18.75 | 6.25 | 17.0 | 503 (19.8) | 31.3 | 3.5 |
| 29 | 1.5 | 12.5 | 12.5 | 17.0 | 538 (21.2) | 31.1 | 3.7 |
| 30 | 1.5 | 6.25 | 18.75 | 21.0 | 569 (22.4) | 34.5 | 4.4 |
| 31 | 1.5 | 0 | 25 | 24.0 | 625 (24.6) | 30.5 | 4.0 |

Examples 32 and 33

Examples 32 and 33 were prepared and tested as described for Example 27, except the barium titanate concentration was increased as shown in Table 4, below.

TABLE 4

| Example No. | UHMWPE, g | BaTiO₃, g | Polyamide Particle, g | Kerosene, g | Thickness, micrometers (mils) | Capacitance, pf | Dielectric Constant |
|---|---|---|---|---|---|---|---|
| 32 | 1.5 | 50 | 0 | 32.0 | 597 (23.5) | 64.2 | 8.6 |
| 33 | 1.5 | 75 | 0 | 50.0 | 620 (24.4) | 83.2 | 11.5 |

Example 34

Example 34 was prepared as described for Example 22, except the weight of the low odor kerosene was replaced with mineral oil (obtained under the trade designation "KAYDOL" (Product Number 637760) from Brenntag Great Lakes Inc., Wauwatosa, Wis.). The mineral oil was exchanged using isopropyl alcohol before the evaporation step.

Figure 25:
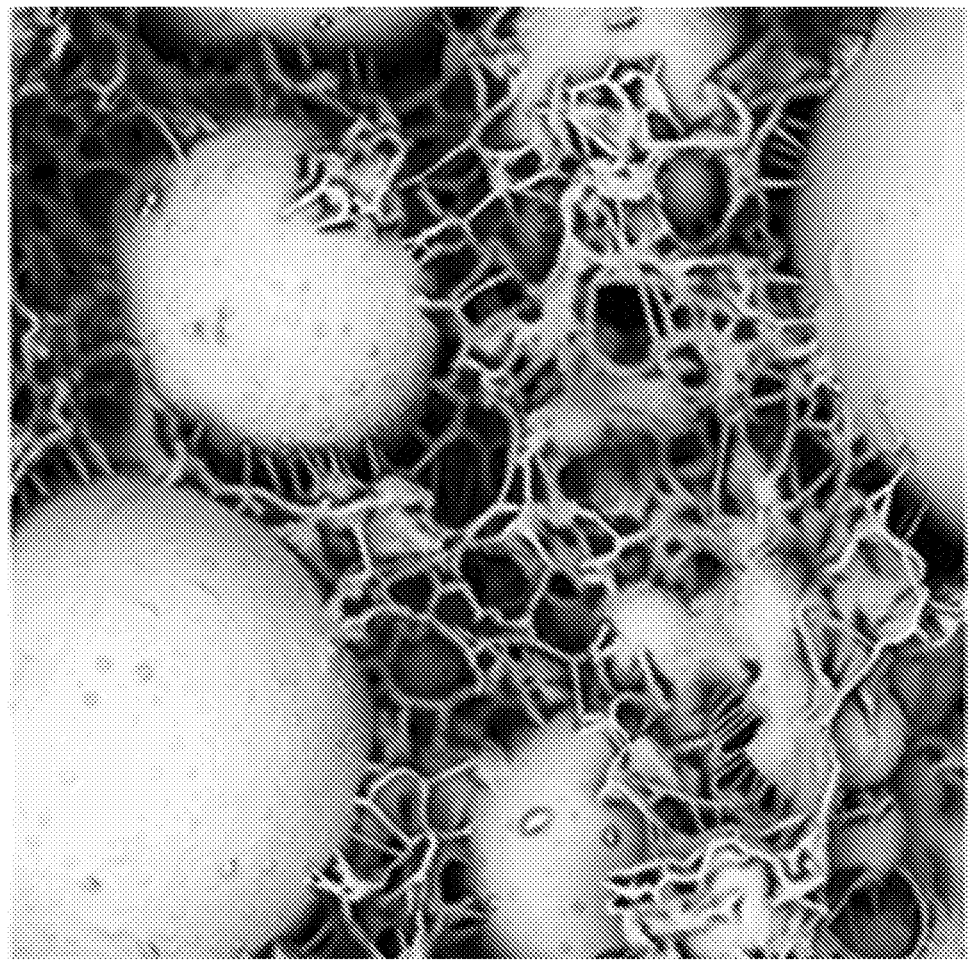
FIG. 25 is a schematic showing a scanning electron microscope (SEM) micrograph of a cross-section of an exemplary polymer matrix composite (Example 34) described herein.

Referring to FIG. 25, a SEM digital image of a cross-section of the polymer matrix composite is shown.

The resulting polymer matrix composite was 33.1.0 mils (841 micrometers) thick and a Gurley air flow of 50.5 sec/50 cm³.

Example 35

Example 35 was prepared as described for Example 22, except the weight of the UHMWPE ("GUR-2126") used was 21 grams and the low odor kerosene was 21 grams.

Figure 26:
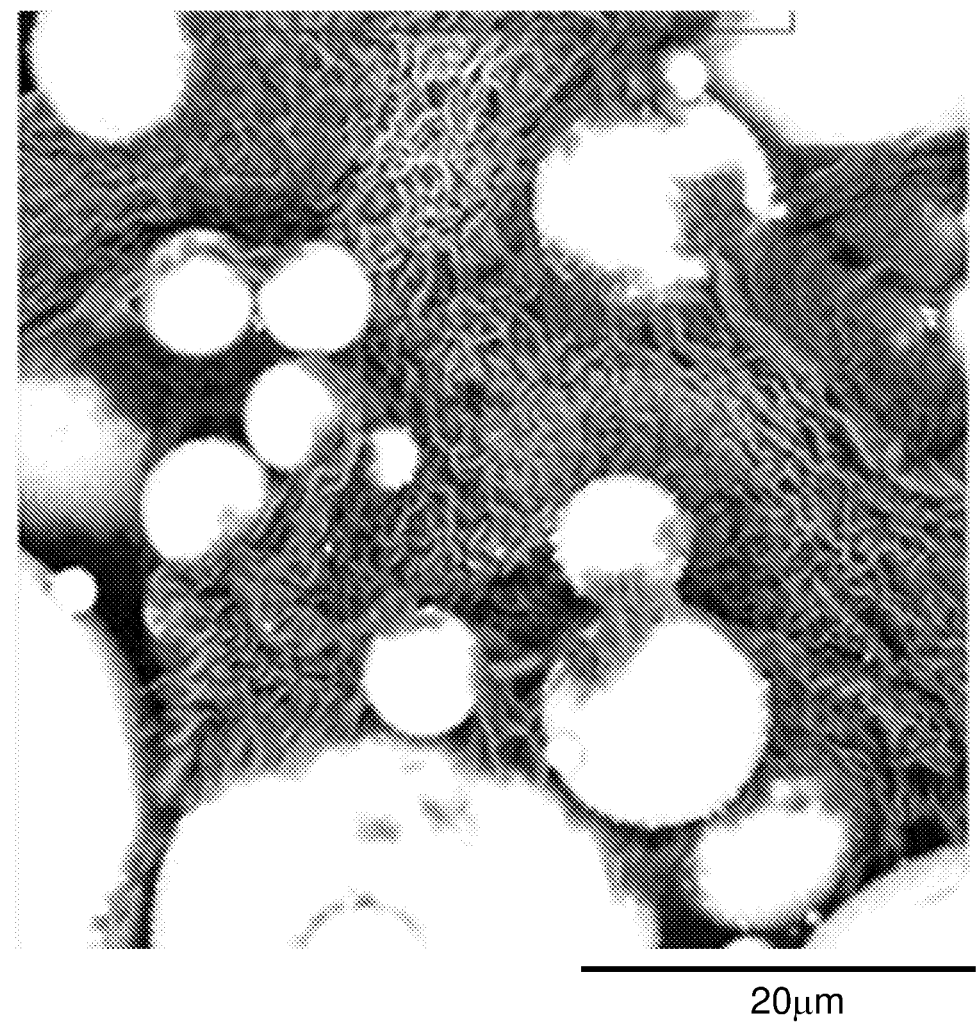
FIG. 26 is a schematic showing a scanning electron microscope (SEM) micrograph of a cross-section of an exemplary polymer matrix composite (Example 35) described herein.

Referring to FIG. 26, a SEM digital image of a cross-section of the polymer matrix composite is shown.

The resulting polymer matrix composite was 33.0 mils (838 micrometers) thick.

Example 36

A 120-milliliter (4-ounce) glass jar was charged with 1.5 gram of the UHMWPE, and 74.0 grams of calcium sulfate desiccant particles (obtained under the trade designation "DRIERITE DESICCANT-ANHYDROUS INDICATING DRIERITE" (Stock #23001) from W.A. Hammond Drierite Company LTD, Xenia, Ohio) that were hand crushed to a powder with a mortar and pestle, and shook with the acoustic mixer ("LABRAM RESONATACOUSTIC MIXER") at 70% intensity for 1 minute. 25.0 grams of the low odor kerosene was added to this mixture and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500"), then a 3 mil (75 micrometer) heat stabilized PET liner ("COATED PET ROLL #33716020500") was applied on top to sandwich the slurry. The slurry was then spread between the PET liners by using a notch bar set to a gap of 76 mils (1930 micrometers). The notch bar rails were wider than the PET liner to obtain an effective wet film thickness of about 70 mils (1930 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After solvent evaporation, the polymer matrix composite was removed from the oven, allowed to cool to ambient temperature, and characterized.

The resulting polymer matrix composite was 69.4 mils (1.76 millimeter) thick had a density of 1.18 g/cm$^3$ immediately after solvent evaporation (prior to allowing any ambient moisture absorption) (as determined by the "Density and Porosity Test"), the density was 1.26 g/cm$^3$ after being allowed to equilibrate in the ambient humidity, the density was 1.38 g/cm$^3$ after becoming fully saturated with liquid water, and had a Gurley airflow of 38.6 sec/50 cm$^3$ (as determined by the "Air Flow Resistance Test") immediately after solvent evaporation.

The polymer matrix composite layer film was light blue color when dry, and turned off white to a pinkish hue after being allowed to equilibrate in the ambient humidity and finally being saturated with liquid water. The moisture absorption and color change of this polymer matrix composite was reversible upon drying and rewetting.

Example 37

Example 37 was prepared as described for Example 36, except the calcium sulfate desiccant particles ("DRIERITE DESICCANT-ANHYDROUS INDICATING DRIERITE") were replaced with 23.0 grams of amino acid L-Lysine monohydrochloride particles (obtained under the trade designation "L-LYSINE MONOHYDROCHLORIDE, L-5626" from Sigma, Saint Louis, Mo.) and 2 grams of phenolphthalein particles (obtained under the trade designation "PHENOPHTHALEIN, PX0520-1" from EMD Chemicals Inc., Gibbstown, N.J.) were added, and 24 grams of the low odor kerosene was used to make the slurry. The notch bar gap was set to 36 mils (914.4 micrometers).

The resulting polymer matrix composite was 31.1 mils (0.79 millimeter) thick. The polymer matrix composite had a density of 0.62 g/cm$^3$, a pore size of 4.2 micrometers (as determined by "Bubble Point Pressure Test") and a Gurley airflow of 19.0 sec/50 cm$^3$ air.

The polymer matrix composite layer was white in color and turned to a red hue when exposed to water with a pH greater than 8 (0.1N potassium hydroxide).

Example 38

Example 38 was prepared as described for Example 36, except 20.0 grams of amino acid L-Lysine monohydrochloride particles ("L-LYSINE MONOHYDROCHLORIDE, L-5626") were used and the phenolphthalein particles were omitted. 26 grams of the kerosene was used to make the slurry.

The resulting polymer matrix composite was 29.6 mils (0.75 millimeter) thick. The polymer matrix composite had a density of 0.62 g/cm$^3$, and a Gurley airflow of 21.0 sec/50 cm$^3$ air.

Referring to FIG. 27, a SEM digital image of a cross-section of the Example 38 polymer matrix composite with leafy lace binder 401, phenolphthalein 402, and L-Lysine monohydrochloride 403) is shown.

The polymer matrix composite layer was white in color and did not change color when exposed to water with a pH greater than 8.

Example 39

Example 39 was prepared as described for Example 36, except the calcium sulfate desiccant particles ("DRIERITE DESICCANT-ANHYDROUS INDICATING DRIERITE") were replaced with 8.0 grams of low density glass bubbles (obtained under the trade designation "3M GLASS BUBBLES K1" from 3M Company), and coated as described for the Examples of U.S. Pat. No. 8,698,394 (McCutcheon et al.), the disclosure of which is incorporated herein by reference, and 42 grams of the low odor kerosene was used. The notch bar gap was set to 36 mils (914.4 micrometers).

The resulting polymer matrix composite was 29.6 mils (0.75 millimeter) thick. The polymer matrix composite had a density of 0.09 g/cm$^3$, a pore size of 4.1 micrometers, and a Gurley airflow of 5.9 sec/50 cm$^3$ air.

Referring to FIG. 28, a scanning electron microscope (SEM) digital image of a cross-section of the Example 39 polymer matrix composite is shown.

Example 40

Example 40 was prepared as described for Example 35, except the calcium sulfate desiccant particles ("DRIERITE DESICCANT-ANHYDROUS INDICATING DRIERITE") were replaced with 117.0 grams of zinc sulfide phosphorescent particles (obtained under the trade designation "NATURAL GREEN EMITTING 6SSU" from United Mineral & Chemical Corporation, Lyndhurst, N.J.), and 30 grams of the kerosene was used. The notch bar gap was set to 36 mils (914.4 micrometers).

The resulting polymer matrix composite was 34.1 mils (0.87 millimeters) thick. The polymer matrix composite had a density of 1.85 g/cm$^3$, and a Gurley airflow of 3.0 sec/50 cm$^3$ air.

The resulting polymer matrix composite was exposed to normal office lights. The lights were then turned off and the sample glowed.

Example 41

Example 41 was prepared as described for Example 40, except a wet-laid resin bond nonwoven web (obtained under the trade designation "UNIBLEND 135" from Midwest Filtration Corporation, Cincinnati, Ohio) was placed on the bottom liner where the slurry was imbibed into the nonwoven leaving a smooth top surface after the top liner was removed. The bottom surface of the polymer matrix composite was course from the imprints of the nonwoven as the slurry bled through.

The resulting polymer matrix composite was 34.6 mils (0.88 millimeters) thick. The polymer matrix composite had a density of 1.37 g/cm$^3$, and a Gurley airflow of 7.1 sec/50 cm$^3$ air.

Example 42

A 120-milliliter (4-ounce) glass jar was charged with 1.5 gram of the UHMWPE, and 20.0 grams of amino acid L-Lysine monohydrochloride particles (obtained under the trade designation "L-5626" from Sigma, Saint Louis, Mo.), and shook with the acoustic mixer ("LABRAM RESONA- TACOUSTIC MIXER") at 70% intensity for 1 minute. 26.0 grams of the low odor was added to this mixture and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500") then a 3-mil (75-micrometer) heat-stabilized PET liner was applied on top to sandwich the slurry. The slurry was then spread between the PET liners by using a notch bar set to a gap of 36 mils (914 micrometers). The notch bar rails were wider than the PET liner to obtain an effective wet film thickness of about 30 mils (914 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After solvent evaporation, the polymer matrix composite was removed from the oven, allowed to cool to ambient temperature, and characterized.

Figure 29:

Referring to FIG. 29, a SEM digital image of a cross-section of the polymer matrix composite is shown.

The resulting polymer matrix composite was 29.6 mils (0.75 millimeter) thick, had a density of 0.62 g/cm$^3$ (as determined by the "Density and Porosity Test"), a pore size of 4.2 micrometers (as determined by the "Bubble Point Pressure Test"), and a Gurley airflow of 21.0 sec/50 cm$^3$ air (as determined by the "Air Flow Resistance Test").

Example 43

Example 43 was made as described for Example 42, except the L-Lysine monohydrochloride particles were replaced with 30 grams of poly(acrylic acid), partial sodium salt-graft-poly(ethylene oxide) (obtained from Sigma-Aldrich) and 25 grams of the low odor kerosene was used. The notch bar gap was set at 50 mils (1.27 mm).

The resulting polymer matrix composite was 45.0 mils (0.76 millimeter) thick. The polymer matrix composite density was 0.78 g/cm$^3$. Referring to FIGS. 30A and 30B, SEM digital images of cross-sections of the UHMWPE ("GUR-2126"), of the ultrahigh molecular weight polyethylene and 20 grams of the low odor kerosene was used.

Referring to FIG. 32, a SEM digital image of a cross-section of the polymer matrix composite is shown.

The resulting polymer matrix composite was 36.7 mils (0.93 millimeter) thick. The polymer matrix composite density was 1.14 g/cm$^3$ and had a Gurley air flow of 7.3 sec/50 cm$^3$ air. The porosity was calculated at 66.4% (as determined by the "Density and Porosity Test") and the pore size was 5.5 micrometers (as determined by the "Bubble Point Pressure Test").

Example 45

Example 45 was made as described for Example 44, except the anhydrous copper (II) sulfate particles were replaced with 45 grams of copper (II) sulfate pentahydrate (ACS, 98.0-102.0% crystalline, 14178, obtained from Alfa Aesar).

Figure 33:
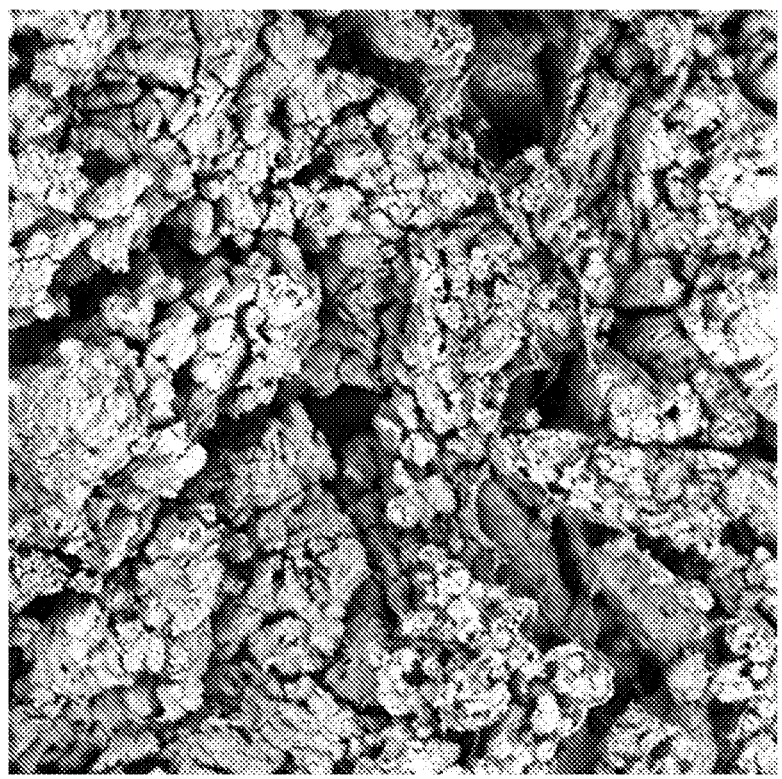

Referring to FIG. 33, aSEM digital image of a cross-section of the polymer matrix composite is shown.

The resulting polymer matrix composite was 40.6 mils (1.03 millimeter) thick, had a density was 1.06 g/cm$^3$ and had a Gurley air flow of 10.8 sec/50 cm$^3$ air. The porosity was calculated at 51.6% and the pore size was 5.0 micrometers.

Example 46

A 120-milliliter (4-ounce) glass jar was charged with 1.75 gram of the UHMWPE ("GUR-2126"), and 23.2 grams of calcium sulfate dihydrate (obtained under the trade designation "CALCIUM SULFATE DIHYDRATE, ACS, 98.0-102.0% POWDER, 36700" from Alfa Aesar), and shook with the acoustic mixer ("LABRAM RESONATACOUS-TIC MIXER") at 70% intensity for 1 minute. 23 grams of the low odor kerosene was added to this mixture and stirred by hand with a spatula until a uniform slurry was obtained. The slurry was applied with a scoop at room temperature (about 25° C.) to a 3-mil (75-micrometer) heat stabilized PET liner ("COATED PET ROLL #33716020500"), then a 3-mil (75-micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of 30 mils (762 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 34:
FIGS. 34-37 show scanning electron microscope (SEM) micrographs of cross-sections of an exemplary polymer matrix composite (Examples 46, 47, 48, and 49 respectively) described herein.

Referring to FIG. 34, a SEM digital image of a cross-section of the polymer matrix composite is shown.

The resulting polymer matrix composite was 31.2 mils (792.5 micrometers) thick and had a measured density of 0.873 g/cm$^3$ (as determined by the "Density and Porosity Test"), a porosity of 58.4% (as determined by the "Density and Porosity Test"), a Gurley air flow resistance of 223 sec/50 cm$^3$ (as determined by the "Air Flow Resistance Test Test"), a bubble point pore size of 1.9 micrometer (as determined by the "Bubble Point Pressure Test"), and an energy removal of 461 J/g (as determined by the "Endothermic Test").

Example 47

Example 47 was prepared and tested as described in Example 46, except the slurry was 3.5 grams of UHMWPE ("GUR-2126"), 46.5 grams of sodium bicarbonate (obtained under the trade designation "SODIUM BICARBONATE, 7412-12" from Macron Fine Chemicals, Center Valley, Pa.), and 19.5 grams of the low odor kerosene.

Figure 35:

Referring to FIG. 35, a SEM digital image of a cross-section of the polymer matrix composite is shown.

The resulting polymer matrix composite was 27.6 mils (701 micrometers) thick, and had a density of 0.664 g/cm$^3$, a porosity of 67%, a Gurley air flow resistance of 58 sec/50 cm$^3$, a bubble point pore size of 3.3 micrometers, and an energy removal of 704 J/g.

Example 48

Example 48 was prepared and tested as described in Example 46, except the slurry was 1.75 gram of UHMWPE ("GUR-2126"), 23.25 grams of calcium sulfate dihydrate (obtained under the trade designation "TERRA ALBA NO. 1, CALCIUM SULFATE" from U.S. Gypsum Company, Chicago, Ill.), and 17.5 grams of the low odor kerosene.

Figure 36:
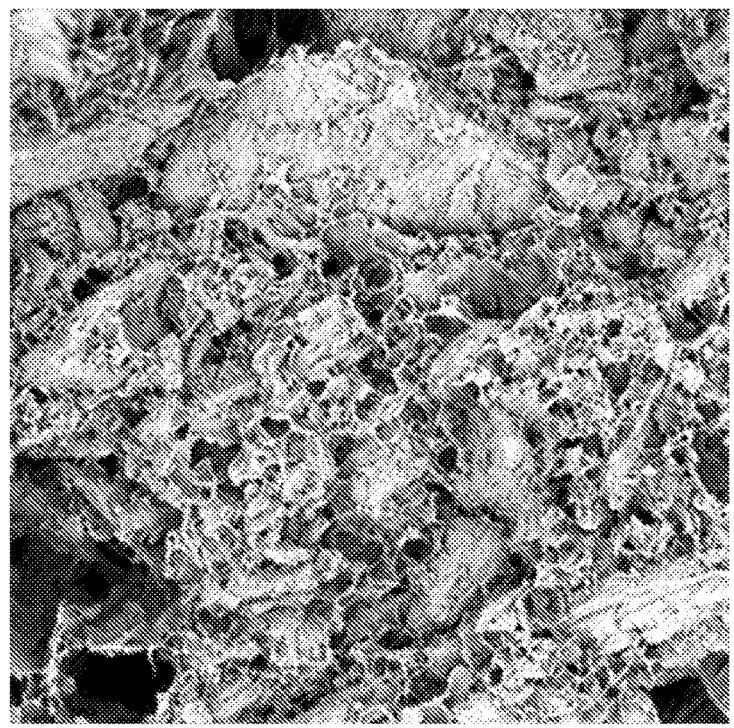

Referring to FIG. 36, a SEM digital image of a cross-section of the polymer matrix composite is shown.

The resulting polymer matrix composite was 45.4 mils (1153 micrometers) thick, and had a density of 0.7729 g/cm$^3$, a porosity of 64.2%, a Gurley air flow resistance of 234 sec/50 cm$^3$, a bubble point pore size of 1.9 micrometer, and an energy removal of 211 J/g.

Example 49

Example 49 was prepared and tested as described in Example 46, except the slurry was 3.5 grams of UHMWPE ("GUR-2126"), 46.5 grams of aluminum trihydrate (obtained under the trade designation "SB30 ALUMINUM TRIHYDRATE" from Huber Corporation, Atlanta, Ga.), and 25 grams of the low odor kerosene.

Figure 37:
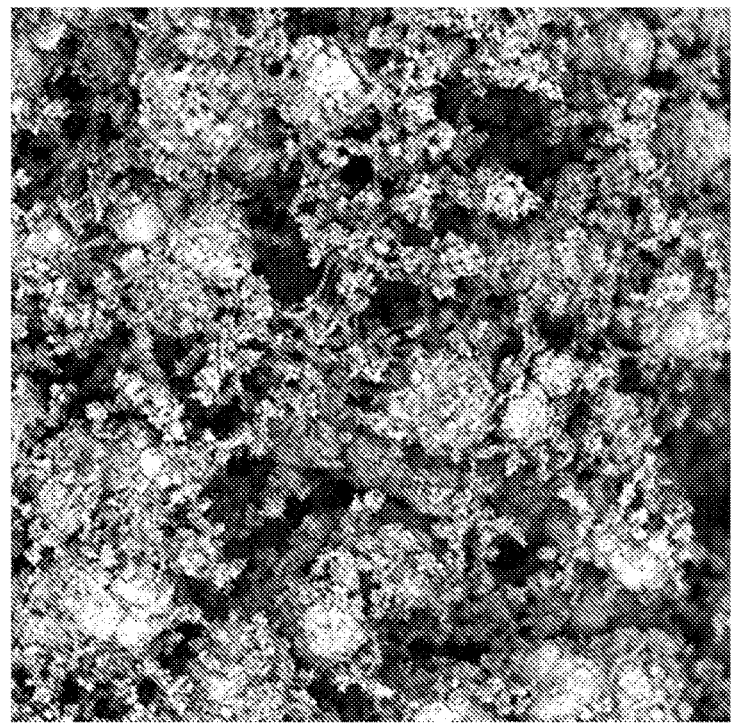

Referring to FIG. 37, a SEM digital image of a cross-section of the polymer matrix composite is shown.

The resulting polymer matrix composite was 46.5 mils (1181 micrometers) thick, and had a density of 0.995 g/cm$^3$, a porosity of 54.3%, a Gurley air flow resistance of 1 sec/50 cm$^3$, a bubble point pore size of 24 micrometers, and an energy removal of 761 J/g.

Example 50

A one gallon (3.8 liter) can was charged with 22 grams of UHMWPE ("GUR-2126"), and 471 grams of magnetic metal flakes (obtained under the trade designation "SEND-UST SP-3B" from Mate Co., LTD, Okayama, Japan), and tumbled with a mixer (obtained under the trade designation "MIX-MASTER 5" from INDCO Inc., New Albany, Ind.) for one hour. 507 grams of the low odor kerosene was added to this mixture and stirred by hand with a spatula until a uniform slurry was obtained. The slurry was applied with a scoop at room temperature (about 25° C.) to a 3 mil (75 micrometer) thick, 12 inches (30.5 cm) wide, heat stabilized polyethylene terephthalate (PET) liner ("COATED PET ROLL #33716020500") then a 3-mil (75-micrometer), 12 inches (30.5 cm) wide, heat stabilized PET liner ("COATED PET ROLL #33716020500") was applied to sandwich the slurry. The slurry was then spread between moving PET liners by conveying through a nip roller set to a gap of 40 mils (1016 micrometers). The PET liners were pulled with a tension of 2.3 kg (5 pounds) from a winding stand obtaining an effective wet film thickness of about 35 mils (889 micrometers). The sandwiched, formed slurry was conveyed at a speed of 5 feet per minute (1.5 meter per minute) through a 4-zone, 27 feet (8.2 meters) long, gas-heated, convection oven set with air flotation having height-adjustable nozzles (obtained from Advanced Systems Inc., Green Bay, Wis.) at 135° C. (275° F.) to activate (i.e., to allow the UHMWPE to dissolve into the solvent). The activated sandwiched formed slurry was conveyed from the oven and allowed to air cool to ambient temperature (about 25° C.) forming a solvent filled polymer matrix composite. Both the top and bottom liners were removed exposing the polymer matrix composite to air. A sample of the polymer matrix composite was then placed on a PET liner ("COATED PET ROLL #33716020500") on a tray and the tray inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 39:
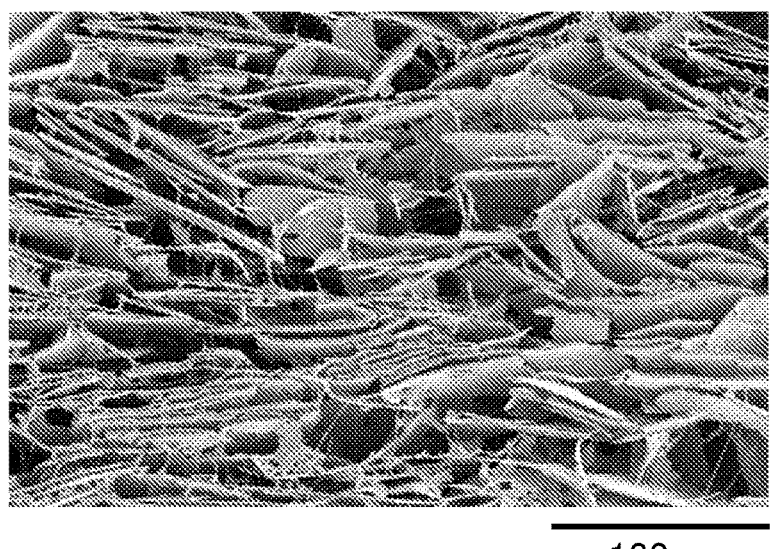
FIG. 39 is a schematic showing a scanning electron microscope (SEM) micrograph of a cross-section of an exemplary polymer matrix composite (Example 50) described herein.

Referring to FIG. 39, a SEM digital image of a cross-section of the polymer matrix composite is shown.

The resulting polymer matrix composite was 34.5 mils (875 micrometers) thick and had a measured density of 0.77 g/cm$^3$ (as determined by the "Density and Porosity Test"), a porosity of 83.1% (as determined by the "Density and Porosity Test"), a Gurley air flow of 4.5 sec/50 cm$^3$ (as determined by the "Air Flow Resistance Test"), relative magnetic permeability at one megahertz of 12.4 (as determined by "Magnetic Test II"), saturation induction of 0.1 Tesla (as determined by "Magnetic Test I") and a coercivity of 0.92 Oersted (73.2 amps/meter) (as determined by "Magnetic Test I").

Example 51

Example 51 was prepared and tested as described for Example 50, except an 18 mm diameter piece of the polymer matrix composite was punched out, placed between two release liners, and then placed between two sheet metal plates. The sample was compressed in the hydraulic press ("WABASH-GENESIS MODEL G30H-15-LP") under 9072 kilograms (10 tons) of pressure at ambient temperature (about 25° C.) for 15 seconds.

The resulting polymer matrix composite was 7.5 mils (190 micrometers) thick and had a measured density of 3.5 g/cm$^3$ (as determined by the "Density and Porosity Test"), relative magnetic permeability at one megahertz of 75.0, saturation induction of 0.5 Tesla, and a coercivity of 4.4 Oersted (350 amps/meter).

Example 52

Alumina particles (obtained under the trade designation "VERSAL V-250" from UOP LLC, Des Plaines, Ill.) were heat-treated by placing them in an alumina crucible and heating them in a pre-heated kiln (obtained under the trade designation "DRAGON 24" from Paragon Industry, Mesquite, Tex.) at 750° C. for 1 hour, after which they were removed and allowed to cool. The heat-treated particles were then silane-treated as follows. A 12-L round bottom flask fitted with mechanical stirring, was made inert with nitrogen and a thermocouple-controlled heating mantle was charged with 4800 grams of deionized water and 1200 grams of ethanol (obtained from JT Baker, Center Valley, Pa.). With moderate agitation, 1500 grams of the heat-treated alumina particles were added slowly to form a uniform slurry. The pH of the resulting mixture was adjusted to a pH of 9 to 10 using 1.0 N NaOH (obtained from VWR, Radnor, Pa.). Then 26.03 grams of isooctyl silane (obtained as "SILRES BS1316" from Wacker Chemie AG, Munich, Germany) was added to the mixture. The mixture was heated to 80° C. with stirring for 16 hours. The mixture was cooled and the solids were collected by filtration using a Buchner funnel. The solids were washed with 380 grams of ethanol then transferred to an aluminum pan. The solids were dried in an oven overnight at 140° C.

A plastic mixing cup (obtained under the trade designation "MAX 60 CUP" from FlackTek, Inc., Landrum, S.C. Inc) for a speed mixer (obtained under the trade designation "SPEEDMIXER DAC600.2 VAC-P" from FlackTek, Inc.) was charged with 1.3 gram of UHMWPE ("GUR-2126"), and 21.7 grams of paraffin (obtained under the trade designation "ISOPAR G" from Brenntag Great Lakes, Inc., Wauwatosa, Wis.) and was mixed at 1000 rpm for 15 seconds, followed by 2200 rpm for 120 seconds.

8 grams of the silane treated alumina particles were added slowly to the plastic mixing cup ("MAX 60 CUP") and stirred by hand with a spatula until a uniform slurry was obtained. The slurry in the plastic mixing cup ("MAX 60 CUP") (with vented lid applied) was then run on the speed mixer at 800 rpms for 15 seconds at 720 ton followed by 800 rpm for 180 seconds at 30 ton. After mixing, the slurry was applied with a scoop at room temperature (about 25° C.) to a 3-mil (75-micrometer) heat stabilized PET liner ("COATED PET ROLL #33716020500") then a 3-mil (75-micrometer) heat stabilized PET liner ("COATED PET ROLL #33716020500") was applied on top to sandwich the slurry. The slurry was then spread between the PET liners by using a notch bar set to a gap of 30 mils (762 micrometers). The notch bar rails were wider than the PET liner to obtain an effective wet film thickness of 24 mils (610 micrometers). Progressive multiple passes with increasing downward pressure of the notch bar were used to flatten the slurry. The sandwiched, formed slurry was placed on an aluminum tray and placed in the lab oven ("DESPATCH RFD1-42-2E"), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.) forming a solvent filled polymer matrix composite. Both the top and bottom liners were removed exposing the polymer matrix composite to air. The polymer matrix composite was then placed back on a PET liner ("COATED PET ROLL #33716020500") on the tray and the tray inserted into the lab oven ("DESPATCH RFD1-42-2E") at 107° C. (225° F.) for two hours and ten minutes. After evaporation, the polymer matrix composite was removed from the oven, allowed to cool to ambient temperature, and characterized.

The resulting polymer matrix composite was 21.6 mils (549 micrometers) thick and had a measured density of 0.32 g/cm$^3$ (as determined by the "Density and Porosity Test"), a porosity of 91% (as determined by the "Density and Porosity Test"), a Gurley air flow of 7.7 sec/50 cm$^3$ (as determined by the "Air Flow Resistance Test"), and a pore size of 2.8 micrometers (as determined by the "Bubble Point Test"), a residence frequency shift of 261 hertz (as determined by the "Method for Impedance Test"), and a sound pressure level of 2.66 decibels (as determined by the "Method for Sound Pressure Level (SPL) Test").

The resulting polymer matrix composite was then exposed to 85° C. and 85% relative humidity for 10 days. The sample was then retested for acoustic performance and had a residence frequency shift of 190 hertz (as determined by the "Method for Impedance Test"), and a sound pressure level of 2.65 decibels (as determined by the "Method for Sound Pressure Level (SPL) Test").

Example 53

A one gallon (3.8 liter) metal can was charged with 1229 grams of paraffin ("ISOPAR G"). The paraffin ("ISOPAR G") was slowly agitated with an air mixer while 54.5 grams of the UHMWPE ("GUR-2126") was fully incorporated, and then while still agitated, 400 grams of silane-treated, heat-treated alumina (made as described in Example 52) was added to this mixture and stirred with an air mixer until a uniform slurry was obtained. The can was sealed and allowed to slowly roll at 10 rpm overnight using a 13 inch (33 cm) high-capacity laboratory jar mill (obtained from Cole-Parmer Vernon Hills, Ill.). The slurry was then removed from the can and placed in a 2-liter round bottom glass reactor flask and covered with a reaction flask head and clamped. The removed slurry was aggressively agitated with a motorized air mixer fitted with a stir bar in the flask and held under a vacuum of -0.6 bar for 5 minutes. The slurry was then continuously applied as a strand with a peristaltic pump and hose at room temperature (about 25° C.) to a 3-mil (75-micrometer), 12-inch (30.5-cm) wide, heat stabilized PET liner ("COATED PET ROLL #33716020500") then a 3-mil (75-micrometer), 12-inch (30.5-cm) wide, heat stabilized (PET) liner ("COATED PET ROLL #33716020500") was applied on top to sandwich the slurry. The slurry (formed as a strand) was then spread between moving PET liners by conveying through a notch bar set to a gap of 31 mils (787 micrometers). The liners were pulled with a tension of 5 pounds (2.3 kg) from a winding stand obtaining an effective wet film thickness of about 25 mils (635 micrometers). The sandwiched, formed slurry was conveyed at a speed of 5 feet per minute (1.5 meter per minute) through the air flotation oven (as described in Example 50) at 135° C. (275° F.) to activate (i.e., to allow the UHMWPE to dissolve into the solvent). The activated sandwiched formed slurry was conveyed from the oven and allowed to air cool to 160° F. (71° C.) forming a solvent filled polymer matrix composite. The top liner was removed, exposing the polymer matrix composite to air. The polymer matrix composite was then conveyed at 5 feet per minute (1.5 meter per minute) through the air floatation oven at 220° F. (104° C.). A sample from the continuously made polymer matrix composite was then removed from the liner and placed on a PET liner ("COATED PET ROLL #33716020500") on a tray and the tray inserted into the lab oven ("DESPATCH RFD1-42-2E") at 107° C. (225° F.) for two hours. After evaporation, the polymer matrix composite was removed from the oven, allowed to cool to ambient temperature, and characterized.

Figure 40:
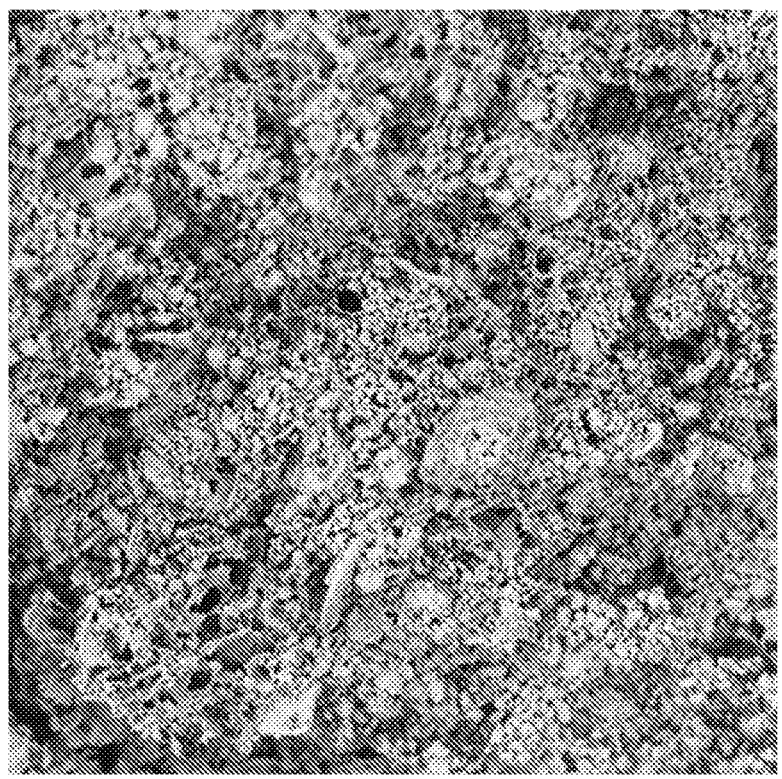
FIG. 40 is a schematic showing a scanning electron microscope (SEM) micrograph of a cross-section of an exemplary polymer matrix composite (Example 53) described herein.

Referring to FIG. 40, a SEM digital image of a cross-section of the polymer matrix composite is shown.

The resulting polymer matrix composite was 29.6 mils (752 micrometers) thick and had a measured density of 0.33 g/cm$^3$ (as determined by the "Density and Porosity Test"), a porosity of 90% (as determined by the "Density and Porosity Test"), a Gurley air flow of 12.9 sec/50 cm$^3$ (as determined by the "Air Flow Resistance Test"), and a pore size of 1.6 micrometer (as determined by the "Bubble Point Test"), a residence frequency shift of 125.8 hertz (as determined by the "Method for Impedance Test"), and a sound pressure level of 1.57 decibel (as determined by the "Method for Sound Pressure Level (SPL) Test").

The resulting polymer matrix composite was then exposed to 65° C. and 90% relative humidity for 5 days. The sample was then retested for acoustic performance and had a residence frequency shift of 118.4 hertz (as determined by the "Method for Impedance Test"), and a sound pressure level of 1.62 decibel (as determined by the "Method for Sound Pressure Level (SPL) Test").

Example 54

A one-gallon (3.8 liter) metal can was charged with 1196 grams of paraffin ("ISOPAR G"). The paraffin was slowly agitated with an air mixer while 65.1 gram of UHMWPE ("GUR-2126") was fully incorporated, and then while still agitated, 400 grams of heat-treated alumina (made as described in Example 52) was added. The can was sealed and allowed to slowly roll over night on a 13 inch (33 cm) high-capacity laboratory jar mill.

The slurry was then removed from the can and placed in a 2-liter glass reactor. The removed slurry was aggressively agitated with a stir bar air mixer and held under a vacuum of −0.6 bar for 5 minutes. The slurry was pumped with a peristaltic pump and hose and applied as a continuous strand at room temperature (about 25° C.) to a 3-mil (75-micrometer), 12-inch (30.5-cm) wide, heat stabilized PET liner ("COATED PET ROLL #33716020500") then a 3-mil (75-micrometer), 12-inch (30.5-cm) wide, heat stabilized PET liner ("COATED PET ROLL #33716020500") was applied on top to sandwich the slurry. The slurry was then spread between moving PET liners by conveying through a notch bar set to a gap of 31 mils (787 micrometers). The PET liners were pulled with a tension of 5 pounds (2.3 kg) from a winding stand obtaining an effective wet film thickness of about 25 mils (635 micrometers). The sandwiched, formed slurry was conveyed at a speed of 5 feet per minute through the air flotation oven (as described in Example 50) at 135° C. (275° F.) to activate (i.e., to allow the UHMWPE to dissolve into the solvent). The activated sandwiched formed slurry was conveyed from the oven and allowed to air cool to 160° F. (71° C.) forming a solvent filled polymer matrix composite. The top liner was removed exposing the polymer matrix composite to air. The polymer matrix composite was then conveyed at 5 feet per minute (1.5 meter per minute) through the air floatation oven at 220° F. (104° C.). A sample of the polymer matrix composite was then removed from the liner and placed on a PET liner ("COATED PET ROLL #33716020500") on a tray and the tray inserted into the lab oven ("DESPATCH RFD1-42-2E") at 107° C. (225° F.) for two hours. After evaporation, the polymer matrix composite was removed from the oven, allowed to cool to ambient temperature, and characterized.

The resulting polymer matrix composite was 27.7 mils (704 micrometers) thick and had a measured density of 0.254 g/cm$^3$ (as determined by the "Density and Porosity Test"), a porosity of 92.5% (as determined by the "Density and Porosity Test"), a Gurley air flow of 2.7 sec/50 cm$^3$ (as determined by the "Air Flow Resistance Test"), and a pore size of 2.3 micrometers (as determined by the "Bubble Point Test"), a residence frequency shift of 133.9 hertz (as determined by the "Method for Impedance Test"), and a sound pressure level of 2.07 decibels (as determined by the "Method for Sound Pressure Level (SPL) Test").

The resulting polymer matrix composite was then exposed to 65° C. and 90% relative humidity for 5 days. The sample was then retested for acoustic performance and had a residence frequency shift of 96.9 hertz (as determined by the "Method for Impedance Test"), and a sound pressure level of 1.36 decibel (as determined by the "Method for Sound Pressure Level (SPL) Test").

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of making a polymer matrix composite comprising a porous polymeric network structure and a plurality of particles distributed within the porous polymeric network structure, the method comprising:
   combining a thermoplastic polymer, a solvent, and a plurality of thermally conductive particles to provide a slurry;
   forming the slurry into a formed article;
   heating the formed article in an environment to retain at least 90 percent by weight of the solvent in the formed article, based on the weight of the solvent in the formed article, and solubilize at least 50 weight percent of the thermoplastic polymer, based on the total weight of the thermoplastic polymer;
   inducing phase separation of the thermoplastic polymer from the solvent to provide the polymer matrix composite, and
   further comprising compressing the polymer matrix composite.

2. The method of claim 1, further comprising removing at least a portion of the solvent from the formed article after inducing phase separation of the thermoplastic polymer from the solvent.

3. The method of claim 2, wherein at least 90 percent by weight of the solvent, based on the weight of the solvent in the formed article, is removed, wherein the formed article before, removing at least 90 percent by weight of the solvent, based on the weight of the solvent in the formed article, of the solvent has a first volume, wherein the formed article after removing at least 90 percent by weight of the solvent, based on the weight of the solvent in the formed article, has a second volume, and wherein the difference between the first and second volume is less than 10 percent.

4. The method of claim 3, wherein the formed article after the solvent removal has a porosity at least 5 percent.

5. The method of claim 1, wherein no solvent is removed from the formed article.

6. The method of claim 1, wherein the inducing phase separation includes thermally induced phase separation.

7. The method of claim 1, wherein the thermoplastic polymer in the slurry has a melting point, wherein the solvent has a boiling point, and wherein combining is conducted below the melting point of the thermoplastic polymer in the slurry, and below the boiling point of the solvent.

8. The method of claim 1, wherein the thermoplastic polymer in the slurry has a melting point, and wherein the inducing phase separation is conducted at less than the melting point of the thermoplastic polymer in the slurry.

9. The method of claim 1, further comprising applying vibratory energy to the polymer matrix composite simultaneously with applying a compressive force.

10. The method of claim 1, wherein the polymer matrix composite has a density in a range from 0.05 to 10 g/cm$^3$.

11. The method of claim 1, wherein the polymer matrix composite has a porosity of at least 5 percent.

12. The method of claim 1, wherein the particles are acoustically active particles.

13. The method of claim 12, wherein the acoustically active particles comprise acoustically active metal oxide particles.

14. The method of claim 1, wherein the particles are soft magnetic particles.

15. The method of claim 1, wherein the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

16. The method of claim 1, wherein the porous polymeric network structure comprises a plurality of interconnected morphologies.

17. The method of claim 1, wherein the thermoplastic polymer has a number average molecular weight in a range from of $5 \times 10^4$ to $1 \times 10^7$ g/mol, and wherein the polymer matrix composite is in the form of a sheet having a thickness in a range from 50 to 7000 micrometers.

18. The method of claim 1, wherein the porous polymeric network structure is produced by an induced phase separation of a miscible thermoplastic polymer-solvent solution.

19. The method of claim 1, wherein the particles are present in a weight fraction in a range from 15 to 99, based on the total weight of the polymer matrix composite.

\* \* \* \* \*